US007355989B2

(12) United States Patent
Sugiyama

(10) Patent No.: US 7,355,989 B2
(45) Date of Patent: Apr. 8, 2008

(54) ECHO CANCELING METHOD AND DEVICE FOR MULTIPLEX LINE

(75) Inventor: Akihiko Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 1096 days.

(21) Appl. No.: 10/312,036

(22) PCT Filed: Jun. 15, 2001

(86) PCT No.: PCT/JP01/05103

§ 371 (c)(1),
(2), (4) Date: Dec. 23, 2002

(87) PCT Pub. No.: WO02/01744

PCT Pub. Date: Jan. 3, 2002

(65) Prior Publication Data

US 2003/0112770 A1    Jun. 19, 2003

(30) Foreign Application Priority Data

Jun. 26, 2000    (JP)    ............................. 2000-191402

(51) Int. Cl.
*H04B 3/20* (2006.01)
(52) U.S. Cl. ................................. 370/286; 379/406.01
(58) Field of Classification Search ...................... None
See application file for complete search history.

(56) References Cited

U.S. PATENT DOCUMENTS 6,442,274 B1 *    8/2002    Sugiyama .............. 379/406.08

FOREIGN PATENT DOCUMENTS

| EP | 0 880 261 A2 | 11/1998 |
| JP | 2000-196507 | 7/2000 |
| JP | 2000-196507 A * | 7/2000 |
| WO | WO 00/04698 | 1/2000 |

OTHER PUBLICATIONS

Bernard Widrow et al., "Adaptive Signal Processing", Prentice-Hall Signal-Processing Series, Chapter 6, pp. 99-101, 1985.
Michael L. Honig et al., "Adaptive Filters: Structures, Algorithms, and Applications", The Kluwer International Series in Engineering and Computer Science, VLSI, Computer Architecture and Digital Signal Processing, Kluwer Academic Publishers, 1985, pp. 54-57.
Akihiko Sugiyama et al., "Computationally Efficient Echo Canceler Algorithms for Multiple Telephone Lines", Proceeding of Symposium on Digital Signal Processing of the Institute of Electronics, Information and Communication Engineers of Japan, Nov. 1999, pp. 671-676.

(Continued)

*Primary Examiner*—Ramnandan Singh
(74) *Attorney, Agent, or Firm*—McGinn IP Law Group, PLLC

(57) ABSTRACT

An echo canceling method and apparatus for simultaneously erasing echoes produced on a plurality of transmission paths, for multiplexed lines which require a short convergence time and a less amount of operations. The echo canceling apparatus has a control circuit (70) which receives information on convergence degrees and input signal intensities from a plurality of adaptive filters (80, 81, 82) to distribute a number of coefficient updates to each adaptive filter corresponding to the information.

22 Claims, 34 Drawing Sheets

OTHER PUBLICATIONS

Akihiro Hirano et al., "A Noise-Robust Stochastic Gradient Algorithm with an Adaptive Step-Size Suitable for Mobile Hands-Free Telephones", IEEE Proceedings of International Conference on Acoustics, Speech and Signal Processing, vol. II, pp. 1392-1395, Apr. 1995.

Yutaka Hiratani et al., "A Noise-Robust Echo Canceller on V830 Multimedia Risc Processor Integrated Into A Car Navigation System", IEEE Proceedings of International Conference on Acoustics, Speech and Signal Processing, vol. III, pp. 1753-1756, May 1998.

V. John Matthews et al., "Stochastic Gradient Adaptive Filters with Gradient Adaptive Step Sizes", IEEE Proceedings of International Conference on Acoustics, Speech and Signal Processing, vol. III, pp. 1385-1388, Apr. 1990.

Akihiko Sugiyama, An Interference-Robust Stochastic Gradient Algorithm with a Gradient-Adaptive Step-Size, IEEE Proceedings of International Conference on Acoustics, Speech and Signal Processing, vol. III, pp. 1385-1388, pp. III-539-542, Apr. 1993.

Akihiko Sugiyama, "An Adaptive-Step LMS Algorithm With Coefficient Value Evaluation (ALCOVE)", Fall National Convention of the Institute of Electronics, Information and Communication Engineers of Japan, vol. 1, Sep. 1991, p. 1-75.

Tyseer Aboulnasr, "A Robust Variable Step-Size LMS-Type Algorithm: Analysis and Simulations", IEEE Transactions on Signal Processing, vol. 45, No. 3, Mar. 1997, pp. 631-639.

T. Creasy et al., "A Robust Adaptive Filtering Algorithm for Acoustic Echo Cancellation", IEEE Proceedings of Digital Signal Processing Workshop, pp. 82, Aug. 1998.

Akihiko Sugiyama et al. "Sparse-Tap Adaptive Fir Filter Algorithms Suitable for Speech Signals", 12th Proceedings of Symposium on Digital Signal Processing of IEEE, Nov. 1997, pp. 543-548.

Kensaku Fujii et al., "Double-Talk Detection Method with Detecting Echo Path Fluctuation", A vol. J78-A, No. 3, pp. 314-322, Mar. 1995.

"Adaptive Algorithm, Step Gain, Estimation Time, Fuzzy Control, Square Error", Journal of Acoustical Society of Japan, vol. 53, No. 12, pp. 941-948, Dec. 1997.

* cited by examiner

ECHO CANCELING METHOD AND DEVICE FOR MULTIPLEX LINE

TECHNICAL FIELD

The present invention relates to an echo canceling method and apparatus for simultaneously canceling echoes produced on a plurality of transmission lines.

BACKGROUND ART

Regarding the techniques of canceling echoes leaking from the transmitter side to the receiver side on the 4-line side of a 2-4 wire hybrid transformer circuit, there is known an echo canceler described in "Adaptive Signal Processing", 1985, Prentice-Hall Inc., USA (reference 1).

The echo canceler employs an adaptive filter having a number of tap coefficients equal to or larger than an impulse response length of an echo path to produce a pseudo echo (echo replica) corresponding to a transmission signal, thereby operating to suppress an echo leaking from a transmission circuit to a reception circuit on the four-line side of the 2-4 wire hybrid transformer circuit.

In this event, each tap coefficient of the adaptive filter is modified by correlating the transmission signal to an error signal which is calculated by subtracting the echo replica from a mixed signal comprising a mixture of the echo and a received signal.

As a typical coefficient adaptation algorithm for such an adaptive filter, there are known an LMS algorithm described in the aforementioned Reference 1, and a normalizing LMS (NLMS) algorithm described in "Adaptive Filters," 1985, Kulwer Academic Publishers, USA (Reference 2).

On an actual communication line, a plurality of subscriber lines are multiplexed to form multiplexed lines for further improving efficiency of the transmission capacity. In such a case, echo cancelers for canceling echoes in a 2-4 wire hybrid transformer circuit are equipped in a multiplexer as many as the number of multiplexed lines. A design for permitting a reduction in the total amount of operations in such an echo canceler for multiplexed lines is described in Proceedings of Symposium on Digital Signal Processing of the Institute of Electronics, Information and Communication Engineers of Japan, pp. 671-676, November 1999 (Reference 3). FIG. 1 illustrates the configuration of multiplexed echo cancelers described in Reference 3 when the number of multiplexes is three.

On a first line, a transmission signal fed to transmission signal input terminal 1 is sent to a transmission path from transmission signal output terminal 2, and sent to a 2-line side in 2-4 wire hybrid transformer circuit 3, wherein a portion of the transmission signal leaks into a reception side as an echo due to mismatch in impedance and the like.

This echo is fed from received signal input terminal 4, and is supplied to subtractor 5. On the other hand, adaptive filter 86 receives input signal 700 supplied to transmission signal input terminal 1, and produces echo replica 701 through a convolution with a coefficient value of adaptive filter 86 modified on the basis of error signal 702, which is an output of subtractor 5. Subtractor 5 subtracts echo replica 701 delivered from adaptive filter 86 from the echo leaking into the reception side, and transfers the result of the subtraction thus calculated to received signal output terminal 6. The result of the subtraction is also fed back simultaneously to adaptive filter 86 as error signal 702 for updating the coefficients.

Control circuit 79 receives step sizes 601, 603, 605 from adaptive filters 86, 87, 88, respectively, and evaluates them. Since the step sizes increase from initial values and decreases as the coefficients are updated, they represent to what extent adaptive filters 86, 87, 88 converge. Control circuit 79 supplies coefficient update control signals 602, 604, 606 at predefined time intervals corresponding to adaptive filters 86, 87, 88. Coefficient update control signals 602, 604, 606 are information which determines how many times the respective adaptive filters update coefficients in the predetermined time interval, and are determined depending on the result of the evaluation on the step sizes. Since the configuration and operation of the echo cancelers in a second and a third line in FIG. 1 are completely the same as those of the first line, description thereon is omitted.

Since the conventional echo canceler for multiplexed lines does not need the number of operations which increases in proportion to the number of multiplexed lines, the amount of operations can be reduced.

However, when an input signal is an audio signal, an allocated number of times the coefficients are updated may not be used but wasted in some cases. This is because the coefficients are not updated when an input signal has a small amplitude, so that even if coefficient updates are allocated to an adaptive filter associated with such a line, the adaptive filter does not substantially update the coefficients. In other words, the number of operations associated with the allocated coefficient updates may include waste.

DISCLOSURE OF THE INVENTION

In view of the foregoing problem, it is an object of the present invention to provide an echo canceling method and apparatus for multiplexed lines which only require a small number of operations.

The echo canceling method and apparatus for multiplexed lines according to the present invention evaluate convergence degrees of adaptive filters and input signal intensities on a plurality of lines, and allocate predefined numbers of coefficient updates to the respective lines in accordance with the convergence degrees and the signal intensities on the respective lines.

More specifically, a control circuit is provided for receiving information on the convergence degree and information on an input signal from an adaptive filter connected to each line to allocate a number of coefficient updates corresponding thereto to each adaptive filter.

BEST MODE FOR CARRYING OUT THE INVENTION

Figure 1:
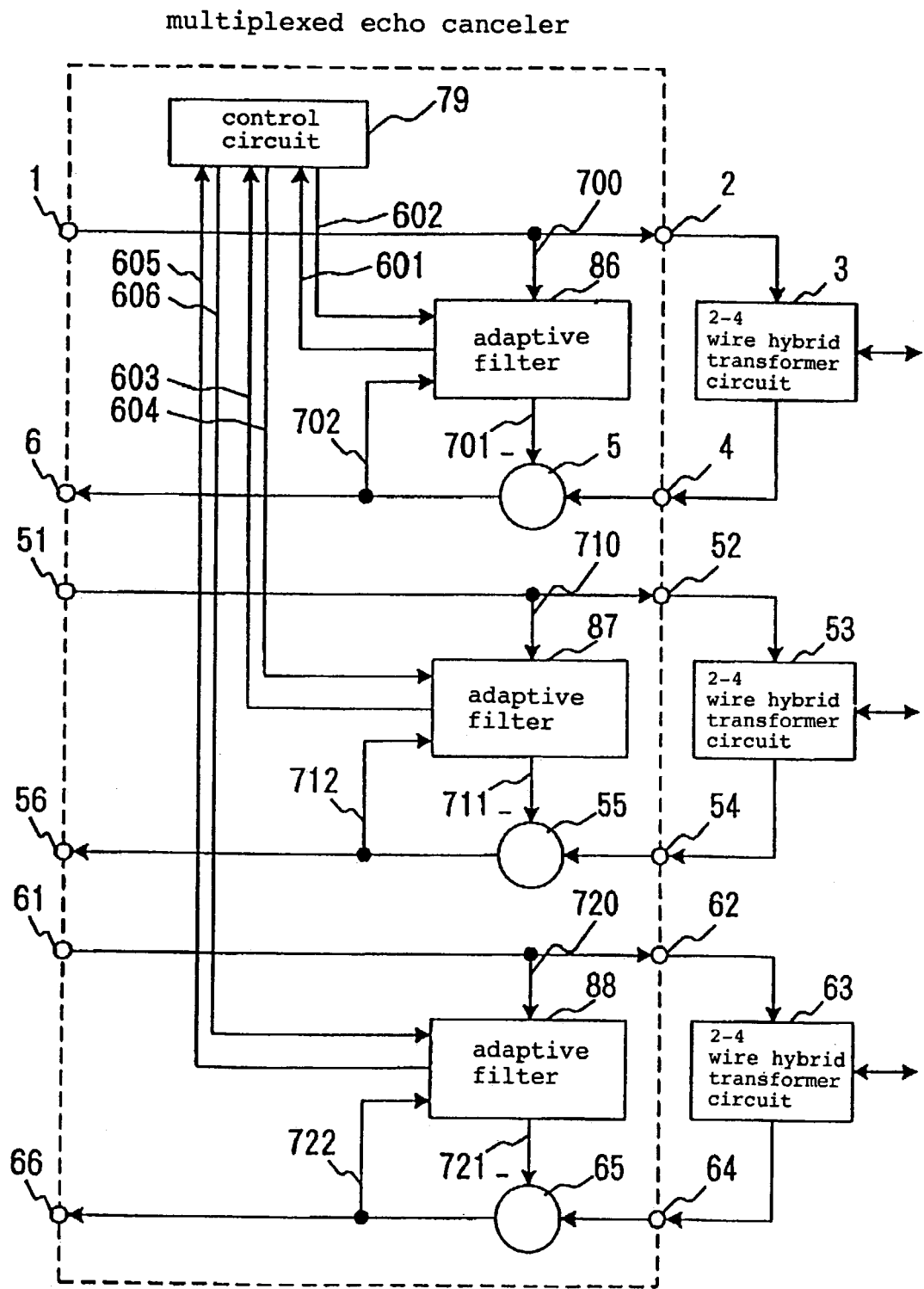
FIG. 1 is a block diagram illustrating the configuration of a prior art example.
Figure 2:
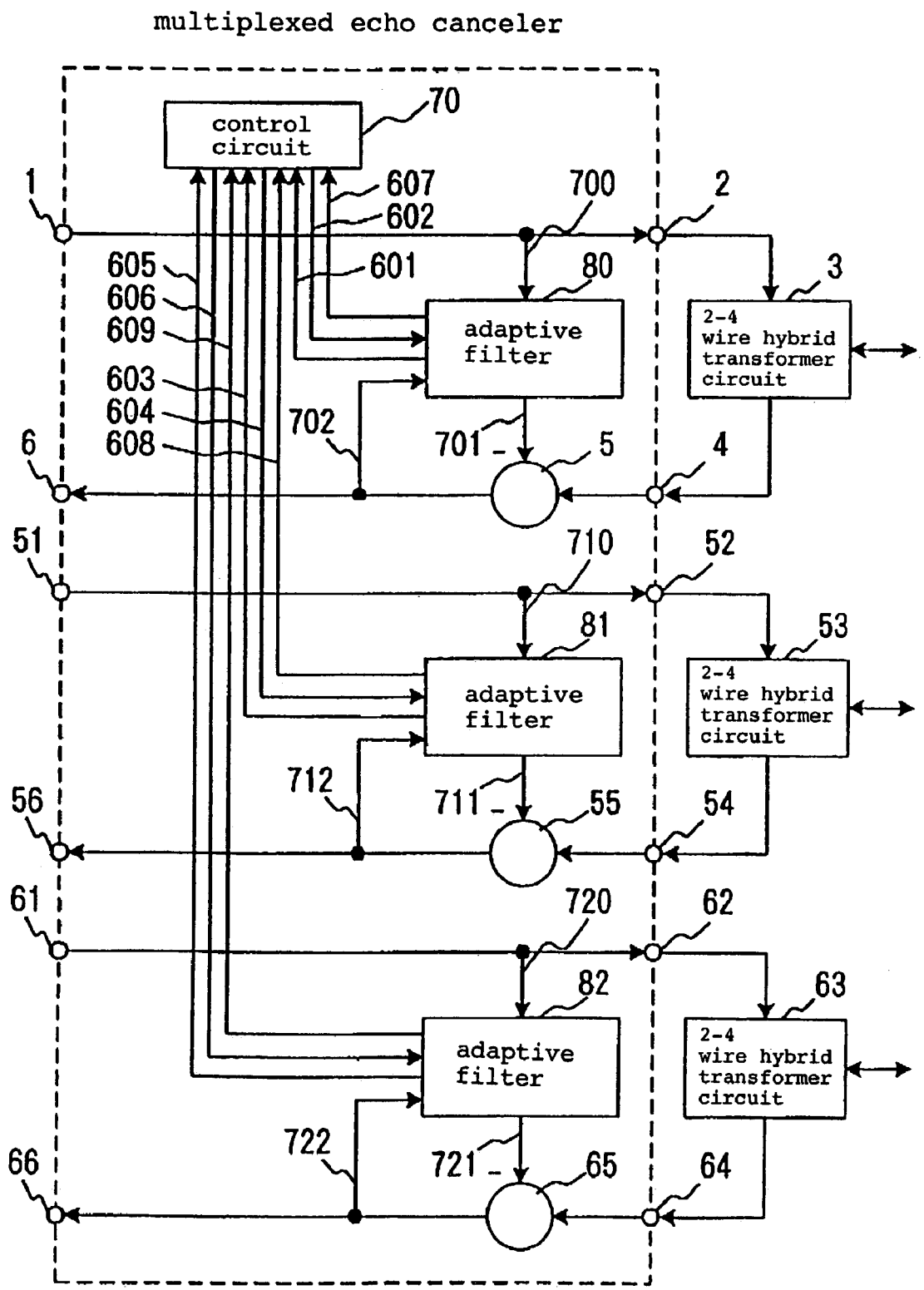
FIG. 2 is a block diagram illustrating a first embodiment of the present invention.

FIG. 2 is a block diagram illustrating a first embodiment of the present invention. Since FIG. 2 is identical to FIG. 1 which is a block diagram of a prior art example except for control circuit 70 and adaptive filters 80, 81, 82, the following description on detailed operations will be centered on these differences.

Control circuit 70 receives convergence indexes 601, 603, 605 and input signal intensities 607, 608, 609 from adaptive filters 80, 81, 82, respectively, and evaluates them. The convergence indexes represent the convergence degrees of adaptive filters 80, 81, 82, while the input signal intensities represent information on the intensities of signals fed to the respective adaptive filters. In consideration of the convergence indexes together with the information on the input signal intensities, a predetermined fixed number of coefficient updates is distributed to each line.

Assume now that the convergence indexes at time k are $\mu_1(k)$, $\mu_2(k)$, $\mu_3(k)$, respectively. Control circuit 70 first averages them to find average convergence indexes $\bar{\mu}_1\text{bar}(k)$, $\mu_2\text{bar}(k)$, $\mu_3\text{bar}(k)$. While several methods are available for averaging, averaging using a first-order leaky integration, for example, can be expressed by:

$$\bar{\mu}_1(k+1) = \gamma\bar{\mu}_1(1-\gamma)\mu_1(k) \tag{1}$$

where $\gamma$ is a constant which satisfies $0<\gamma<1$.

On the other hand, averaging using moving average can be expressed by:

$$\bar{\mu}_1(k+1) = \frac{1}{N_A} \sum_{j=k-N_A+2}^{k+1} \mu_1(j) \tag{2}$$

where NA is a window length for the moving average. Completely similar calculations are made for $\mu_2\text{bar}(k)$, $\mu_3\text{bar}(k)$.

Subsequently, convergence degrees $\Delta\mu_1(k)$, $\Delta\mu_2(k)$, $\Delta\mu_3(k)$ are calculated for the respective average convergence indexes. The convergence degree can be calculated, for example, by:

$$\Delta\mu_1(k) = \frac{|\overline{\mu}_1(k) - \overline{\mu}_1(k-1)|}{\overline{\mu}_1(k)} \quad (3)$$

This means that a variation per unit time is calculated for $\mu_1(k)$. Completely similar calculations can be made for $\mu_2(k)$, $\mu_3(k)$. Since $\Delta\mu(k)$ for each adaptive filter decreases corresponding to the convergence of coefficients, an adaptive filter presenting smaller $\Delta\mu(k)$ is advanced more in convergence, and therefore can be given a lower priority for coefficient update. This means that the coefficient is updated a less number of times in a fixed time.

Based on such principles, coefficient update necessities are managed for the respective adaptive filters using memories $\Gamma_1(k)$, $\Gamma_2(k)$, $\Gamma_3(k)$, respectively.

First, $\Delta\mu_1(k)$, $\Delta\mu_2(k)$, $\Delta\mu_3(k)$ are compared with a predefined threshold value, and memories $\Gamma_1(k)$, $\Gamma_2(k)$, $\Delta_3(k)$ are increased for those larger than the threshold value. $\Delta\mu(k)$ smaller than the threshold value can be regarded as indicating that a coefficient update is advanced, i.e., the convergence is reached. Therefore, once $\Delta\mu(k)$ falls across the threshold value, an associated line is recorded, such that $\Gamma\mu(k)$ is subsequently set to zero at all times for this line.

Initial values for all the memories are set to zero, and the adaptive filters are started operating. Only when $\Delta\mu_1(k)$, $\Delta\mu_2(k)$, $\Delta\mu_3(k)$ are larger than the threshold value, they are added to the values in memories $\Gamma(k)$ associated therewith. For example, when $\Delta\mu_1(k)$ and $\Delta\mu_2(k)$ are larger than the threshold value, operations are performed as follows:

$$\Gamma_1(k+1) = \Gamma_1(k) + \Delta\mu_1(k) \quad (4)$$

$$\Gamma_2(k+1) = \Gamma_2(k) + \Delta\mu_2(k) \quad (5)$$

$$\Gamma_3(k+1) = \Gamma_3(k) \quad (6)$$

When $k=k_D$, $\Gamma(k)$ is evaluated before it is reset to zero. This evaluation and resetting operation is repeated each time k increases by $k_D$. The value of $\Gamma(k)$ immediately before it is reset draws an upwardly convex trajectory which gradually increases from zero to a maximum associated with an increase in k, and then decreases to zero. On the other hand, on each of multiplexed communication lines, it is known that calls are generated in accordance with the Poisson distribution. In other words, each adaptive filter is started operating at a different time. Therefore, by conducting such a control, the coefficients can be updated preponderantly in an adaptive filter which presents a high necessity for a coefficient update at that time. A total amount of operations required for the coefficient updates remains unchanged for all lines, even if the number of adaptive filters is increased.

On the other hand, when k is an integer multiple of $k_D$, an evaluation is made as well on the information on the input signal intensity. Assuming that this value is represented by $\phi(k)$, a value defined by the following equation can be used as $\phi(k)$:

$$\phi(k) = \sum_{j=k-k_D}^{k} x^2(j) \quad (7)$$

where $x(j)$ is a j-th sample of input signal x. Specifically, $\phi(k)$ is a sum total of squared input signal samples from time k to $k-k_D$. Of course, $\phi(k)$ may be a sum total of squared input signal samples from time k to $k-k_{D1}$.

Here, $0 < k_{D1} < k_D$. Alternatively, a sum total of absolute input signal samples may be substituted for the sum total of squared input signal samples.

Further, while $\phi(k)$ represents the input signal intensity, no adaptive filter generally updates coefficients when an input signal is close to zero. It is therefore possible to binarize $\phi(k)$ for setting it to one when it exceeds the predefined threshold value and to zero otherwise. Instead of the binarization, multi-value quantization may be performed. $\phi(k)$ thus calculated represents an input signal intensity on each line.

Next, $\phi(k)$ is calculated as defined by the product of $\Gamma(k)$ and $\phi(k)$. When k is an integer multiple of $k_D$, a total number of updates determined by a predefined amount of operations is distributed in accordance with $\phi1(k)$, $\phi2(k)$, $\phi3(k)$. Also, the values of $\Gamma(k)$, $\phi(k)$ and $\phi(k)$ are reset to zero. In this event, if there is a line with $\Gamma(k)$ equal to zero, this represents that the line does not need to update the coefficients because the coefficients have converged or an input signal is too small, so that a predefined small number is allocated to allow the line to follow changes in the system. For the remaining lines, the small number is subtracted from a total available number for distribution to derive the remainder which is allocated thereto. Alternatively, the predefined small number may be allocated only to the line with $\Gamma(k)$ equal to zero, while the remaining lines may be allocated based on the value of $\phi(k)$. Since $\phi(k)$ is set to a small value or zero for a line which does not update the coefficients due to a feeble input signal, the line is allocated a small number of coefficient updates.

In other words, no number of coefficient updates is allocated in vain. When the total number of coefficient updates permitted to all the adaptive filters is larger than $k_D$, a plurality of adaptive filers can simultaneously update the coefficients. With the number of lines equal to three, it can be readily understood that the amount of operations is effectively reduced when the total number of coefficient updates is 3 $k_D$ or less. Further, in any situation, a predefined small number may be first distributed to all lines, and the remainder may be distributed based on $\phi(k)$.

The simplest example of distribution may be a proportional distribution. Alternatively, a weighted proportional distribution is also possible. The result of such a distribution represents the number of coefficient update during $k_D$ sampling periods, where the value must be an integer. Thus, a procedure such as round-down, round-up, round-off or the like is performed for transforming the result of the distribution into an integer. As a result, the sum total of integer values allocated to the respective lines can be smaller than an actually permitted total number of coefficient updates. This means that a number of coefficient updates can be further added to some lines. Such a redistribution for a small remainder is also possible by a variety of means. The simplest example is a collective allocation to the line which presents maximum values of the aforementioned $\Gamma(k)$, $\phi(k)$, $\phi(k)$. Also, when the small remainder is one or more, the value can be again redistributed using a proportional distribution or the like in accordance with the values of $\Gamma(k)$, $\phi(k)$, $\phi(k)$. While a variety of distribution methods can be otherwise employed, details thereon is omitted here. Each adaptive filter updates the coefficients in accordance with the number of coefficient updates allocated thereto. The operations performed during $k=0-k=k_D$ so far described are repeated subsequently each time k increases by $k_D$.

Memories $\Gamma_1(k)$, $\Gamma_2(k)$, $\Gamma_3(k)$ may be controlled based on averaged $\Delta\mu_1(k)$, $\Delta\mu_2(k)$, $\Delta\mu_3(k)$ corresponding to Equation (1) or Equation (2), instead of $\Delta\mu_1(k)$, $\Delta\mu_2(k)$, $\Delta\mu_3(k)$. Also, $\Delta\mu(k)$ may be calculated directly using the convergence index $\mu(k)$ without averaging in accordance with Equation (1) or Equation (2). Further, in the foregoing description, memories $\Gamma_1(k)$, $\Gamma_2(k)$, $\Gamma_3(k)$ are subjected to an increase only when $\Delta\mu_1(k)$, $\Delta\mu_2(k)$, $\Delta\mu_3(k)$ are larger than the predefined threshold value. Alternatively, memories $\Gamma_1(k)$, $\Gamma_2(k)$, $\Gamma_3(k)$ can be subjected to an increase for all $\Delta\mu_1(k)$, $\Delta\mu_2(k)$, $\Delta\mu_3(k)$. This means the omission of a determination on convergence and a special operation for allocation of a fixed number in accordance therewith.

Control circuit 70 supplies coefficient update control signals 602, 604, 606, which are determined based on the aforementioned $\phi(k)$, at predefined time intervals corresponding to adaptive filters 80, 81, 82.

Coefficient update control signals 602, 604, 606 are information which determines how many times the respective adaptive filters update the coefficients in the predefined time interval. Coefficient update step sizes are selectively set to zero in accordance with these values to control the number of coefficient updates.

It has been described that a plurality of adaptive filters can be permitted to simultaneously update coefficients when the total number of coefficient updates permitted to all the adaptive filters is larger than $k_D$. When the total permitted number of coefficient updates is equal to $N_{adapt}k_D$, $N_{adapt}$ adaptive filters can be permitted to simultaneously update coefficients, where $N_{adapt}$ is an integer. When the actual number M of lines is larger than the number $N_{adapt}$ of adaptive filters which are permitted to simultaneously update coefficients, scheduling becomes critical for determining in which order adaptive filters of which lines are permitted to update coefficients. While the scheduling can be performed in a variety of approaches, an exemplary approach will be described with reference to FIG. 3.

Figure 3:
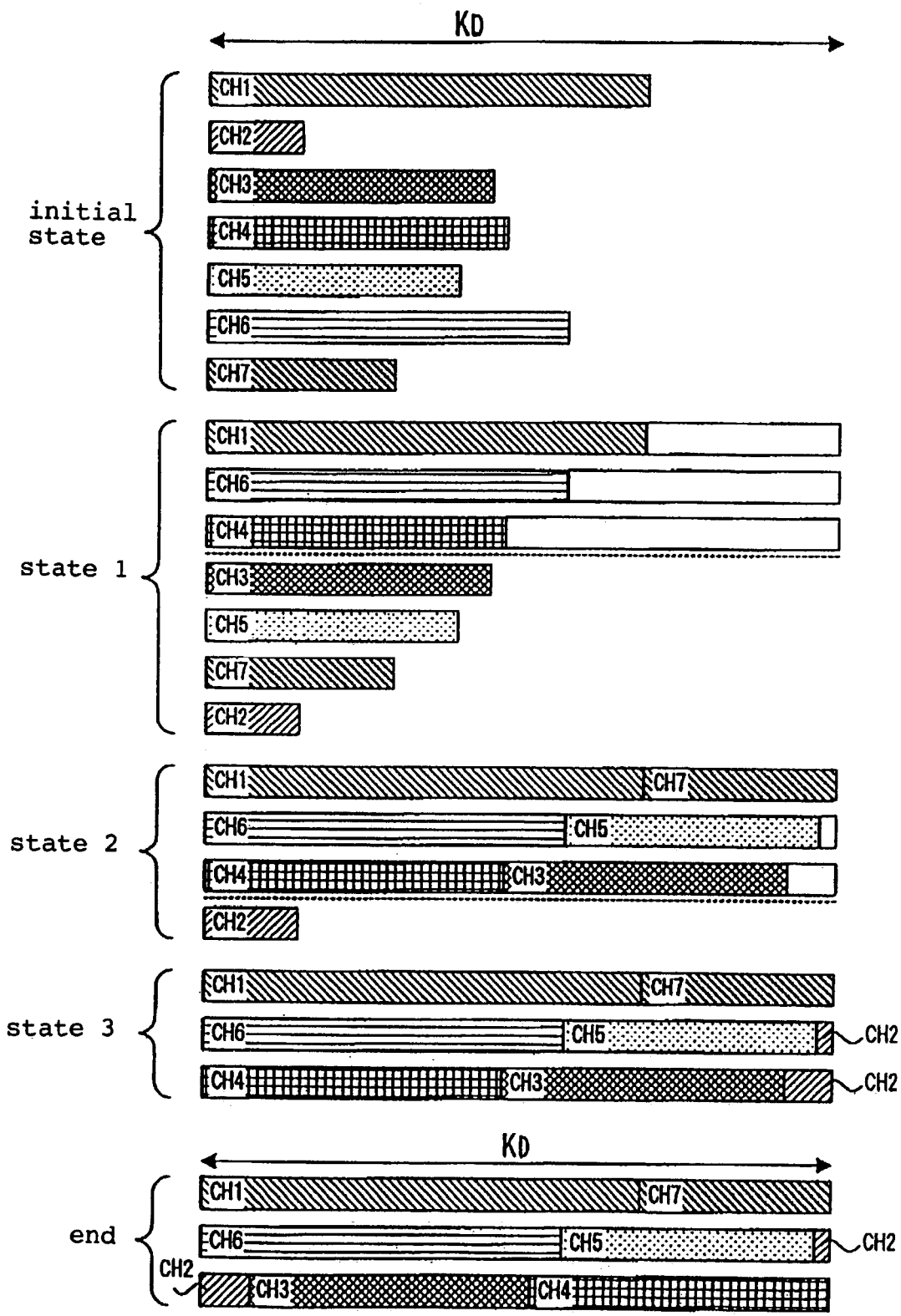
FIG. 3 is an example of the procedure for determining a coefficient update order schedule.

FIG. 3 is an exemplary procedure for determining a coefficient update order schedule for the adaptive filters. A basic procedure is shown below.

1. Prepare empty arrays equal to $N_{adapt}$.
2. Channel numbers are arranged in the order of the corresponding numbers of coefficient updates allocated thereto.
3. $N_{adapt}$ channels are extracted and placed in the empty arrays in order of the corresponding allocated number of coefficient allocations, where a size occupied thereby in the array corresponds to the number of coefficient updates allocated thereto.
4. Channels allocated larger numbers of coefficient updates are extracted from the remainder, and placed in arrays in the order reverse to Procedure 3.
5. The procedures 3 and 4 are repeated until the remaining number of channels is reduced to $N_{adapt}$ or less.
6. The remaining channels are placed in the arrays in a manner similar to before. If the last channel is not accommodated in the remaining space of a single array, it is divided into a plurality of pieces for accommodation.
7. When the last channel is divided into a plurality of pieces, the order of channels within an array is changed such that divided pieces are not placed at the same position in different arrays.

A state after the procedure 3 is finished corresponds to State 1 in FIG. 3, where CH1 represents Channel 1.

Here, there are arrays above a dotted line, and remaining channels CH3, CH5, CH7, CH2 below the dotted line. The result of executing the aforementioned Procedure 4 is State 2. Remaining channels CH3, CH5, CH7 are placed in arrays in the order reverse to the procedure 3 in accordance with the numbers of coefficient updates allocated thereto. There is also remaining channel CH2 below the dotted line. When the aforementioned procedure 6 is finished, State 3 appears. In State 3, CH2 is located at the same position of the horizontal axis corresponding to the time axis, and coefficients are updated for CH2 a plurality of times in the same sampling period. To avoid this, the result of executing the aforementioned procedure 7 is a state labeled "end." The order of CH4, CH3, CH2 is reversed. Therefore, the coefficient update for CH2 is distributed to the beginning and the end of $k_D$ sampling periods, so that the coefficient update is not executed a plurality of times in the same sampling period.

Figure 4:
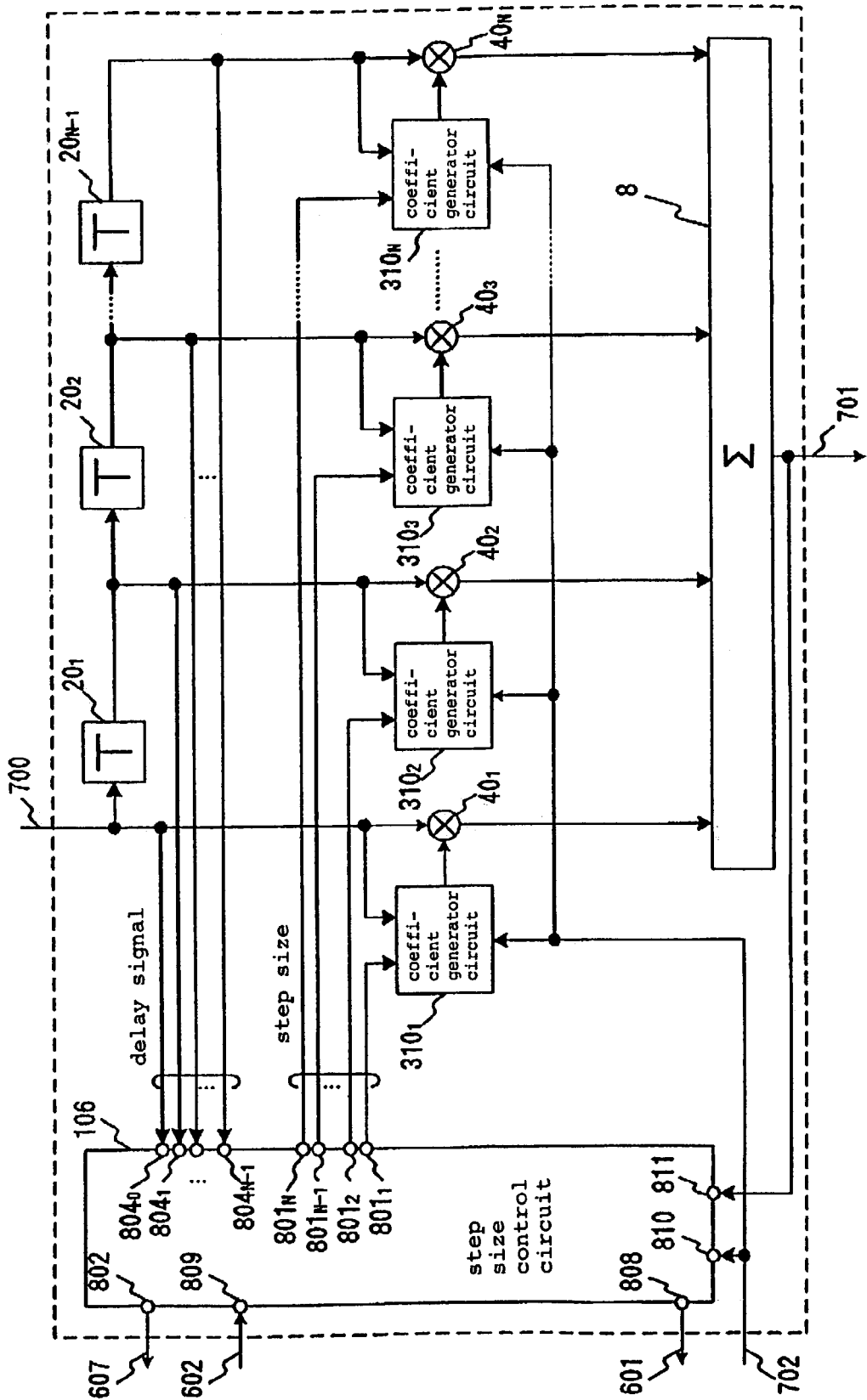
FIG. 4 is a block diagram illustrating the configuration of an adaptive filter according to the first embodiment of the present invention.

FIG. 4 is a block diagram illustrating an exemplary configuration of adaptive filters 80, 81, 82 in FIG. 2. Adaptive filter 80 has N-1 delay elements from delay element 201 to delay element 20N-1 for delaying transmission signal 70, where the total number of taps is N including taps with a delay of zero. On the other hand, for generating tap coefficients of the adaptive filter, N coefficient generator circuits 3101-310N are provided. N delay signals, which are outputs of the delay elements, are supplied to coefficient generator circuits 3101-310N and multipliers 401-40N corresponding thereto. Multipliers 401-40N multiply tap coefficient values delivered from coefficient generator circuits 3101-310N by delay signals delivered from the delay elements, respectively, and supply the results to adder circuit 8. Adder circuit 8 adds all multiplication results supplied from multipliers 401-40N, and delivers as echo replica 701. Step size control circuit 106 supplies coefficient generator circuits 3101-310N with step sizes for use in the coefficient update through output terminals 8011-801N.

Step size control circuit 106 sequentially calculate the step sizes in order to improve noise resistance in coefficient adaptation. Here, noise represents signals other than a difference between the echo and echo replica added to error signal 702, and has been already added to the echo at received signal input terminal 4 in FIG. 2. This noise may be a pure noise component such as thermal noise or may be a voice of a communication party received through 2-4 wire hybrid transformer circuit 3. Such noise components are not related to error signal 702 and therefore cause an erroneous coefficient update if their power is large. For this reason, if the noise has large power, step size control circuit 106 controls the step sizes to be smaller.

Methods of controlling step sizes for purposes of improving the noise resistance are described in IEEE PROCEEDINGS OF INTERNATIONAL CONFERENCE ON ACOUSTICS, SPEECH AND SIGNAL PROCESSING, vol. II, PP.1392-1395, April, 1995 (Reference 4), and IEEE PROCEEDINGS OF INTERNATIONAL CONFERENCE ON ACOUSTICS, SPEECH AND SIGNAL PROCESSING, vol. III, PP.1753-1756, May, 1998 (Reference 5). In the methods described in these references, a common step size is supplied for all coefficient generator circuits, and its value $\mu(k)$ at time k is given by:

$$\mu(k) = \frac{\mu_0 P_x(k)}{P_x^2(k) + \alpha^2 P_N^2(k)} \quad (8)$$

$$P_N(k+1) = \beta P_N(k) + (1-\beta)e^2(k) \quad (9)$$

where e(k) is error signal 702, $\alpha$, $\beta$, $\mu_0$ are constants, and $$P_X(k) = X(k)T_X(k) \quad (10)$$

Error signal e(k) is supplied through input terminal 810. Vector X(k) is a column vector, elements of which are delayed signal samples supplied through input terminals $804_0$-$804_{N-1}$. Vector $X(k)^T$ represents a transpose of vector X(k). $P_N(k)$ is updated when error signal 702 has power larger than that of echo replica 701 in Reference 4, and when $P_X(k)$ is smaller than a predefined threshold value in Reference 5. The power of echo replica 701 is supplied as an output of adder 8 through input terminal 811.

Step size control circuit 106 has terminal 808 for delivering the step size as convergence index 601; terminal 802 for delivering information 607 on an input signal intensity; and terminal 809 for receiving coefficient update control signal 602. $P_X(k)$ calculated in accordance with Equation (10) is delivered as information 607 on the input signal intensity through terminal 802, while the step size calculated in accordance with Equation (8) is delivered as convergence index 601 through terminal 808, and both are transferred to control circuit 70. Specifically, a limited number of coefficient updates is allocated to respective lines in accordance with the step size and input signal power. A line having a small step size can be regarded as presenting a less necessity for the coefficient update because the coefficient substantially changes in small amount in the coefficient update. Coefficient update control signal 602 received through terminal 809 is multiplied by the step size calculated in accordance with Equation (8), and the product is supplied to terminals $801_1$-$801_N$ as the step size. Stated another way, the coefficient update is stopped when coefficient update control signal 602 is zero. While the foregoing description has been made on the assumption that $P_X(k)$ calculated in accordance with Equation (10) is delivered as information 607 on the input signal intensity through terminal 802, another amount representative of information on the input signal intensity may be used instead of $P_X(k)$. Examples of such other amounts include a sum total of absolute values of delayed signal samples supplied through input terminals $804_0$-$804_{N-1}$, and a maximum value, a median value, a weighted average value, and the like of the delayed signal samples. Alternatively, these may be calculated using some of the delayed signal samples, as previously described.

Figure 5:
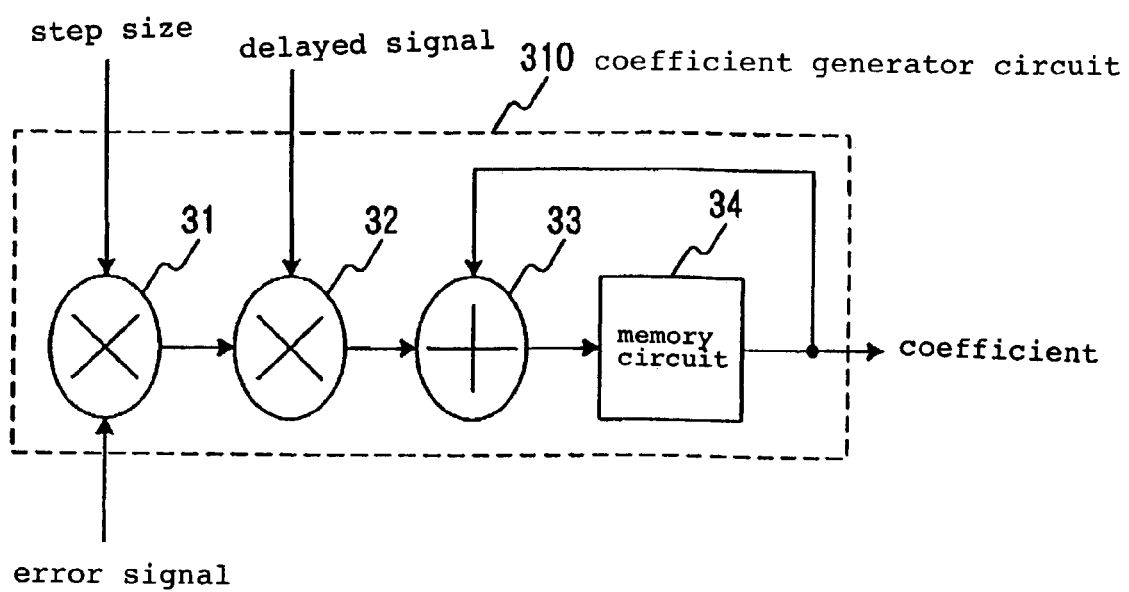
FIG. 5 is a block diagram illustrating the configuration of a coefficient generator circuit in the adaptive filter according to the first embodiment of the present invention.

The configuration of coefficient generator circuit $310_i$ (i=1, 2, . . . , N) can be represented as in FIG. 5.

Error signal 702 is multiplied by the step size in multiplier 31, and further multiplied by delayed signals supplied from delay elements $20_1$-$20_{N-1}$ in multiplier 32. The output of multiplier 32, which represents the amount of modification to a coefficient, is added to a coefficient value stored in memory circuit 34 in adder 33, and the result of the addition is fed back to memory circuit 34. The delayed value in memory circuit 34 serves as a coefficient value after an update.

While the configuration and operation of adaptive filter 80 have been described with reference to the block diagram illustrated in FIG. 4, adaptive filters 81 and 82 in FIG. 2 are also completely identical in configuration and operation to adaptive filter 80. Further, while FIG. 1 has been described for an example in which the number of adaptive filters is three, similar description applies to the case where the number of adaptive filters is three or more.

Figure 6:
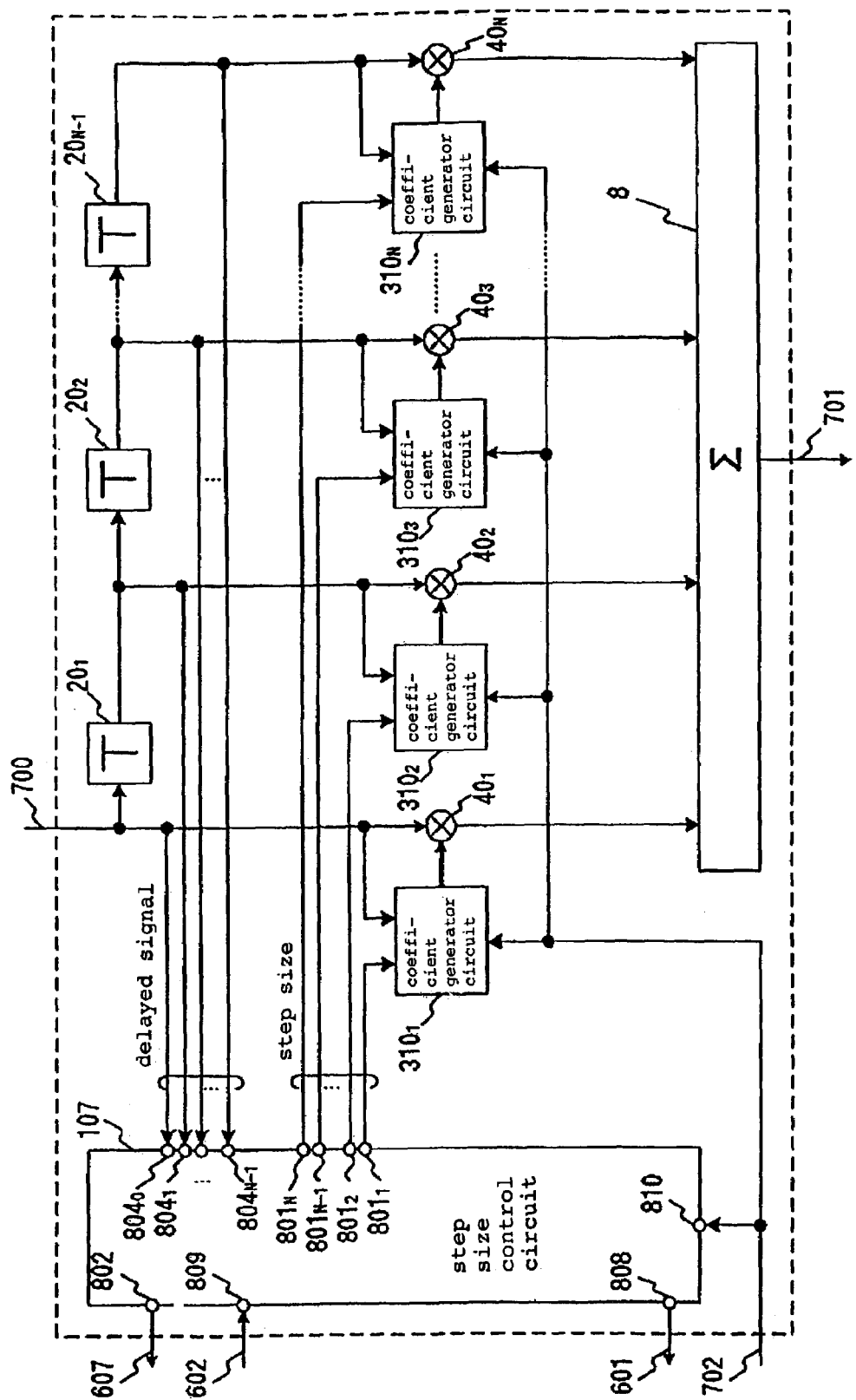
FIG. 6 is a block diagram illustrating an adaptive filter according to a second embodiment of the present invention.

FIG. 6 is a block diagram illustrating a second exemplary configuration of adaptive filters 80, 81, 82 in FIG. 2 as a second embodiment of the present invention. FIG. 6 is identical to FIG. 3 which illustrates the first exemplary configuration except that step size control circuit 106 is replaced with step size control circuit 107. Step size control circuit 107 differs from step size control circuit 106 in that the former does not have terminal 811 for receiving the output of adder 8. This is because step size control circuit 107 differs from step size control circuit 106 in the method and purpose of calculating the step size.

The control of the step size in step size control circuit 106 is conducted for purposes of improving the noise resistance in the adaptive control for coefficient values, whereas step size control circuit 107 sequentially calculates step sizes in order to reduce a convergence time of coefficients of the adaptive filter. An exemplary method of controlling a step size for such a purpose is described in IEEE PROCEEDINGS OF INTERNATIONAL CONFERENCE ON ACOUSTICS, SPEECH AND SIGNAL PROCESSING, vol. III, PP.1385-1388, April, 1990 (Reference 6).

In the method described in Reference 6, a common step size is supplied to all coefficient generator circuits, and its value μ(k) at time k is given by:

$$\mu(k)=\mu(k-1)+\rho e(k)e(k-1)X(k-1)^T X(k) \quad (11)$$

where ρ is a positive constant, and e(k) is supplied to input terminal 810 as error signal 702. Also, elements of vector X(k) are supplied to input terminals $804_0$-$804_{N-1}$ as delayed signals. The step size calculated in accordance with Equation (11) is delivered as convergence index 601 through terminal 808, and transferred to control circuit 70 in FIG. 2. In addition, $P_X(k)$ calculated in accordance with Equation (10) is delivered through terminal 802 as information 607 on an input signal intensity, and transferred to control circuit 70. Further, coefficient update control signal 602 received through terminal 809 is multiplied by the step size calculated in accordance with Equation (11), and the product is supplied to terminals $801_1$-$801_N$ as the step size. Stated another way, the coefficient update is stopped when coefficient update control signal 602 is zero.

An algorithm similar to that described in Reference 6 is described in IEEE PROCEEDINGS OF INTERNATIONAL CONFERENCE ON ACOUSTICS, SPEECH AND SIGNAL PROCESSING, vol. III, pp. 539-542, April, 1993 (Reference 7). This algorithm is identical to the algorithm described in Reference 6 except that a nonlinear operation is applied for determining a step size, and can be readily implemented only by changing the operation in step size control circuit 107.

Figure 7:
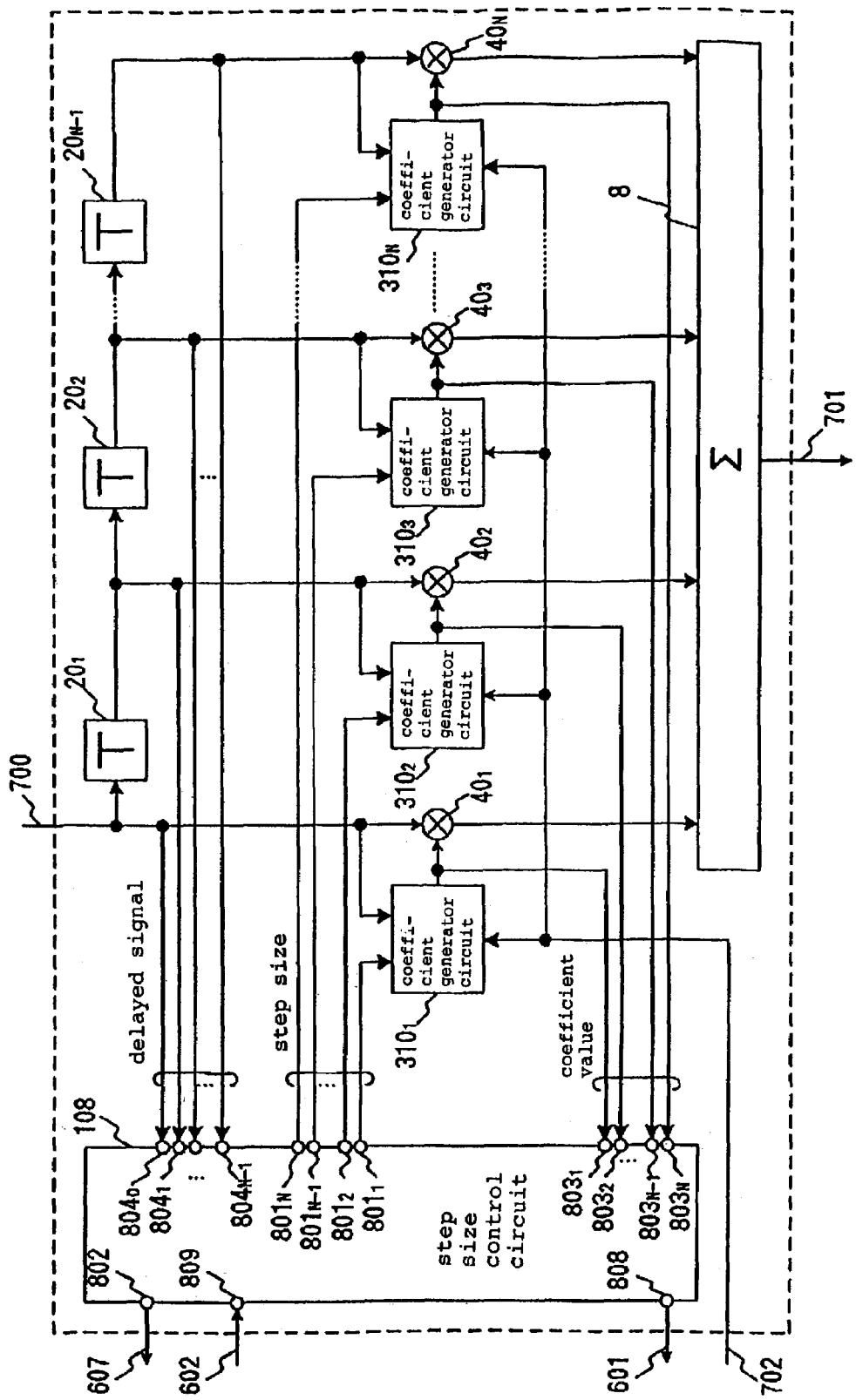
FIG. 7 is a block diagram illustrating the configuration of an adaptive filter according to a third embodiment of the present invention.

FIG. 7 is a block diagram illustrating a third exemplary configuration of adaptive filters 80, 81, 82 in FIG. 2 as a third embodiment of the present invention. FIG. 7 is identical to FIG. 6 which illustrates the second exemplary configuration except that the step size control circuit 107 is replaced with step size control circuit 108. Step size control circuit 108 differs from step size control circuit 107 in that the former has input terminals $803_1$-$803_N$ for receiving coefficient values from the respective coefficient generator circuits, and does not have input terminal 810 for receiving the error signal. This is because step size control circuit 108 differs from step size control circuit 107 in the method of calculating the step size.

A step size control method in step size control circuit 108 is described in the proceedings of Fall National Convention of the Institute of Electronics, Information and Communication Engineers of Japan, Vol. 1, September, 1991, pp. 1-75 (Reference 8). In this method, a common step size is supplied to all coefficient generator circuits, and its value μ(k) at time k is given by:

$$\mu(k) = \delta \cdot \frac{STA\left[\sum_{j=0}^{N-1} c_j^2\right]}{LTA\left[\sum_{j=0}^{N-1} c_j^2\right]} \quad (12)$$

where δ is a positive constant, and coefficients $c_j$ are supplied from coefficient generator circuits through input terminals $803_1$-$803_N$. STA[•] and LTA[•] represents a short time average and a long time average, respectively, of the arguments, and can be calculated in the same form as Equation (1) or Equation (2). The step size calculated in accordance with Equation (12) is delivered as convergence index 601 through terminal 808, and transferred to control circuit 70 in FIG. 2. In addition, $P_x(k)$ calculated in accordance with Equation (10) is delivered through terminal 802 as information 607 on an input signal intensity, and transferred to control circuit 70. On the other hand, coefficient update control signal 602 received through terminal 809 is multiplied by the step size calculated in accordance with Equation (12), and the product is supplied to terminals $801_1$-$801_N$ as the step size.

Stated another way, the coefficient update is stopped when coefficient update control signal 602 is zero. While a variety of coefficient update step size control circuits have been described with reference to FIGS. 4 to 7, the present invention can be applied in completely the same manner to step size control circuits other than those. Such methods of controlling a time-varying step size are described in IEEE TRANSACTIONS ON SIGNAL PROCESSING, VOL. 45, NO. 3, PP.631-639, March, 1997 (Reference 9), IEEE PROCEEDINGS OF DIGITAL SIGNAL PROCESSING WORKSHOP, PP.#82, AUGUST, 1998 (Reference 10), the Journal of Acoustical Society of Japan, VOL. 53, NO. 12, PP.941-948, December, 1997 (Reference 11), and the like.

While the foregoing description has been described on the assumption that all adaptive filters 80, 81, 82 have a time-varying step size, the number of coefficient updates can also be distributed in similar principles when they have a fixed step size. For example, as a fourth embodiment of the present invention, a fourth exemplary configuration of adaptive filters 80, 81, 82 can be created by modifying the operation of step size control circuit 108 in the adaptive filter of FIG. 7.

In the fourth exemplary configuration, coefficient values fed through input terminals $803_1$-$803_N$ are evaluated to reveal the convergence degrees of the adaptive filters. This is because a coefficient value approaches to a constant value and saturates there as an adaptive filter converges to a larger extent. For this reason, a sum total of squared coefficients:

$$\sum_{j=0}^{N-1} c_j^2 \quad (13)$$

can be used as an index for the convergence degree. Alternatively, a sum total of absolute coefficients may be used instead of the sum total of squared coefficients. Further, variations to these may be used such as a partial sum of squared coefficients or a partial sum of absolute coefficients. As a special case of a partial sum, a squared or an absolute maximum coefficient value may be used as an index to the convergence degree. Information on these coefficient values and information on an input signal intensity derived from delayed signals fed through input terminals $804_1$-$804_N$ are both supplied to control circuit 70 through output terminals 808, 802, respectively, thereby making it possible to achieve an optimal distribution of the number of coefficient updates.

In the foregoing description, the adaptive filter is a standard transversal type. However, it is known that an echo canceler applied to satellite links and the like has a number of coefficient generator circuits less than the total number of delay elements, and that an adaptive filter for dynamically controlling connections of the delay elements with the coefficient generator circuits can accomplish a more efficient implementation. The following description will be made on an embodiment which employs such adaptive filters.

FIG. 7 is a block diagram illustrating a fifth embodiment of the present invention. The fifth embodiment differs from the first embodiment illustrated in FIG. 2 in that adaptive filters 80, 81, 82 are replaced with adaptive filters 83, 84, 85, and control circuit 70 is replaced with control circuit 71. Each of adaptive filters 83, 84, 85 is an adaptive filter which adaptively controls tap positions. Control circuit 71 receives tap position information 611, 613, 615 from adaptive filters 83, 84, 85 instead of convergence indexes 601, 603, 605, and evaluates them together with input signal intensities 607, 608, 609.

Assume now that the tap position information at time k is represented by $\lambda_1(k)$, $\lambda_2(k)$, $\lambda_3(k)$, respectively. Control circuit 71 first averages them to find average tap position information $\bar{\lambda}_1$bar (k), $\bar{\lambda}_2$ bar (k), $\bar{\lambda}_3$ bar (k). The averaging can be performed in accordance with:

$$\bar{\lambda}_1(k+1) = \gamma\bar{\lambda}_1(k) + (1-\gamma)\lambda_1(k) \quad (14)$$

or $$\bar{\lambda}_1(k+1) = \frac{1}{N_A} \sum_{j=k-N_A+2}^{k+1} \lambda_1(j) \quad (15)$$

in a similar manner to Equation (1) or Equation (2). Completely similar calculations are made for $\lambda_2$ bar (k), $\lambda_3$ bar (k). Subsequently, convergence degrees $\Delta\lambda_1(k)$, $\Delta\lambda_2(k)$, $\Delta\lambda_3(k)$ are calculated for the respective average tap position information. The convergence degree can be calculated, for example, by:

$$\Delta\lambda_1(k) = \frac{|\bar{\lambda}_1(k) - \bar{\lambda}_1(k-1)|}{\bar{\lambda}_1(k)} \quad (16)$$

This means that a variation per unit time is calculated for $\Delta\lambda_1(k)$. Completely similar calculations can be made for $\Delta\lambda_2(k)$, $\Delta\lambda_3(k)$. Since $\Delta\lambda(k)$ for each adaptive filter decreases corresponding to the convergence of coefficients, an adaptive filter presenting smaller $\Delta\lambda(k)$ is advanced more in convergence, and therefore can be given a lower priority for coefficient update. This means that the coefficients are updated a less number of times in a fixed time. Based on such principles, coefficient update necessities are managed for the respective adaptive filters using memories $\Gamma_1(k)$, $\Gamma_2(k)$, $\Gamma_3(k)$, respectively. Since the management of the coefficient update necessities for the respective adaptive filters using $\Gamma(k)$ is completely the same as the first embodiment of the present invention described in connection with FIG. 2, description thereon is omitted. The description in the first embodiment can be applied as it is by changing μ to λ and the step size to the tap position information.

When k is an integer multiple of $k_D$, an evaluation is made as well on the information on the input signal intensity, and φ(k) is calculated by the method described in connection with FIG. 2. Next, φ(k) is calculated as defined by the product of Γ(k) and φ(k). Control circuit 71 uses φ(k) thus calculated to determine coefficient update control signals 602, 604, 606 in a completely similar method to control circuit 70. At predefined time intervals, coefficient update control signals 602, 604, 606 determined based on the above-mentioned φ(k) are supplied to adaptive filters 83, 84, 85. Coefficient update control signals 602, 604, 606 supplied from control circuit 71 are completely identical to the coefficient update control signals supplied from control circuit 70.

Figure 8:
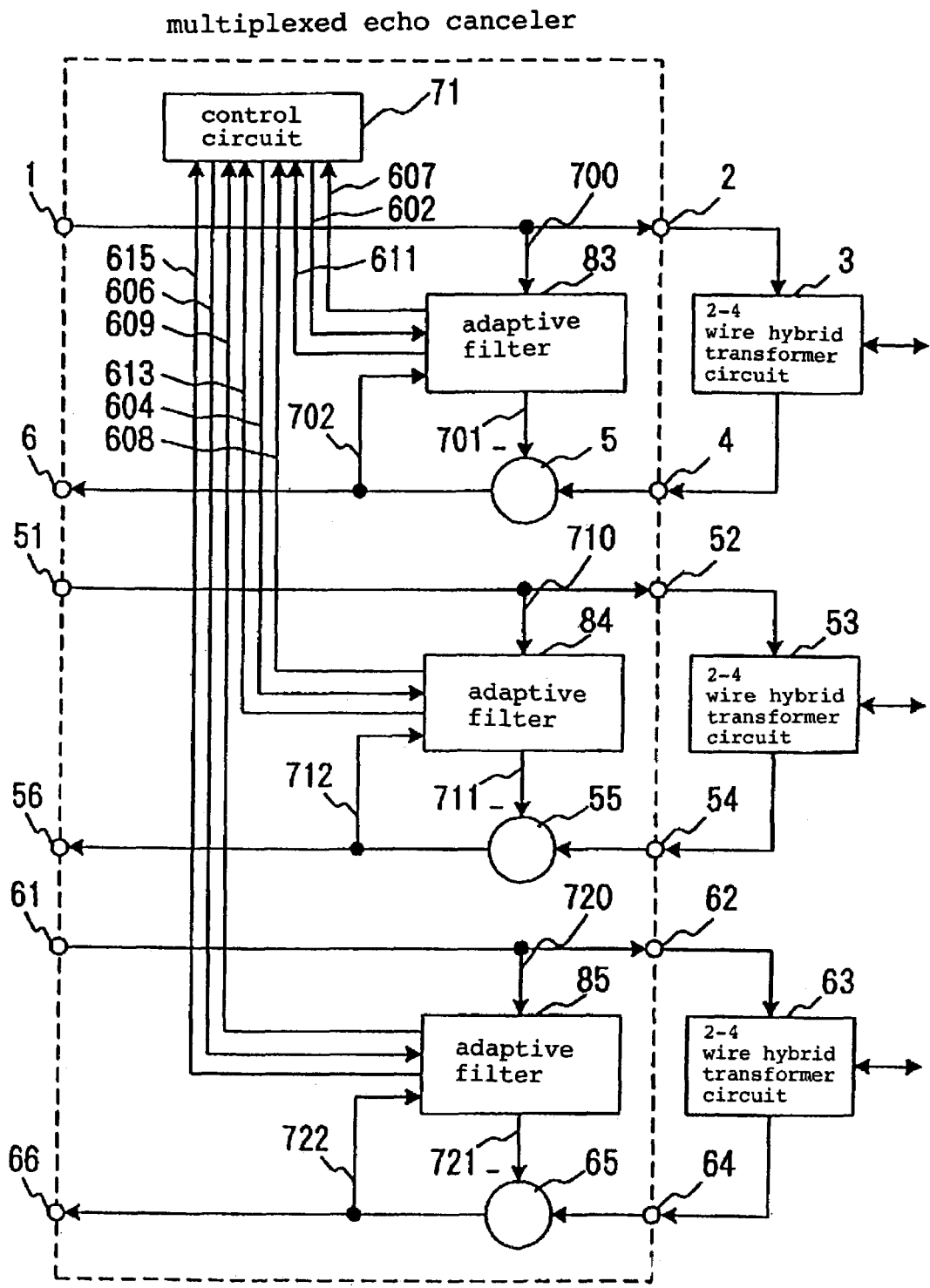
FIG. 8 is a block diagram illustrating a fifth embodiment of the present invention.
Figure 9:
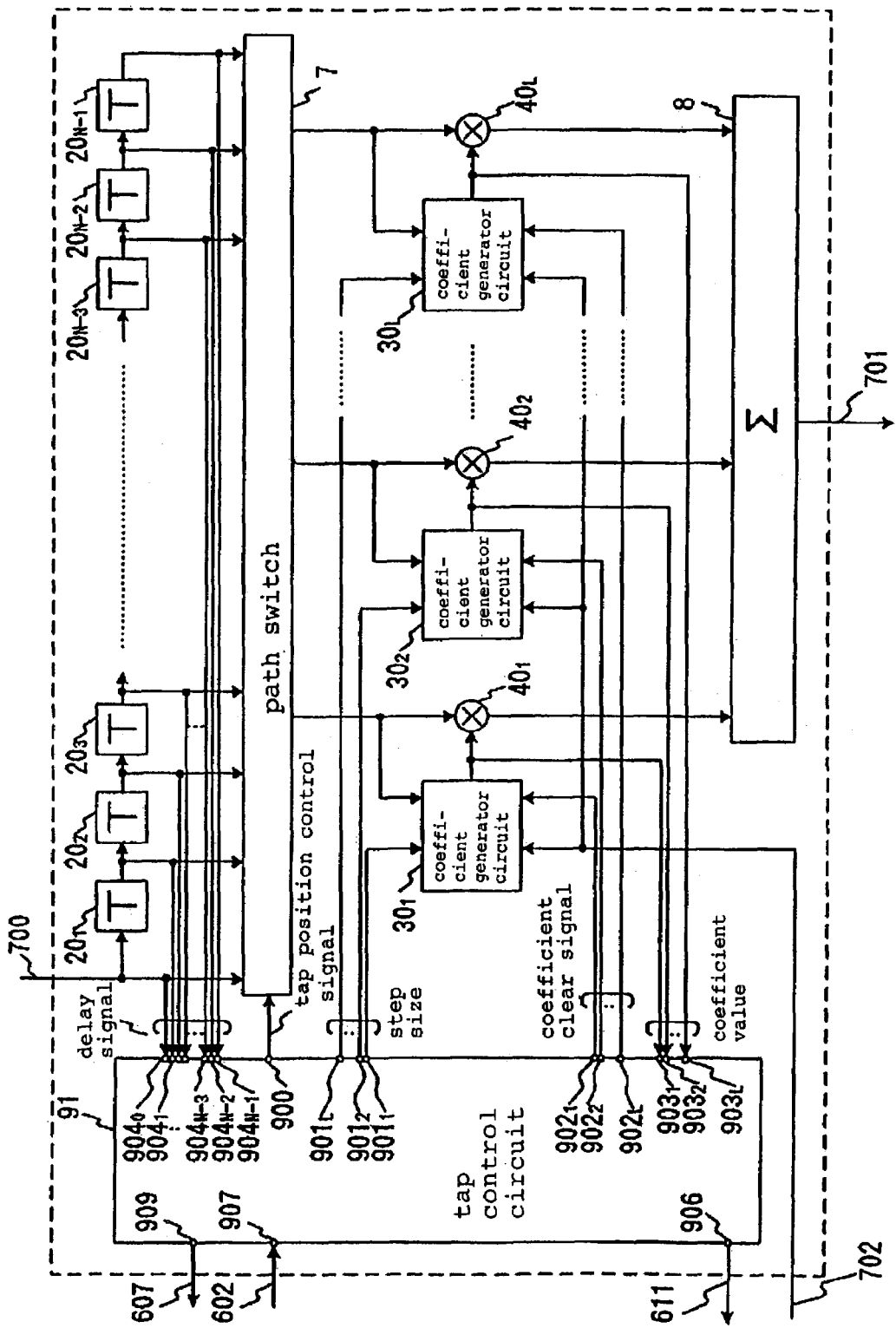
FIG. 9 is a block diagram illustrating the configuration of an adaptive filter according to the fifth embodiment of the present invention.

FIG. 9 is a block diagram illustrating a first exemplary configuration of adaptive filters 83, 84, 85 in FIG. 8. Unlike FIGS. 4 to 7 corresponding to the first to fourth exemplary configurations, in FIG. 9, the position of dispersive regions except for fixed delays are estimated from an impulse response of an echo path, and the location of coefficients is adaptively controlled such that tap coefficients of the adaptive filters are located near the estimated dispersive regions. In particular, a convergence time is reduced by first estimating an approximate position of the dispersive region, and placing the tap coefficients only in the vicinity thereof. Though similar to that described in Proceedings of Symposium on Digital Signal Processing of the Institute of Electronics, Information and Communication Engineers of Japan, pp. 543-548, November 1997 (Reference 12), this method differs in that tap control circuit 91 comprises output terminal 906 for extracting tap position information 611 to the outside, output terminal 909 for extracting information 607 on the input signal intensity to the outside, and input terminal 907 for receiving coefficient update control signal 602. In the following, the configuration and operation of adaptive filter 83 will be described with reference to the figure.

The adaptive filter illustrated in FIG. 9 has N-1 delay elements from delay element $20_1$ to delay element $20_{N-1}$ for delaying transmission signal 700, where the total number of taps is N including taps with a delay of zero. On the other hand, for generating tap coefficients of the adaptive filter, L coefficient generator circuits $30_1$-$30_L$ are provided. The total number N of taps and the number L of coefficient generator circuits of the adaptive filter is in a relationship expressed by N>L. Specifically, unlike the standard adaptive FIR filter, the adaptive FIR filter illustrated in FIG. 8 comprises a number of tap coefficients sufficient to cover a substantial dispersive regions except for fixed delay sections, and adaptively locates the tap coefficients around the dispersive regions.

For this purpose, the adaptive filter has path switch 7 for switching connections between the outputs of the delay elements and the coefficient generator circuits, and has tap control circuit 91 for purposes of controlling this path switch 7.

Path switch 7 operates to select outputs of L delay elements for transmission to the coefficient generator circuits based on a tap position control signal supplied from output terminal 900 of tap control circuit 91. L delay signals, which are the outputs of path switch 7, are supplied to coefficient generator circuits $30_1$-$31_L$ and multipliers $40_1$-$40_L$ corresponding thereto. Multipliers $40_1$-$40_L$ multiply tap coefficient values delivered from coefficient generator circuits $30_1$-$30_L$ by the delayed signals delivered from path switch 7 respectively, and supply the results to adder circuit 8. Adder circuit 8 adds all multiplication results supplied from multipliers $40_1$-$40_L$, and delivers as echo replica 701.

Tap control circuit 91 supplies a step size through output terminals $901_1$-$901_L$ for use by coefficient generator circuits $30_1$-$31_L$ in the event of coefficient update. A coefficient clear signal is also supplied to coefficient generator circuits $30_1$-$30_L$ through output terminals $902_1$-$902_L$ of tap control circuit 91, and used for resetting coefficients to zero. On the other hand, tap control circuit 91 receives coefficient values generated by coefficient generator circuits $30_1$-$30_L$ through input terminals $903_1$-$903_L$, and uses the coefficient values for generating the tap position control signal, step size, and coefficient clear signal. Tap control circuit 91 also receives an input of delay element $20_1$ and outputs of $20_1$-$20_{N-1}$ through input terminals $904_0$-$904_{N-1}$, and delivers results of evaluating them through output terminal 909 as information 607 on the input signal intensity.

Assuming now the LMS algorithm described in Reference 1 as a coefficient update algorithm, value $c_i(k+1)$ at the (k+1)th update of the i-th coefficient is given using value $c_i(k)$ at the k-th update by:

$$c_i(k+1)=c_i(k)+\mu_i e(k)x(k-a(i)) \qquad (17)$$

where i is a step size for the i-th coefficient, e(k) is a residual echo, x(k−a(i)) is an input signal sample at the (k−a(i))th coefficient update. a(i) is a set which is composed of indexes to the delay elements selected by path switch 7, and the number of elements is L.

In this event, the configuration of coefficient generator circuit $30_i$ (i=1, 2, . . . , L) can be represented as in FIG. 9. While FIG. 9 is basically identical in configuration to coefficient generator circuit $300_i$ illustrated in FIG. 4, it has a function of forcing coefficient values held in memory circuit 34 to zero when the coefficient clear signal is supplied thereto from tap control circuit 9 through output terminal $902_i$ (i=1, 2, . . . , L).

As is apparent from the foregoing description, tap coefficients of the adaptive filter are connected only to some of the delay elements selected by path switch 7. In the following, a tap having a connected tap coefficient is called the active tap, while a tap not having a connected tap coefficient is called the inactive tap. In the actual adaptive tap coefficient location, tap coefficients less than the actual total number of taps are located, for example, with equal intervals, as initial locations. These are active taps, whereas taps without coefficients located therein are inactive taps. Alternatively, the active taps may be initially located from the first one in the increasing order of the tap indexes, or may be given at random.

Figure 11:
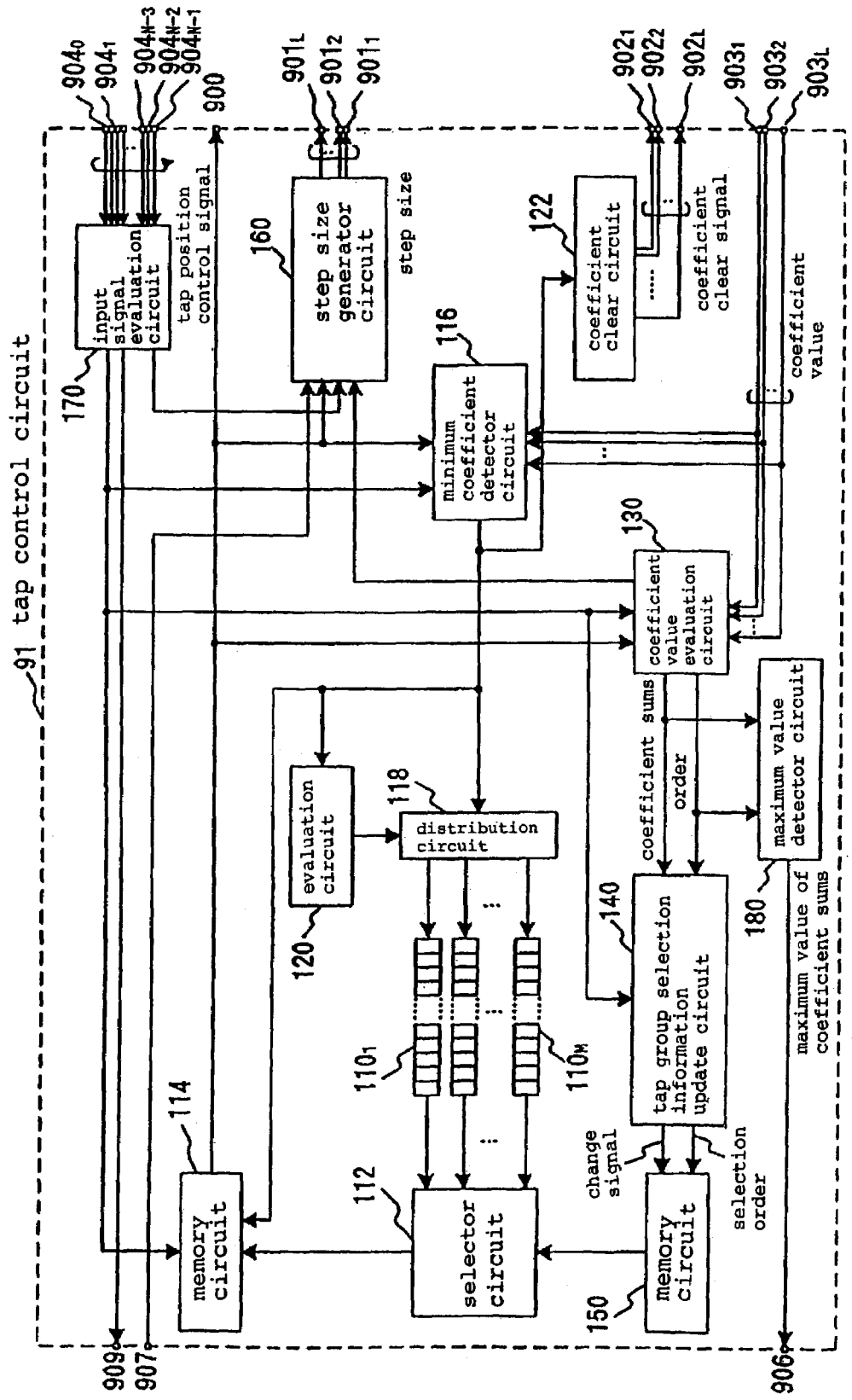
FIG. 11 is a block diagram illustrating the configuration of a tap control circuit included in the adaptive filter according to the fifth embodiment of the present invention.

FIG. 11 is a block diagram illustrating the configuration of tap control circuit 91. A group of memory circuits $110_1$, $110_2$, . . . , $110_M$ have a FIFO (First-In-First-Out) structure of a length N/M for storing N−L inactive tap numbers. Inactive taps are divided into groups, each of which is comprised of N/M tap numbers derived by equally dividing all taps by M, and are separately stored therein. This group is called the tap group. For example, when the total number N of taps is 20, and the number M of tap groups is 5, the number N/M of taps belonging to each tap group is 4. Also, the tap group is labeled G(n) (n=1, 2, . . . , 5), and tap numbers belonging to G(n) are indicated in braces as follows:

G(1)={1, 2, 3, 4}
G(2)={5, 6, 7, 8}

G(3)={9, 10, 11, 12}
G(4)={13, 14, 15, 16}
G(5)={17, 18, 19, 20}

Among these numbers, those currently classified as inactive are stored in corresponding memory circuits. In the foregoing example, elements of G(n) (n=1, 2, . . . , 5) are stored in $110_n$.

Selector circuit 112 selects any of memory circuits $110_1$, $110_2$, . . . , $110_M$ in response to a tap group selection signal supplied from memory circuit 150 at every Q coefficient updates, and extracts the tap index stored at the head of a queue for transfer to memory circuit 114 as a new active tap index. Memory circuit 114, which stores L active tap numbers not included in memory circuits $110_1$, $110_2$, . . . , $110_M$, supplies an active tap index to output terminal 900 as a tap position control signal. Active tap indexes in an initial state, i.e., initially set values in memory circuit 114 may be tap indexes arranged in an arbitrary order. For example, L indexes may be set in the increasing order of tap indexes, or L indexes may be selected and set at random. As an example, consider that L taps are selected in the increasing order from among all tap indexes. In the previous example, all tap indexes are 1, 2, 3, . . . , 20.

In this event, assuming that the index L of active taps is equal to 3, and the index N−L of invalid taps is equal to 17, three taps 1, 2, 3 from the smallest one are selected for active tap indexes and are held in memory circuit 114 as initial values. Initial values for memory circuits $110_1$, $110_2$, . . . , $110_M$ are chosen to be tap indexes other than the initial values set in memory circuit 114. In the foregoing example, 4, 5, 6, . . . , 20 except for 1, 2, 3 are selected for the initial values which are stored in corresponding memory circuits of memory circuits $110_1$, $110_2$, . . . , $110_M$. The foregoing initial setting is followed by coefficient updates for the active taps selected by path switch 7. The active taps are updated after every Q coefficient updates (Q is a positive integer), and the location of the coefficients is changed. The active taps are updated in the following procedure.

Minimum coefficient detector circuit 116 receives the active tap indexes delivered from memory circuit 114, and outputs of the respective coefficient generator circuits supplied to input terminals $903_1$-$903_L$, i.e., tap coefficients, and detects an active tap index corresponding to a coefficient which has a minimum absolute value. The detected active tap index is supplied to memory circuit 114, distribution circuit 118, evaluation circuit 120, and coefficient clear circuit 122.

Coefficient clear circuit 122 generates a coefficient clear signal for a coefficient generator circuit corresponding to the supplied tap index, and transfers this to any of corresponding output terminals $902_1$-$902_L$. This coefficient clear signal is supplied to a corresponding coefficient generator circuit for setting coefficients to zero. Evaluation circuit 120 calculates a tap group to which the tap index supplied from minimum coefficient detector circuit 116 belongs, and transfers a corresponding tap group index to distribution circuit 118.

Distribution circuit 118 selects a memory circuit corresponding to the tap group index supplied from evaluation circuit 120 from among memory circuits $110_1$, $110_2$, . . . , $110_M$, and transfers a tap index having the minimum coefficient supplied from minimum coefficient detector circuit 116. The transferred tap index is stored in memory circuit $110_1$ specified by distribution circuit 118. Memory circuit 114 deletes the tap index supplied from minimum coefficient detector circuit 116 from stored contents, and stores the new active tap index supplied from selector circuit 112, thereby updating active tap indexes stored therein.

Coefficient value evaluation circuit 130 receives tap coefficient values delivered from the respective coefficient generator circuits, and the active tap index delivered from memory circuit 114, and calculates a sum total of absolute coefficient values for each tap group. These M sum totals of the absolute coefficient values are rearranged according to the magnitude, and corresponding tap group indexes are transferred to tap group selection information update circuit 140 as an "order."

Coefficient value evaluation circuit 130 also transfers the sum totals of the absolute coefficient values to tap group selection information update circuit 140 as "coefficient sums." Tap group selection information update circuit 140 calculates an order in which the tap groups are selected, based on the information, and transmits the result to memory circuit 150 as a "selection order." Memory circuit 150 stores the tap group indexes rearranged in the "selection order" supplied from tap group selection information update circuit 140, in the order in which they are selected, and supplies the tap group indexes to selection circuit 112 in order. Initial values for the tap group indexes set in memory circuit 150 can be tap group indexes which are arbitrarily arranged. For example, the tap group indexes may be set in the increasing order, or may be set at random. Specifically, when the tap group indexes held in memory circuit 150 are represented by Z(n) (n=1, 2, . . . , M):

Z(1)=1
Z(2)=2
Z(3)=3
Z(4)=4
Z(5)=5 are set as initial values when the tap group indexes are set in the increasing order in the previous example. Also, an initial value for an address pointer for defining a data read position in memory circuit 150 is set at the beginning, and is delivered to selector circuit 112, so that the first tap group index, i.e., Z(1)=1 in the foregoing example, is delivered to selector circuit 112 as the initial value.

Upon receipt of this tap group selection signal, selector circuit 112 first selects memory circuit $110_1$, extracts the tap index number stored at the beginning thereof for transfer to memory circuit 114. The read address pointer is changed by a "change signal" supplied from tap group selection information update circuit 140. Each time the "change signal" is supplied from tap group selection information update circuit 140, memory circuit 150 advances the read address pointer by one for the stored tap groups.

Coefficient value evaluation circuit 130 takes absolute values of coefficients supplied thereto, and sums them up for each tap group. Coefficient value evaluation circuit 130 calculates the ratio of maximum value $C_{max}$ of sum totals of absolute coefficient values for each tap group to a sum total of absolute coefficient values in each tap group. For example, assuming that the sum total of the absolute coefficient values in each tap group is $c_{j,max}$ ($1 \leq j \leq M$) when the number of tap groups is M, the ratio $R_j = c_{j,max}/C_{max}$ is calculated therefor and transferred to step size generator circuit 160. A similar result can also be provided when the grand sum of the sum totals of the absolute coefficient values in each tap group is defined as $C_{max}$. Step size generator circuit 160 generates a step size using $R_j$ supplied from coefficient value evaluation circuit 130, and transfers the step size to corresponding output terminal $901_i$ (i=1, . . . , L). Step size $\mu_j$ is calculated in accordance with $\mu_j = \mu \times R_j$ from the result of a multiplication of $R_j$ by a predefined constant.

A correspondence relationship between j and i ($1 \leq i \leq L$) is calculated using a tap position control signal supplied from memory circuit 114 such that a step size used for updating coefficients belonging to an j-th tap group is equal to $\mu_j$. This method of calculating the step size permits a larger step size with which coefficients are updated in a tap group having large absolute coefficient values, resulting in a reduction in the convergence time of the adaptive filter. On the other hand, coefficient update control signal 602 received through input terminal 907 is multiplied by $\mu_j$, and the product is supplied to output terminals $901_1$-$901_N$ as an actual step size. In other words, the coefficient update is stopped when coefficient update control signal 602 is zero. The step sizes supplied to output terminals $901_1$-$901_N$ are transferred to corresponding coefficient generator circuits $30_i$.

Maximum value detector circuit 180 receives the "coefficient sum" and "order" from coefficient value evaluation circuit 130, and selects a maximum coefficient sum for transfer to output terminal 906. Specifically, the maximum coefficient sum is transferred to control circuit 71 in FIG. 8 as tap position information. Step size generator circuit 160 also receives step size control signal 602 through input terminal 907, and multiplies this by $\mu_j$. Therefore, the coefficient update is stopped when step size control signal 602 is zero.

Figure 12:
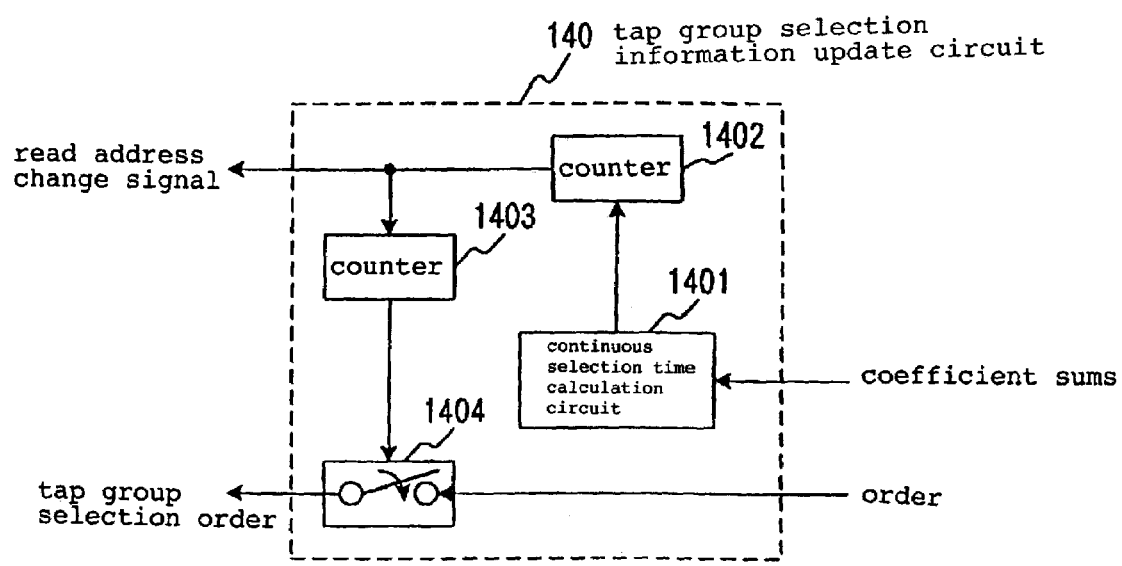
FIG. 12 is a block diagram illustrating the configuration of a tap group selection information update circuit included in the tap control circuit in the fifth embodiment of the present invention.

FIG. 12 is a block diagram illustrating the configuration of tap group selection information update circuit 140.

The "coefficient sum" supplied from coefficient value evaluation circuit 130 is transferred to continuous selection time calculation circuit 1401. Continuous selection time calculation circuit 1401 calculates a time for which each tap group is continuously selected in selector circuit 112 based on the "coefficient sum." Specifically, the setting is made such that a tap group having a larger sum total of absolute coefficient values is given a longer continuous selection time, and new active taps are set intensively in that tap group. For example, assuming in the previous example that the continuous selection time of a j-th tap group is $T_j$ (j=1, 2, 3, 4, 5), $T_j$ can be expressed by:

$$T_j = \frac{A_j}{A_{\max}} \cdot (T_{\max} - T_{\min}) + T_{\min} \tag{18}$$

as described in Reference 11. Here, $A_j$, $A_{max}$, $T_{max}$, $T_{min}$ are a sum total of absolute coefficient values in the j-th tap group, a maximum value of sum totals of absolute coefficient values in respective tap groups, and a maximum value and a minimum value of the tap group continuous selection times, respectively. Specifically, the continuous selection time for a tap group having the minimum sum total of absolute coefficient values is determined to be $T_{min}$; the continuous selection time for a tap group having the maximum sum total of absolute coefficient values is determined to be $T_{max}$; and the continuous selection times for other tap groups are determined corresponding to the sum totals of absolute coefficient values.

Generally, $T_j$ is represented by the number of coefficient updates, and this value is transferred to counter 1402. Counter 1402, which is a counter for counting the number of coefficient updates, supplies counter 1403 with a read address change signal each time the number of coefficient updates reaches $T_j$, and simultaneously transfers the read address change signal to memory circuit 150. Counter 1403 counts up each time the read address change signal is supplied thereto from counter 1402, transfers a signal to switch 1404 to instruct a change in a tap group selection order when it counts up to the total number M of tap groups, and resets the counted value to zero. Switch 1404 closes the circuit upon receipt of the signal instructing the same to change the tap group selection order, and delivers the tap group indexes supplied as the "order" from coefficient value evaluation circuit 130 in the order in which they are supplied thereto as a "tap group selection order." The delivered signals are written from the first address of memory circuit 150, and this write operation changes the order in which the tap group indexes held in memory circuit 150 are selected.

Input signal evaluation circuit 170 is supplied with input signal samples at the input of delay element 201 and at the outputs of $20_1$-$20_{N-1}$ through input terminals $904_0$-$904_{N-1}$. Input signal evaluation circuit 170 uses these input signal samples to evaluate input signal power. When the evaluated input signal power is smaller than a first predefined threshold value, input signal evaluation circuit 170 delivers a coefficient update stop signal. This coefficient update stop signal is transferred to step size generator circuit 160 and used for setting all step sizes to zero. Therefore, the step size transferred to coefficient generator circuits $30_1$-$30_L$ through output terminals $901_1$-$901_L$ is zero in such a case. In other words, though a coefficient update operation is performed, no coefficients are actually updated.

Input signal evaluation circuit 170 also feeds a tap position update stop signal when the evaluated input signal power is smaller than a second predefined threshold value. This tap position update stop signal is transferred to memory circuit 114, coefficient value evaluation circuit 130, tap group selection information update circuit 140, and minimum coefficient detector circuit 116, and used for stopping a tap position update. Upon receipt of the tap position update stop signal, memory circuit 114 stops an operation for replacing a tap index supplied from minimum coefficient detector circuit 116 with a tap index supplied from selector circuit 112. Upon receipt of the tap position update stop signal, coefficient value evaluation circuit 130 stops the calculations of the "coefficient sum" and "order" as well as the transfer of them to tap group selection information update circuit 140.

Upon receipt of the tap position update stop signal, tap group selection information update circuit 140 stops updating tap group selection information. Upon receipt of the tap position update stop signal, minimum coefficient detector circuit 116 stops detecting a tap index corresponding to a coefficient having a minimum absolute value, and transferring the detected index to memory circuit 114, evaluation circuit 120, distribution circuit 118, and coefficient clear circuit 122. A sequence of these stop operations results in stopping the update of the tap position.

Input signal evaluation circuit 170 also transfers the value itself of the evaluated input signal power to output terminal 909. This value is supplied to control circuit 71 and used for allocating the number of coefficient updates.

Figure 13:
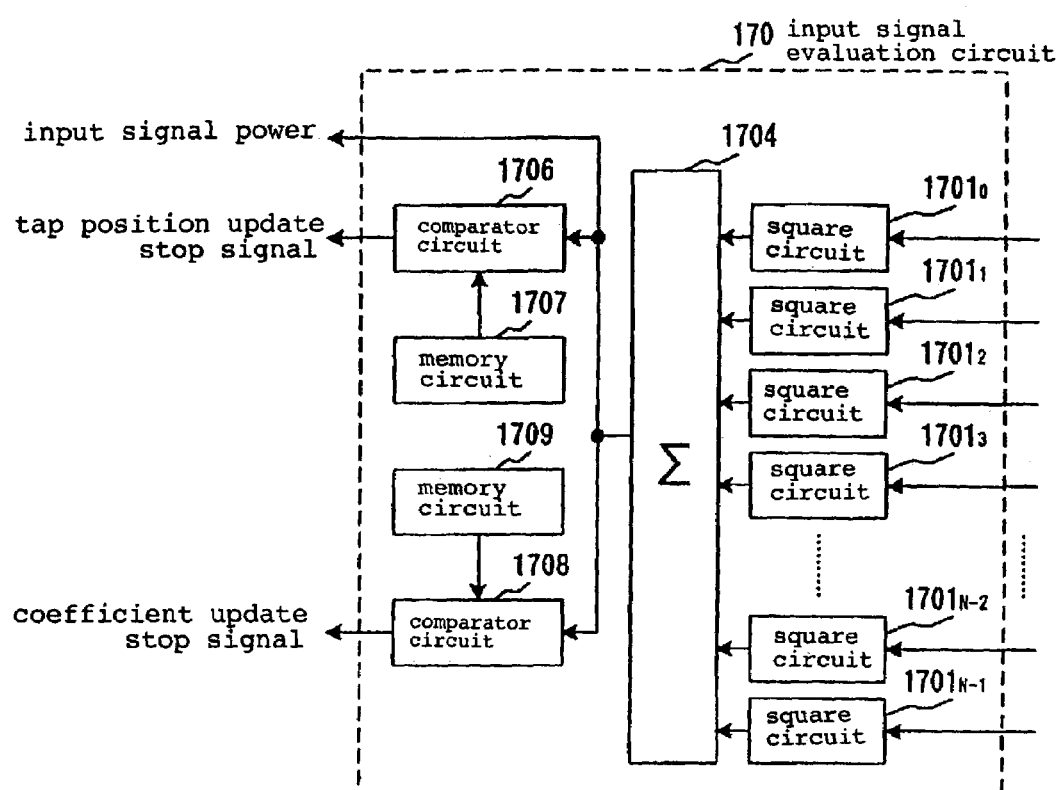
FIG. 13 is a block diagram illustrating the configuration of an input signal evaluation circuit included in the tap control circuit in the fifth embodiment of the present invention.

FIG. 13 is a block diagram illustrating the configuration of input signal evaluation circuit 170. Input signal samples at the input of delay element 201 and the outputs of $20_1$-$20_{N-1}$ supplied to input signal evaluation circuit 170 are all squared in square circuits $1701_0$-$1701_{N-1}$, and supplied to adder circuit 1704. Adder circuit 1704 adds all the squared input signal samples to find input signal power which is transferred to comparator circuit 1706 and comparator circuit 1708. Comparator circuit 1706 and comparator circuit 1708 compare the input signal power supplied from adder circuit 1704 with a first threshold value supplied from memory circuit 170 and a second threshold value supplied from memory circuit 1709, respectively. When the input signal power is smaller than the first threshold value, the tap position update stop signal is delivered as an output of comparator circuit 1706. When the input signal power is smaller than the second threshold value, the coefficient update stop signal is delivered as an output of comparator circuit 1708.

Also, the calculated input signal power is delivered as it is for use as information on the input signal intensity.

While the configuration and operation of adaptive filter 83 have been so far described with reference to FIG. 9, adaptive filters 84 and 85 in FIG. 8 are completely identical in configuration and operation to adaptive filter 83. Further, while FIG. 8 has been described for an example in which the number of adaptive filters is three, the exactly same description can be applied to the case where the number of adaptive filters is three or more.

A sixth embodiment of the present invention employs input signal evaluation circuit 171 instead of input signal evaluation circuit 170 in tap control circuit 91 of FIG. 11. Input signal evaluation circuit 171 uses input signal samples to evaluate absolute values of input signals. When a sum total of absolute values of the evaluated input signals is smaller than a first predefined threshold value, input signal evaluation circuit 171 delivers the coefficient update stop signal. Input signal evaluation circuit 171 also delivers the tap position update stop signal when the sum total of the absolute values of the evaluated input signals is smaller than a second predefined threshold value. Input signal evaluation circuit 171 further transfers the sum total of the absolute values of the evaluated input signals to output terminal 909. This value is supplied to control circuit 71 and used for allocating the number of coefficient updates.

Figure 14:
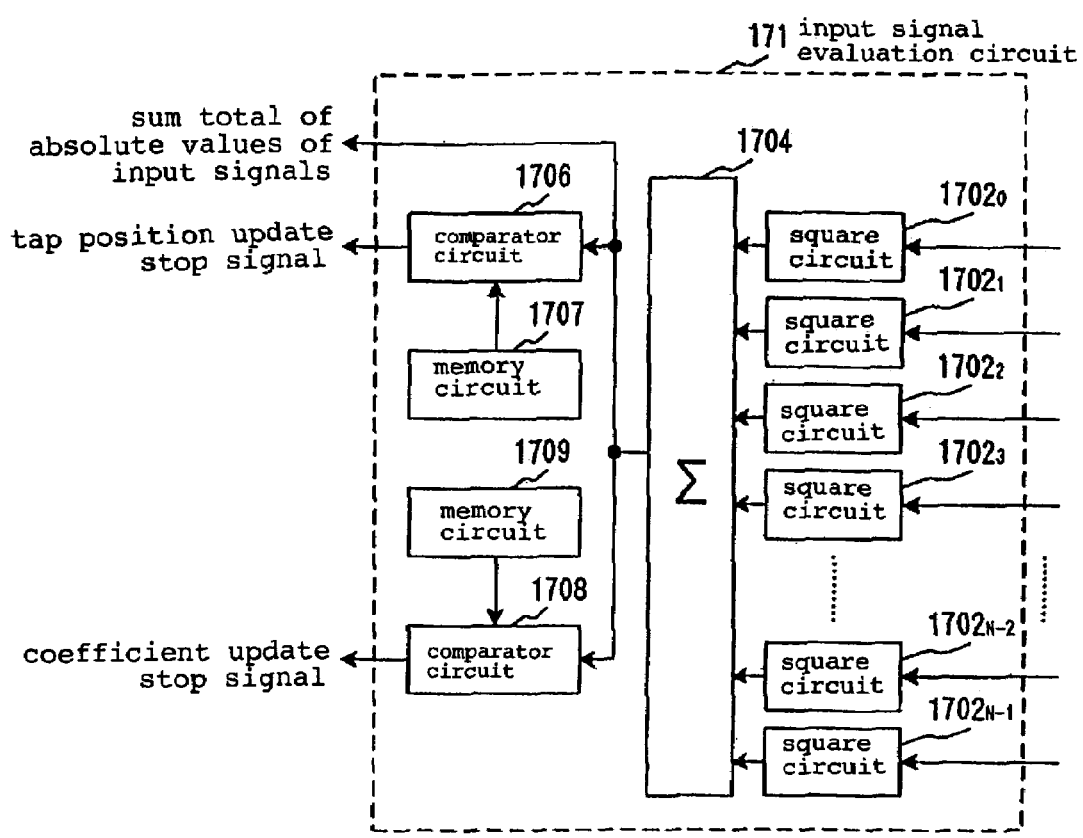
FIG. 14 is a block diagram illustrating the configuration of an input signal evaluation circuit according to a sixth embodiment of the present invention.

FIG. 14 is a block diagram illustrating input signal evaluation circuit 171 in detail. A difference between input signal evaluation circuit 171 and input signal evaluation circuit 170 lies in that square circuits $1701_0$-$1701_{N-1}$ in input signal evaluation circuit 170 are all replaced with absolute value circuits $1702_0$-$1702_{N-1}$. Specifically, signals supplied to adder circuit 1704 are not squared values of input signal samples but are absolute values of the same. Therefore, adder circuit 1704 adds all the absolute values of the input signal samples to find a sum total of absolute values of the input signals which is transferred to comparator circuit 1706 and comparator circuit 1708. The sum total of the absolute values of the evaluated input signals is also delivered as it is, and utilized as information on the input signal intensity.

Since the configuration and operation other than the foregoing are identical to those of input signal evaluation circuit 170, description thereon is omitted.

The seventh embodiment of the present invention employs input signal evaluation circuit 172 instead of input signal evaluation circuit 170 in tap control circuit 91 of FIG. 11. Input signal evaluation circuit 172 holds the coefficient update stop signal and tap position update stop signal generated in the same configuration and operation as input signal evaluation circuit 170 for a predefined time, and then releases the signals. By this holding operation, a coefficient update and a tap position update are stopped for a while after the coefficient update stop signal and tap position update stop signal are delivered. Input signal evaluation circuit 172 also transfers the evaluated input signal power to output terminal 909. This value is supplied to control circuit 71 and used for allocating the number of coefficient updates.

Figure 15:
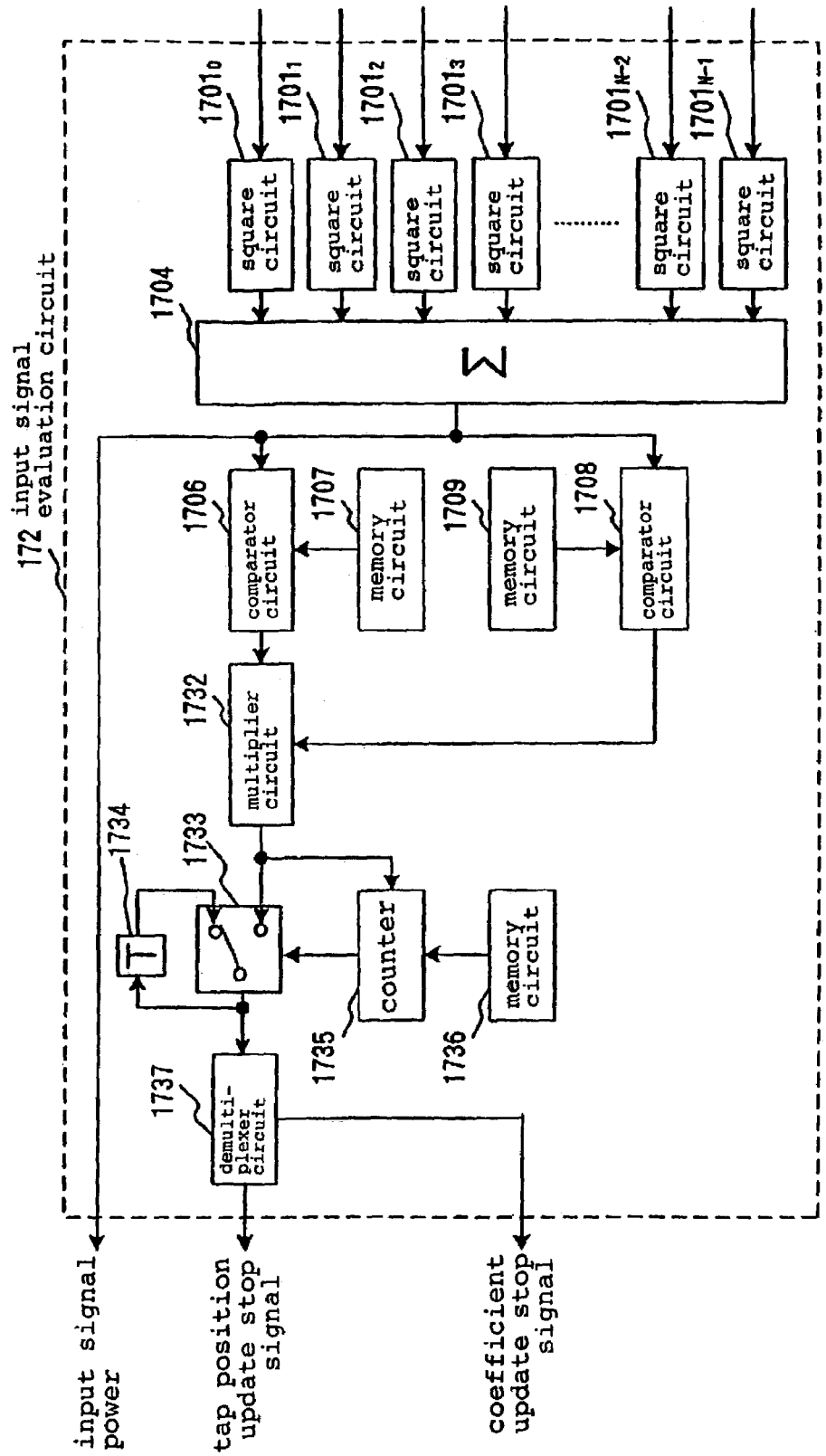
FIG. 15 is a block diagram illustrating the configuration of an input signal evaluation circuit according to a seventh embodiment of the present invention.

FIG. 15 is a block diagram illustrating input signal evaluation circuit 172 in detail. A difference between input signal evaluation circuit 172 and input signal evaluation circuit 170 illustrated in FIG. 13 lies in that output signals of comparator circuit 1706 and comparator circuit 1708 are further processed in multiplier circuit 1732, memory circuit 1736, counter 1735, switch 1733, delay element 1734, and demultiplexer circuit 1737. The coefficient update stop signal delivered from comparator circuit 1706 and the tap position update stop signal delivered from comparator circuit 1708 are supplied to multiplexer circuit 1732. Multiplexer circuit 1732 multiplexes the coefficient update stop signal and tap position update stop signal to generate a multiplexed signal which is supplied to one input terminal of switch 1733 and to counter 1735. The other input terminal of switch 1733 is fed back with an output signal of switch 1733 through delay element 1734. Specifically, the output of switch 1733 is held when switch 1733 selects this feedback path, and a new multiplexed signal is delivered when it selects the other input terminal. Demultiplexer circuit 1737 receives the output of switch 1733, demultiplexes this into the coefficient update stop signal and tap position update stop signal, and then delivers them in separation. Switch 1733 is controlled by counter 1735.

Counter 1735 resets a count as it is supplied with the multiplexed signal from multiplexer circuit 1732, and starts counting up. Also, counter 1735 simultaneously switches the path such that switch 1733 selects and delivers a feedback signal supplied from delay element 1734. The count-up is performed with a clock which has a frequency equal to the sampling frequency of the input signal. Counter 1735 delivers a switching signal when the count value is equal to a value supplied from memory circuit 1736. Upon receipt of the switching signal from counter 1735, switch 1733 switches the path to select and deliver the multiplexed signal supplied from multiplexer circuit 1732. Also, the evaluated input signal power is delivered as it is, and utilized as information on the input signal intensity. Since the configuration and operation other than the foregoing are identical to those of input signal evaluation circuit 170, description thereon is omitted.

An eighth embodiment of the present invention uses input signal evaluation circuit 173 instead of input signal evaluation circuit 172 in tap control circuit 91 of FIG. 11. Input signal evaluation circuit 173 uses input signal samples to evaluate absolute values of input signals. When a calculated sum total of the absolute values of the input signals is smaller than a first predefined threshold value, input signal evaluation circuit 173 delivers a coefficient update stop signal. Also, when the calculated sum total of the absolute values of the input signals is smaller than a second predefined threshold value, input signal evaluation circuit 173 delivers a tap position update stop signal. Input signal evaluation circuit 173 further transfers the calculated sum total of the absolute values of the input signals to output terminal 909. This value is supplied to control circuit 71, and used for allocating the number of coefficient updates.

Figure 16:
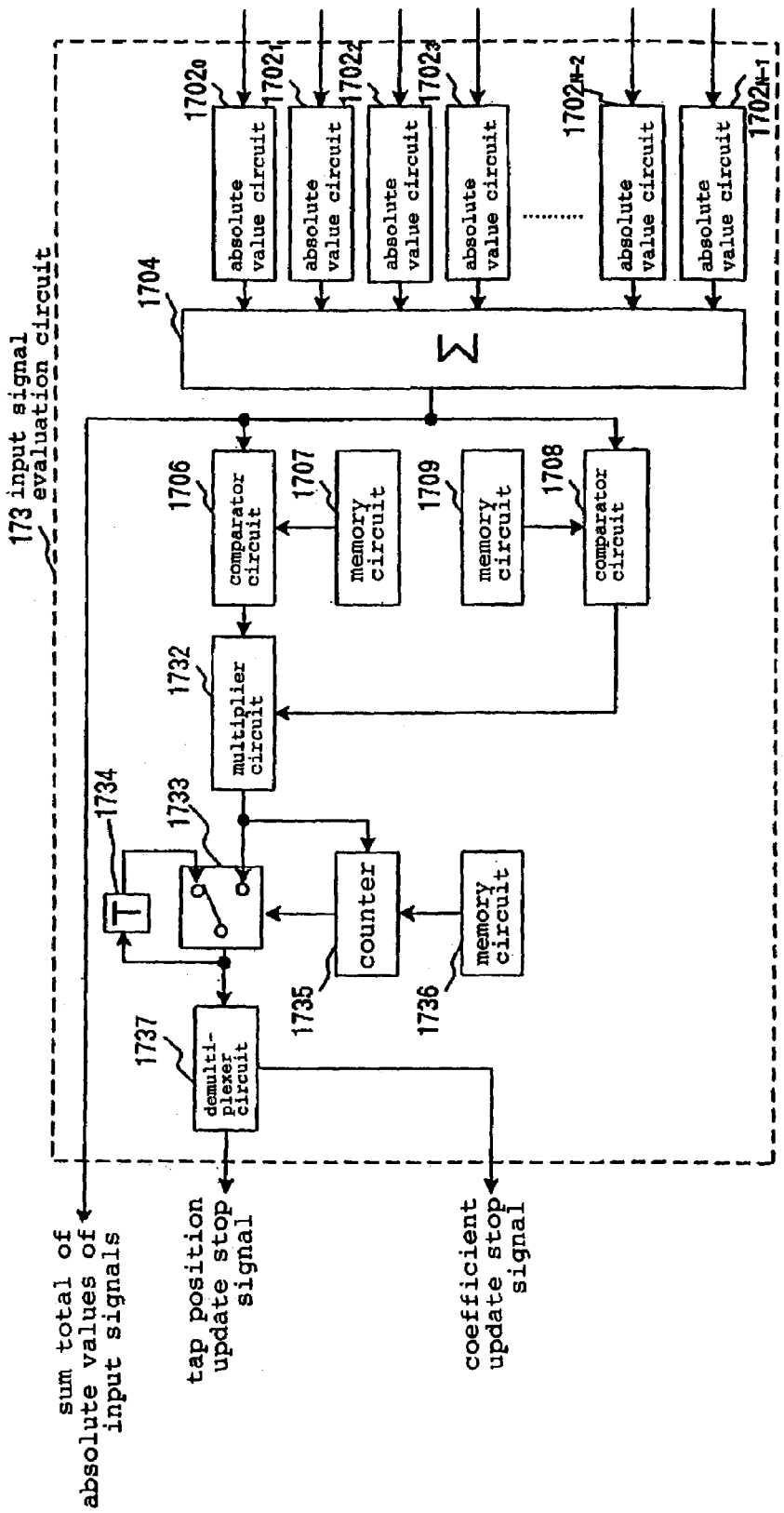
FIG. 16 is a block diagram illustrating the configuration of an input signal evaluation circuit according to an eighth embodiment of the present invention.

FIG. 16 is a block diagram illustrating input signal evaluation circuit 173 in detail. A difference between input signal evaluation circuit 173 and input signal evaluation circuit 172 lies in that square circuits $1701_0$-$1701_{N-1}$ in input signal evaluation circuit 172 are all replaced with absolute value circuits $1702_0$-$1702_{N-1}$. Specifically, signals supplied to adder circuit 1704 are not squared values of input signal samples but are absolute values of the same.

Therefore, adder circuit 1704 adds all the absolute values of the input signal samples to find a sum total of absolute values of the input signals which is transferred to comparator circuit 1706 and comparator circuit 1708. The sum total of the absolute values of the evaluated input signals is also delivered as it is and utilized as information on the input signal intensity.

Since the configuration and operation other than the foregoing are identical to those of input signal evaluation circuit 170, description thereon is omitted.

In FIGS. 15 and 16, the coefficient update stop signal and tap position update stop signal are multiplexed to generate a multiplexed signal which is supplied to one input terminal of switch 1733. Alternatively, they may be independently supplied to one input terminal of switch 1733 without being multiplexed. In this event, multiplexer circuit 1732 and demultiplexer circuit 1737 are not required, whereas other circuits are newly required for holding these stop signals in the exactly same configuration as memory circuit 1736, counter 1735, switch 1733, and delay element 1734.

In the foregoing description, the inputs to input signal evaluation circuit 170, input signal evaluation circuit 171, input signal evaluation circuit 172, and input signal evaluation circuit 173 are all processed and added in adder circuit 1704. Alternatively, a configuration may be possible for adding only some of them. For example, adder circuit 1704 comprised in input signal evaluation circuit 170 may add outputs of square circuits $1701_0$-$1701_{K-1}$ instead of $1701_0$-$1701_{N-1}$, and deliver the sum, where k is a positive integer smaller than N. Alternatively, instead of the outputs of square circuits $1701_0$-$1701_{N-1}$, outputs of $1701_K$-$1701_{N-1}$ may be added and delivered. Further alternatively, instead of the outputs of square circuits $1701_0$-$1701_{N-1}$, k arbitrary outputs may be selected from $1701_0$-$1701_{N-1}$, and added, followed by delivery of the sum.

As an example, assume that adder circuit 1704 comprised in input signal evaluation circuit 172 adds outputs of square circuits $1701_0$-$1701_{N/M-1}$ instead of $1701_0$-$1701_{N-1}$. These are input signal samples supplied to delay elements corresponding to the first tap group. These samples are evaluated in input signal evaluation circuit 172, thereby making it possible to promptly detect that a silent section has reached a tapped delay line comprised of delay elements $20_1$-$20_{N-1}$. Upon detection of the arrival of the silent section, the coefficient update stop signal and tap position update stop signal are held for a time defined by a value stored in memory circuit 1736, so that the coefficient update and tap position update can be stopped until the silent section passes through the tapped delay line. In this event, the value stored in memory circuit 1736 is a value slightly larger than N which is equal to the total number of delay elements.

Figure 17:
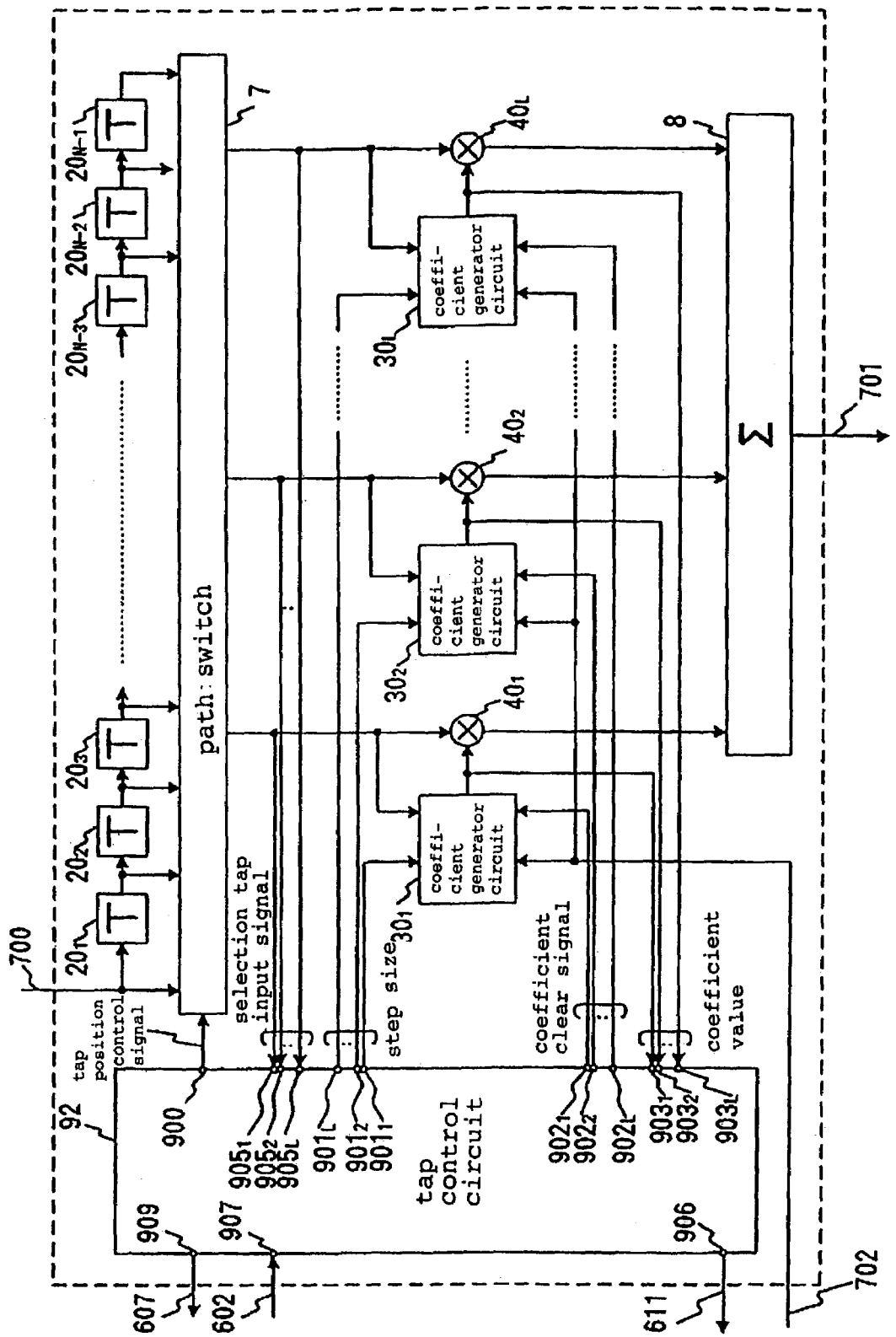
FIG. 17 is a block diagram illustrating an adaptive filter according to a ninth embodiment of the present invention.

FIG. 17 is a block diagram illustrating a ninth embodiment of the present invention. A difference between the fifth embodiment and ninth embodiment lies in that tap control circuit 91 in FIG. 11 is replaced with tap control circuit 92 in FIG. 17. Tap control circuit 91 evaluates an input of delay element $20_1$ and outputs of $20_1$-$20_{N-1}$ received through input terminals $904_0$-$904_{N-1}$ to stop a coefficient update and a tap position update, whereas tap control circuit 92 evaluates input signal samples corresponding to active taps received through input terminals $905_1$-$905_L$ to stop the coefficient update and tap position update. For this purpose, input terminals $905_1$-$905_L$ of tap control circuit 92 are supplied with input signal samples corresponding to active taps.

Figure 18:
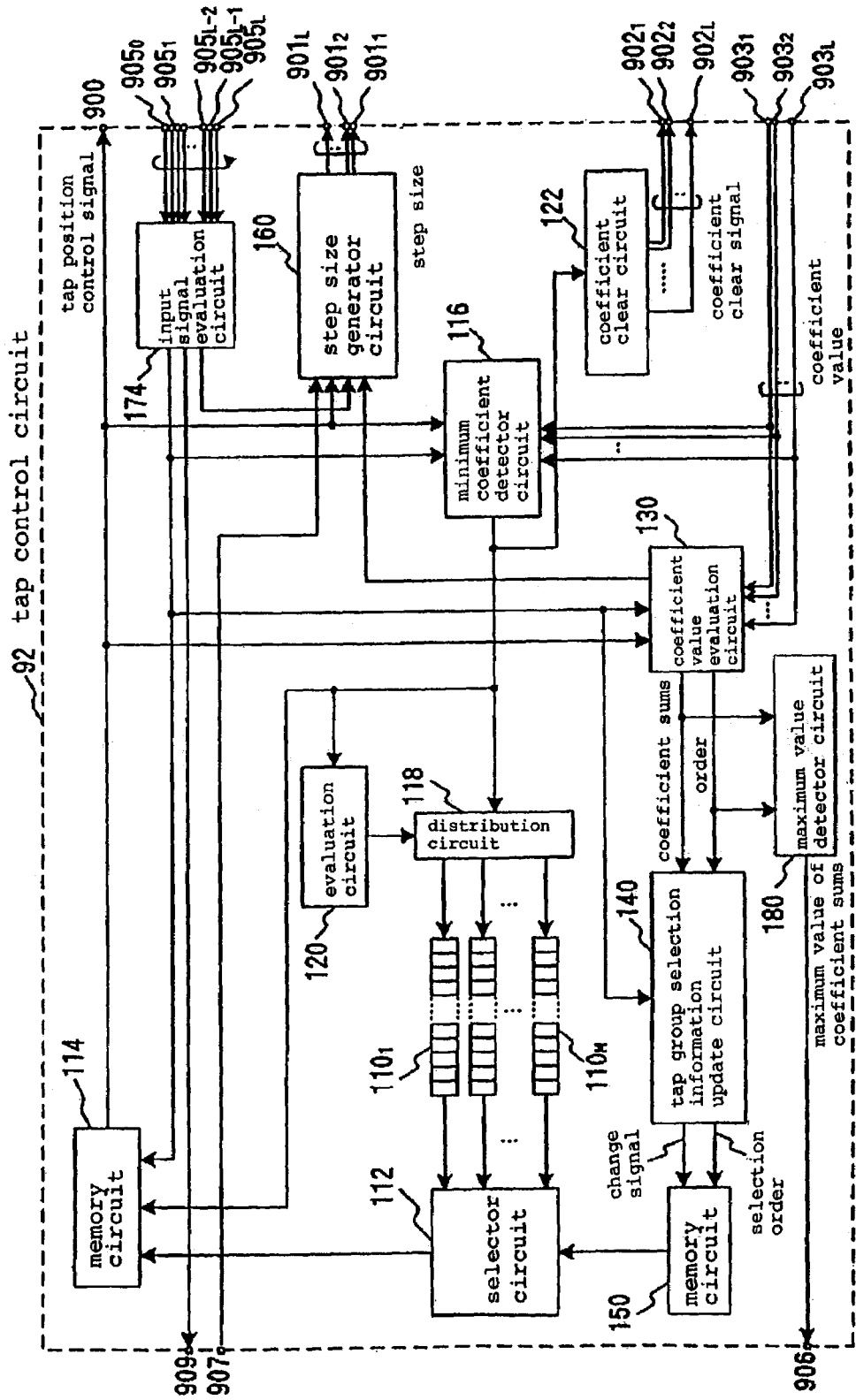
FIG. 18 is a block diagram illustrating the configuration of a tap control circuit included in the adaptive filter according to the ninth embodiment of the present invention.

FIG. 18 is a block diagram illustrating the configuration of tap control circuit 92. Since tap control circuit 92 is identical to FIG. 11 which is a block diagram of tap control circuit 91 except that input signal evaluation circuit 170 is replaced with input signal evaluation circuit 174, detailed operations described below will be centered on the difference.

Input signal evaluation circuit 174 is supplied with input signal samples at outputs of delay elements $20_i$ through input terminals $905_1$-$905_L$. The actual value of i is defined by path switch 7. Input signal evaluation circuit 174 uses these input signal samples to evaluate input signal power. When the evaluated input signal power is smaller than a first predefined threshold value, input signal evaluation circuit 174 delivers a coefficient update stop signal. Also, when the evaluated input signal power is smaller than a second predefined threshold value, input signal evaluation circuit 174 delivers a tap position update stop signal.

Input signal evaluation circuit 174 also transfers the evaluated input signal power to output terminal 909. This value is supplied to control circuit 71 and used for distributing the number of coefficient updates. Since the operations for stopping the coefficient update and tap position update using the coefficient update stop signal and tap position update stop signal are completely identical to those of input signal evaluation circuit 170, description thereon is omitted.

The configuration of input signal evaluation circuit 170 illustrated in FIG. 13 can be used as it is for the configuration of input signal evaluation circuit 174. It should be noted that N square circuits $1701_0$-$1701_{N-1}$ are disposed in FIG. 13 because there are N types of inputs, whereas input signal evaluation circuit 174 needs only L square circuits $1701_0$-$1701_{L-1}$.

Also, it goes without saying that the configurations illustrated in FIGS. 14, 15, 16 can also be used for the configuration of input signal evaluation circuit 174 when the number of square circuits and absolute value circuit is increased or decreased in a similar manner. Further, only some of inputs supplied to and processed by input signal evaluation circuit 174 may be added in adder circuit 1704, as is the case with input signal evaluation circuit 170.

Figure 19:
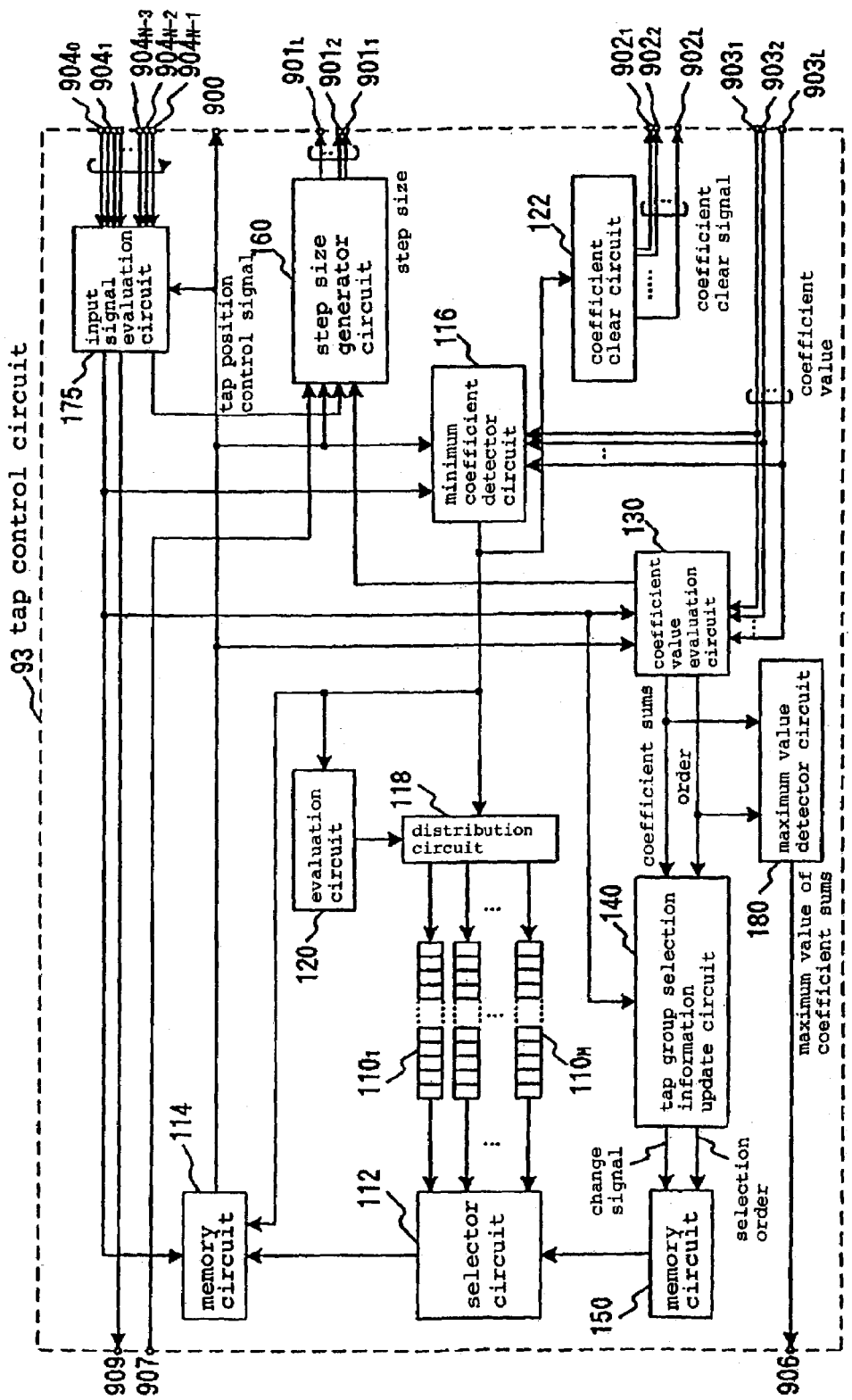
FIG. 19 is a block diagram illustrating the configuration of a tap control circuit included in the adaptive filter according to a tenth embodiment of the present invention.

A tenth embodiment of the present invention is provided by substituting tap control circuit 93 for tap control circuit 91 described in the block diagram illustrating the fifth embodiment of the present invention shown in FIG. 11. FIG. 19 is a block diagram illustrating the configuration of tap control circuit 93. Since FIG. 19 is identical to FIG. 18 except that input signal evaluation circuit 174 is replaced with input signal evaluation circuit 175, the detailed operations described below will be centered on the difference.

Input signal evaluation circuit 174 in FIG. 18 receives input signal samples supplied to active taps from path switch 7 to evaluate the input signal power. Based on the result of the evaluation, input signal evaluation circuit 174 delivers a coefficient update stop signal and a tap position update stop signal. On the other hand, input signal evaluation circuit 175 in FIG. 19 receives input signal samples at an input of delay element $20_1$ and outputs of $20_1$-$20_{N-1}$ to evaluate input signal power, and outputs a coefficient update stop signal and a tap position update stop signal based on the result of the evaluation, in a manner similar to input signal evaluation circuit 174. In this event, input signal evaluation circuit 175 selectively uses only input signal samples supplied from delay elements corresponding to active taps.

For this reason, input signal evaluation circuit 175 is supplied with a tap position control signal from memory circuit 114. Stated another way, input signal evaluation circuit 174 and input signal evaluation circuit 175 are different in configuration but equal in operation, and signals delivered therefrom are also compatible. Since components other than input signal evaluation circuit 175 in tap control circuit 93 are completely identical to components except for input signal evaluation circuit 174 in tap control circuit 92, without any difference in operation, detailed description thereon is omitted.

An eleventh embodiment of the present invention is provided by substituting tap control circuit 94 for tap control circuit 92 described in the block diagram illustrating the ninth embodiment of the present invention shown in FIG. 18. Since a difference between the eleventh embodiment and ninth embodiment of the present invention lies only in tap control circuit 94, tap control circuit 94 will be described below with reference to FIG. 20.

Figure 20:
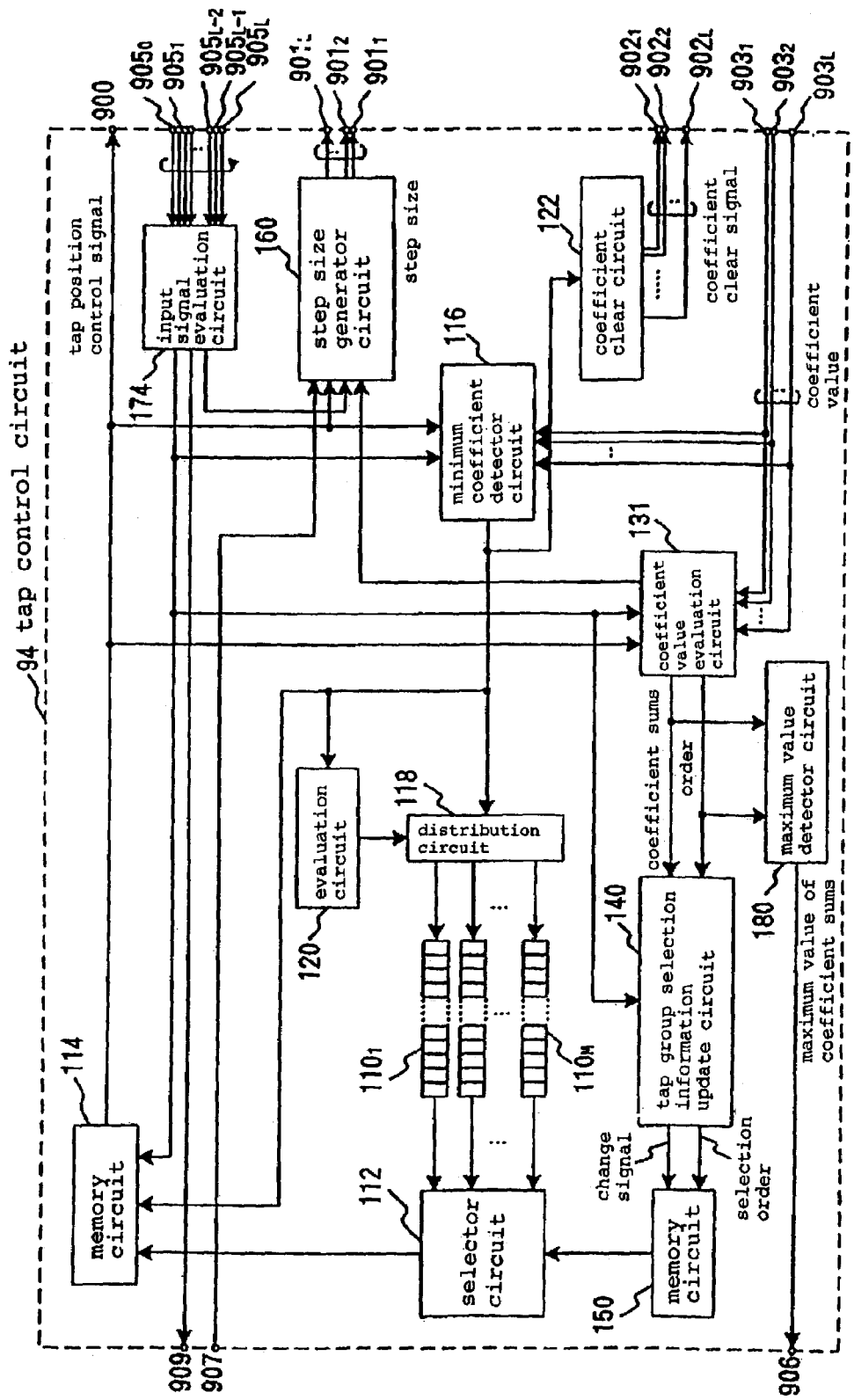
FIG. 20 is a block diagram illustrating the configuration of a tap control circuit included in the adaptive filter according to an eleventh embodiment of the present invention.

FIG. 20 is block diagram illustrating the configuration of tap control circuit 94. Since FIG. 20 is identical to FIG. 18 which is the block diagram of tap control circuit 92 except that coefficient value evaluation circuit 130 is replaced with coefficient value evaluation circuit 131, detailed operation described below will be centered on the difference.

Coefficient value evaluation circuit 130 in FIG. 18 calculates a sum total of absolute coefficient values for each tap group as the "coefficient sum," whereas coefficient value evaluation circuit 131 in FIG. 20 calculates a sum total of squared coefficient values for each tap group. The calculated sum total of the squared coefficient values is transferred to tap group selection information update circuit 140. Also, the ratio $R_j$ transferred to step size generator circuit 160 is calculated in accordance with $R_j=C_{j,max}/C_{max}$, where $C_{j,max}$ is the sum total of the squared coefficient values $(1 \leq j \leq M)$ without using sum totals of absolute coefficient values in respective tap groups. $C_{max}$ is a maximum value of the sum totals of squared coefficient values in the respective tap groups. Since components other than coefficient value evaluation circuit 131 in tap control circuit 94 are completely identical to components other than coefficient value evaluation circuit 130 in tap control circuit 92, without any difference in operation, detailed description will be omitted. Basically, the description on tap control circuit 92 can be applied to the description on tap control circuit 94 by replacing the absolute coefficient values with the squared coefficient values.

Figure 21:
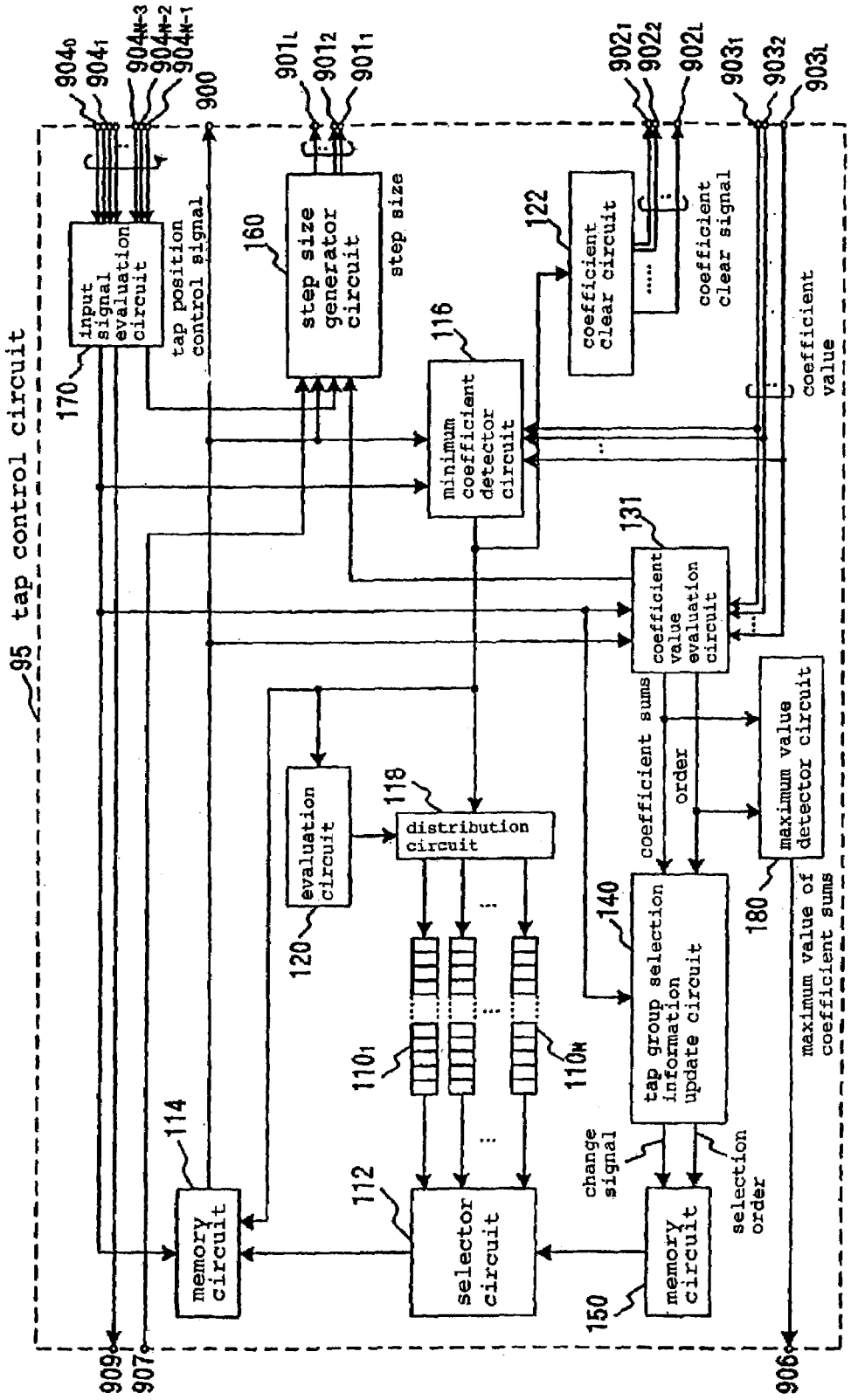
FIG. 21 is a block diagram illustrating the configuration of a tap control circuit included in the adaptive filter according to a twelfth embodiment of the present invention.

A twelfth embodiment of the present invention is provided by substituting tap control circuit 95 illustrated in FIG. 21 for tap control circuit 91 described in the block diagram illustrating the fifth embodiment of the present invention shown in FIG. 11. A difference between the twelfth embodiment and fifth embodiment of the present invention lies only in tap control circuit 95. Also, the relationship between tap control circuit 91 and tap control circuit 95 is equal to the relationship between tap control circuit 92 and tap control circuit 94, as previously described with reference to FIG. 19, so that detailed description thereon will be omitted.

A thirteenth embodiment of the present invention is provided by substituting tap control circuit 96 for tap control circuit 92 described in the block diagram illustrating the ninth embodiment of the present invention shown in FIG. 18. Since a difference between the thirteenth embodiment and ninth embodiment of the present invention lies only in tap control circuit 96, tap control circuit 96 will be described below with reference to FIG. 22.

Figure 22:
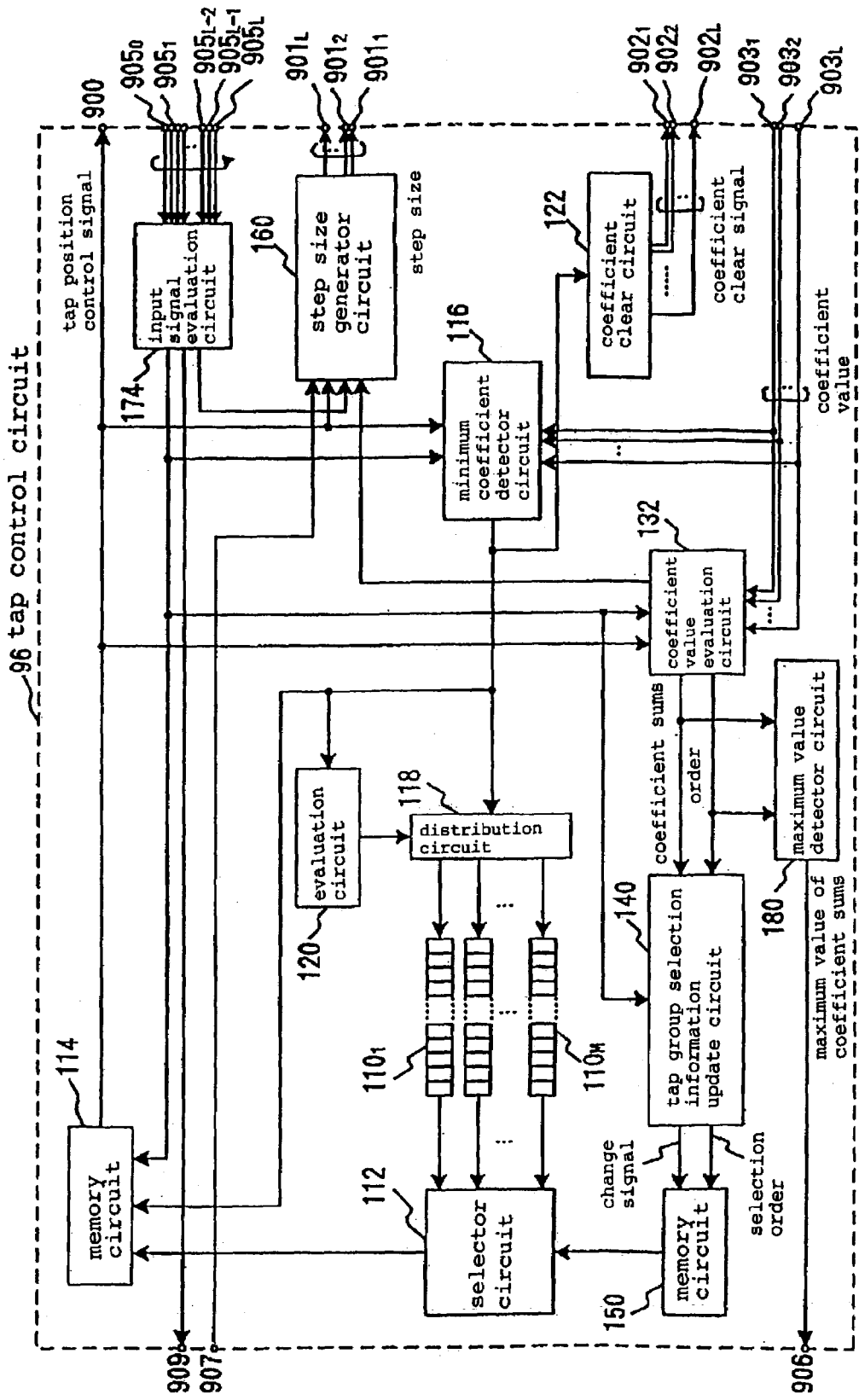
FIG. 22 is a block diagram illustrating the configuration of a tap control circuit included in the adaptive filter according to a thirteenth embodiment of the present invention.

FIG. 22 is a block diagram illustrating the configuration of tap control circuit 96. Since FIG. 22 is identical to FIG. 18 which is the block diagram of tap control circuit 92 except for coefficient value evaluation circuit 130 and maximum coefficient detector circuit 132, detailed operation described below will be centered on the difference. Coefficient value evaluation circuit 130 calculates a sum total of absolute coefficient values for each tap group as the "coefficient sum," whereas maximum coefficient detector circuit 132 detects a coefficient value having a maximum absolute value for each tap group. The detected maximum absolute coefficient value is transferred to tap group selection information update circuit 140 as a "maximum coefficient value." A time during which each tap group is continuously selected is calculated based on the "maximum coefficient value" instead of the "coefficient sum." Also, these M maximum values are rearranged according to the magnitude, and corresponding tap group indexes are transferred to tap group selection information update circuit 140 as the "order."

Maximum coefficient detector circuit 132 calculates the ratio of a maximum value $C_{max}$ of maximum coefficient values in respective tap groups to a maximum coefficient value in each tap group. For example, assuming that the maximum coefficient value in each tap group is $c_{j,max}$ $(1 \leq j \leq M)$ when the number of tap groups is M, the ratio $R_j=c_{j,max}/C_{max}$ is calculated therefor and transferred to step size generator circuit 160. A similar result can also be provided when a sum total of the maximum coefficient values in each tap group is defined as $C_{max}$.

Since components other than maximum coefficient detector circuit 132 in tap control circuit 96 are completely identical to components other than coefficient value evaluation circuit 130 in tap control circuit 92, without any difference in operation, detailed description thereon is omitted. Basically, the description on tap control circuit 92 can be applied to the description on tap control circuit 96 by replacing the sum total of absolute coefficient values with the maximum absolute coefficient value.

Figure 23:
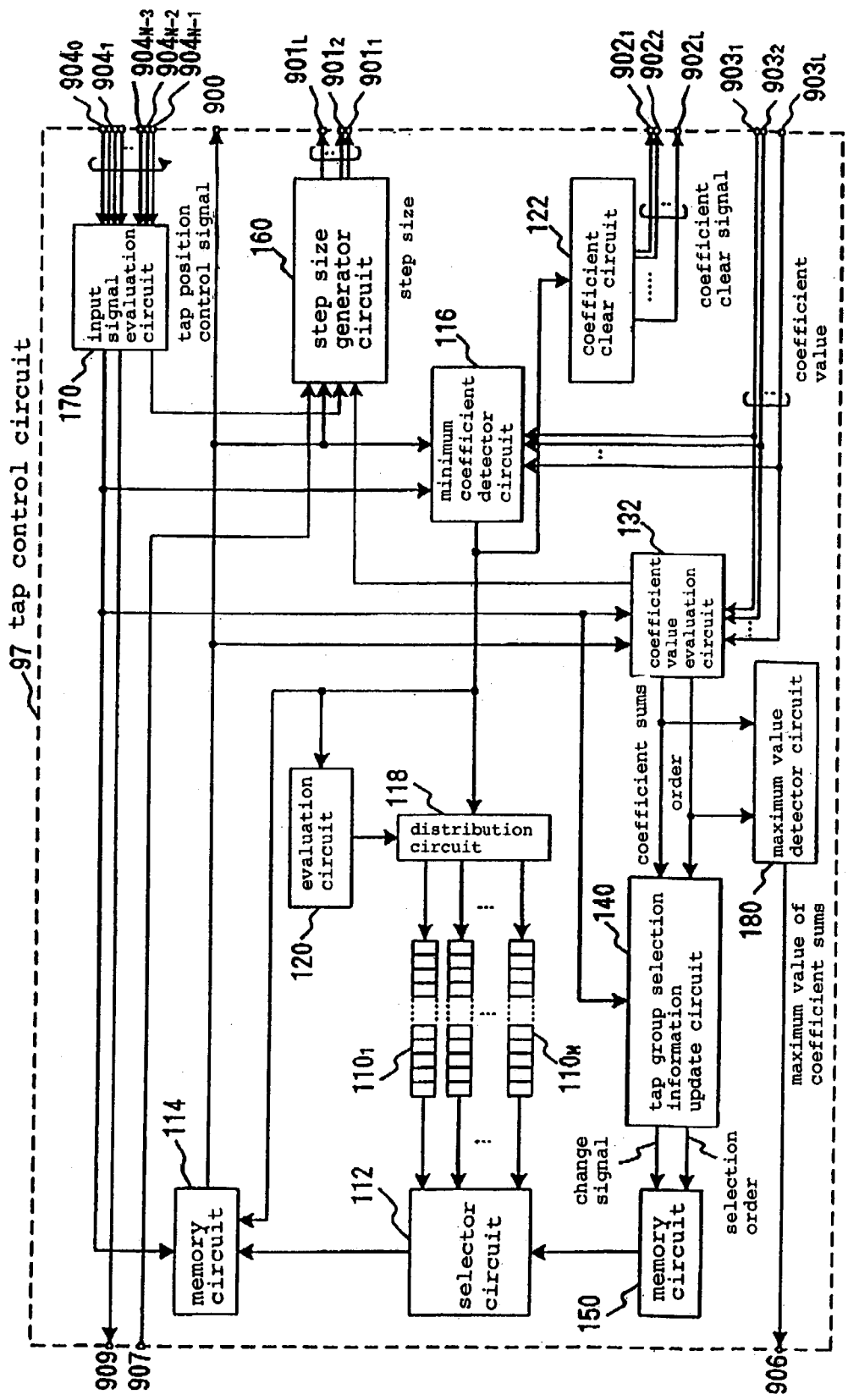
FIG. 23 is a block diagram illustrating the configuration of a tap control circuit included in the adaptive filter according to a fourteenth embodiment of the present invention.

A fourteenth embodiment of the present invention is provided by substituting tap control circuit 97 illustrated in FIG. 23 for tap control circuit 91 described in the block diagram illustrating the fifth embodiment of the present invention shown in FIG. 11. A difference between the fourteenth embodiment and fifth embodiment of the present invention lies only in tap control circuit 97. Also, the relationship between tap control circuit 91 and tap control circuit 97 is equal to the relationship between tap control circuit 92 and tap control circuit 96, as previously described with reference to FIG. 22, so that detailed description thereon will be omitted.

A fifteenth embodiment of the present invention is provided by substituting tap control circuit 98 for tap control circuit 92 described in the block diagram illustrating the ninth embodiment of the present invention shown in FIG. 18. Since a difference between the fifteenth embodiment and ninth embodiment of the present invention lies only in tap control circuit 98, tap control circuit 98 will be described below with reference to FIG. 24.

Figure 24:
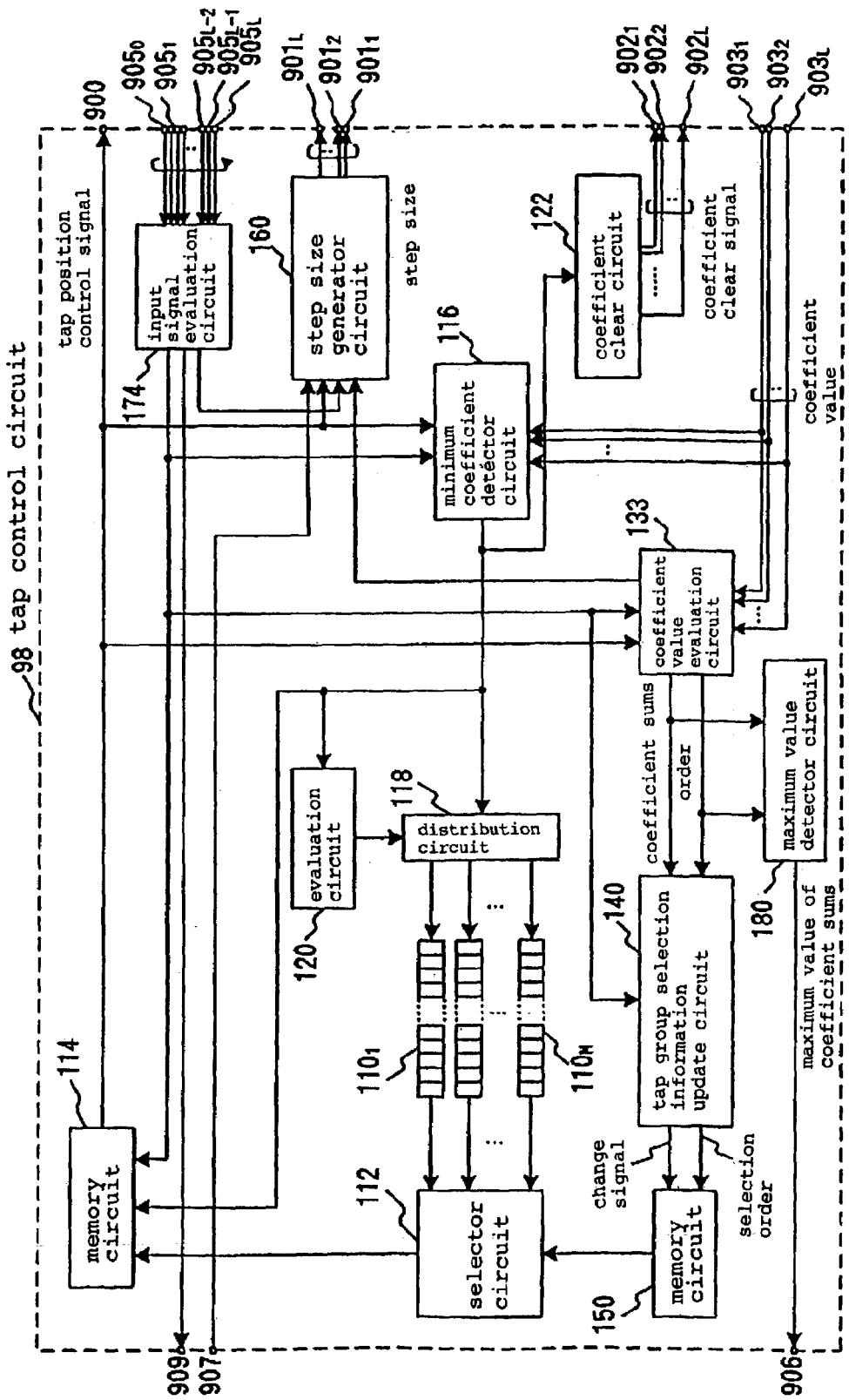
FIG. 24 is a block diagram illustrating the configuration of a tap control circuit included in the adaptive filter according to a fifteenth embodiment of the present invention.

FIG. 24 is a block diagram illustrating the configuration of tap control circuit 98. Since FIG. 24 is identical to FIG. 18 which is the block diagram of tap control circuit 92 except for coefficient value evaluation circuit 130 and active tap number evaluation circuit 133, detailed operations described below will be centered on the difference.

Coefficient value evaluation circuit 130 in FIG. 18 calculates a sum total of absolute coefficient values for each tap group as the "coefficient sum," whereas active tap number evaluation circuit 133 detects the number of active taps for each tap group. The detected number of active taps is transferred to tap group selection information update circuit 140 as a "number". Tap group selection information update circuit 140 calculates a time for which each tap group is continuously selected based on the "number" instead of the "coefficient sum."

Active tap number evaluation circuit 133 also calculates the ratio of a maximum value $C_{max}$ of the numbers of active taps in the respective tap groups to the number of active taps in each tap group. For example, assuming that the number of active taps in each tap group is $c_{j,max}$ ($1 \leq j \leq M$) when the number of tap groups is M, the ratio $R_j = c_{j,max}/C_{max}$ is calculated therefor and transferred to step size generator circuit 160. A similar result can also be provided when the total number of the active taps in each tap group is defined as $C_{max}$.

Since components other than active tap number evaluation circuit 133 in tap control circuit 98 are completely identical to components other than coefficient value evaluation circuit 130 in tap control circuit 92, without any difference in operation, detailed description thereon is omitted. Basically, the description on tap control circuit 92 can be applied to the description on tap control circuit 98 by replacing the absolute coefficient values with the number of active taps.

Figure 25:
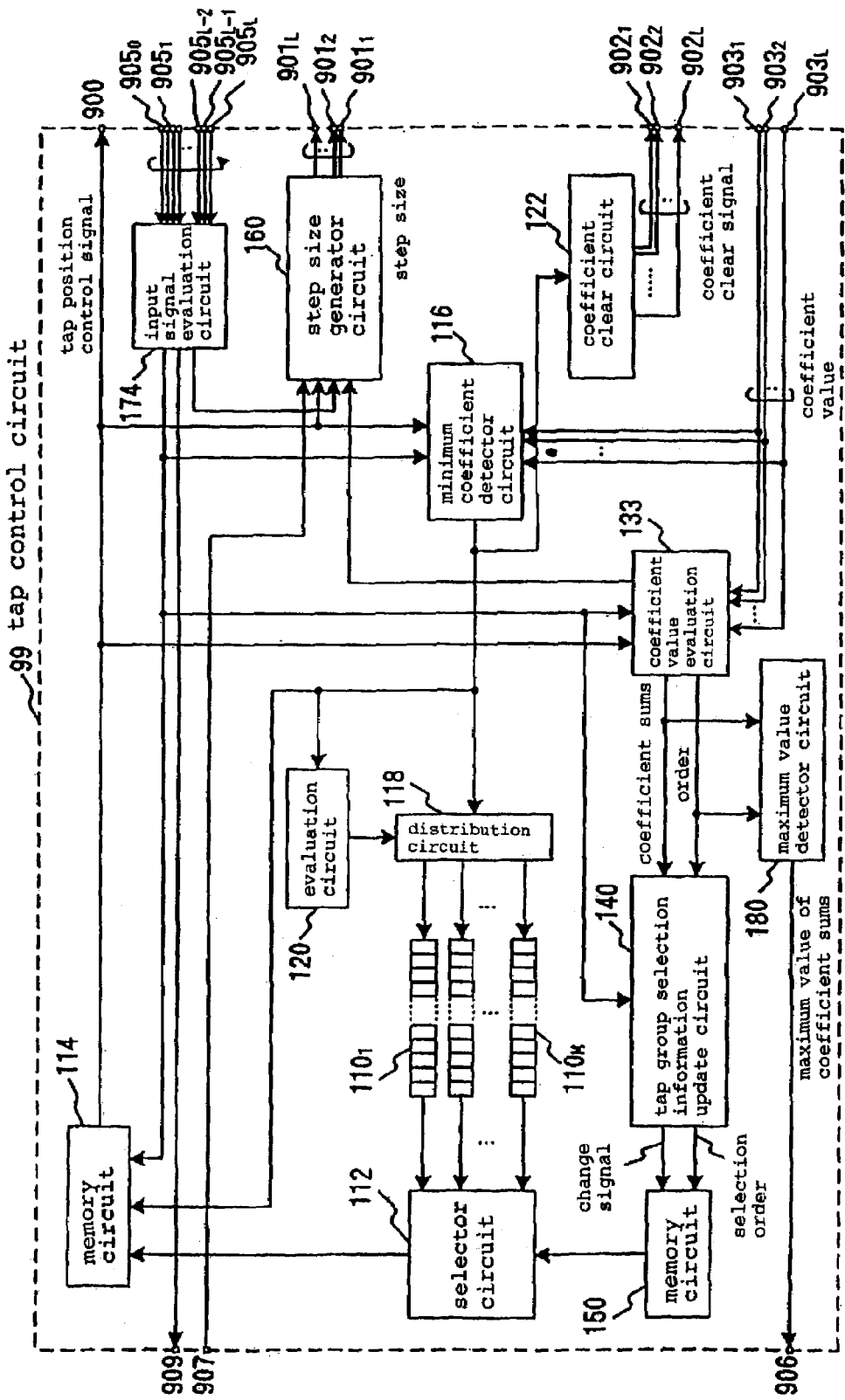
FIG. 25 is a block diagram illustrating the configuration of a tap control circuit included in the adaptive filter according to a sixteenth embodiment of the present invention.

The sixteenth embodiment of the present invention is provided by substituting tap control circuit 99 illustrated in FIG. 25 for tap control circuit 91 described in the block diagram illustrating the fifth embodiment of the present invention shown in FIG. 11. A difference between the fifteenth embodiment and fifth embodiment of the present invention lies only in tap control circuit 99. Also, the relationship between tap control circuit 91 and tap control circuit 99 is equal to the relationship between tap control circuit 92 and tap control circuit 98, as previously described with reference to FIG. 24, so that detailed description thereon will be omitted.

In the description on the fifth to sixteenth embodiments of the present invention, coefficient value evaluation circuit 131, maximum coefficient detector circuit 132, and active tap number evaluation circuit 133 have been described as coefficient value evaluation circuit 130 and equivalent circuits thereof. The basic operation of these circuits involves receiving active taps and their coefficient values from memory circuit 114 and input terminals $903_1$-$903_L$, and transferring to tap group selection information update circuit 140 the values of first evaluation indexes as well as the indexes on respective tap groups in the decreasing order. The basic operation of these circuits also includes representing the degree of non-uniformity for the value of a second evaluation index on each tap group as the ratio of a total sum of the second evaluation indexes to the second evaluation index of each tap group or the ratio of a maximum value of the second evaluation indexes with the second evaluation index of each tap group, and transferring the ratio to step size generator circuit 160.

The foregoing description has shown a sum total of absolute coefficient values, a sum total of squared coefficient values, a maximum value of absolute coefficient values, and the number of active taps as examples of the first evaluation index and second evaluation index. Also, the description has been made on the assumption that these indexes are identical. However, it is also possible to use an index other than those shown as examples, and to employ a first evaluation index different from a second evaluation index. Next described is an exemplary combination of such different first evaluation index and second evaluation index.

A seventeenth embodiment of the present invention is provided by substituting tap control circuit 100 for tap control circuit 92 described in the block diagram illustrating the ninth embodiment of the present invention shown in FIG. 18. Since a difference between the seventeenth embodiment and eighth embodiment of the present invention lies only in tap control circuit 100, tap control circuit 100 will be described below with reference to FIG. 26.

Figure 26:
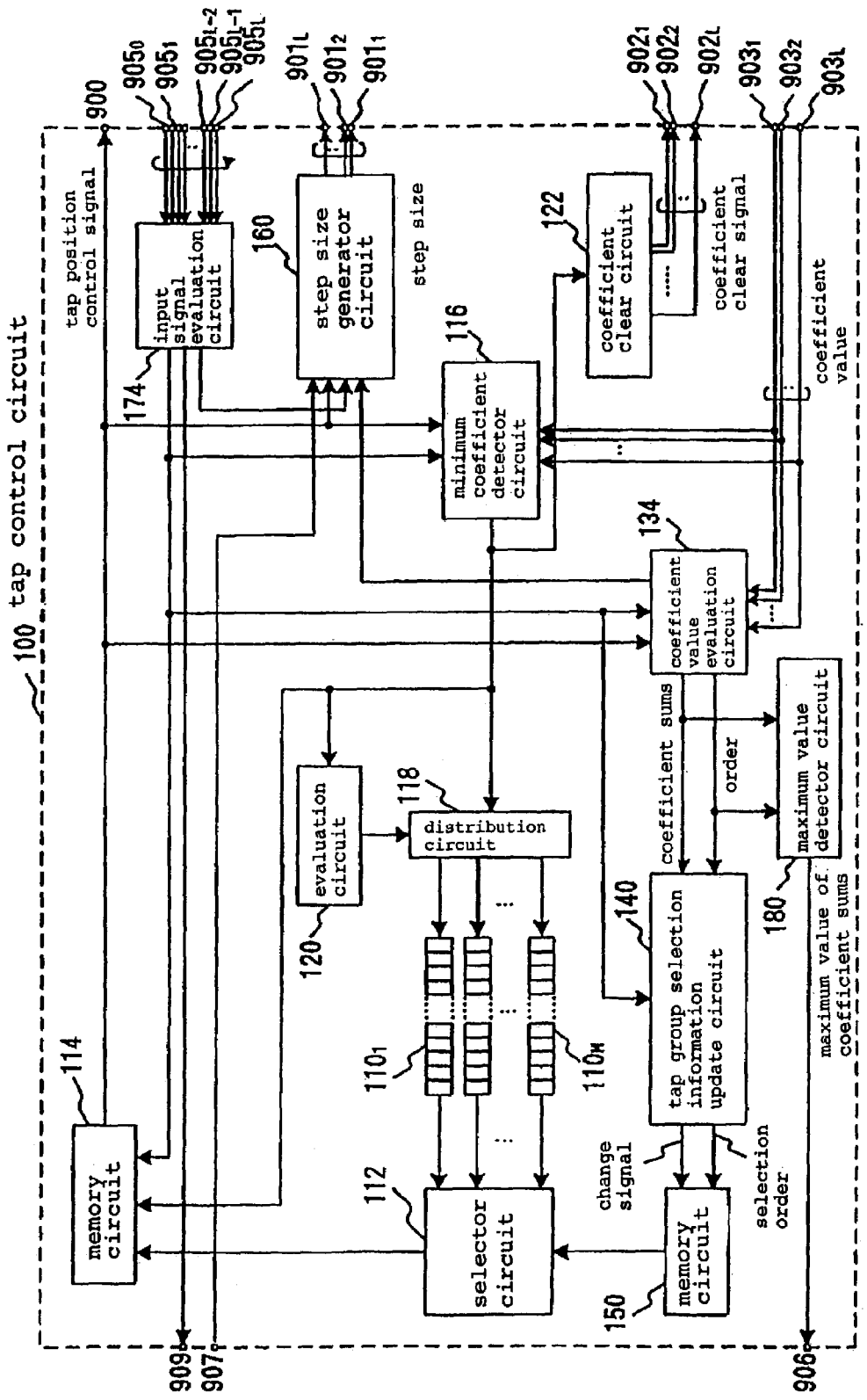
FIG. 26 is a block diagram illustrating the configuration of a tap control circuit included in the adaptive filter according to a seventeenth embodiment of the present invention.

FIG. 26 is a block diagram illustrating the configuration of tap control circuit 100. Since FIG. 26 is identical to FIG. 18 which is the block diagram of tap control circuit 92 except for coefficient value evaluation circuit 130 and coefficient value evaluation circuit 134, detailed operation described below will be centered on the difference. Coefficient value evaluation circuit 134 receives tap coefficient values delivered from respective coefficient generator circuits, and active tap indexes delivered from memory circuit 114, and transfers the "coefficient sum" and "order," which are calculated in a completely similar procedure to coefficient value evaluation circuit 130, to tap group selection information update circuit 140. Maximum coefficient detector circuit 134 in turn calculates the ratio of a maximum value $C_{max}$ of maximum absolute coefficient values in respective tap groups to the maximum absolute coefficient value in each group. For example, assuming that the maximum absolute value in each tap group is $c_{j,max}$ ($1 \leq j \leq M$) when the number of tap groups is M, the ratio $R_j = c_{j,max}/C_{max}$ is calculated therefor and transferred to step size generator circuit 160. A similar result can also be provided when a sum total of the maximum absolute coefficient values in each tap group is defined as $C_{max}$.

The description on the fifth to seventeenth embodiments of the present invention has been made in connection with an example in which step size generator circuit 160 generates a different step size for each tap group. However, an eighteenth embodiment can be provided by designing step size generator circuit 160 to generate an equal step size to each tap group.

Figure 27:
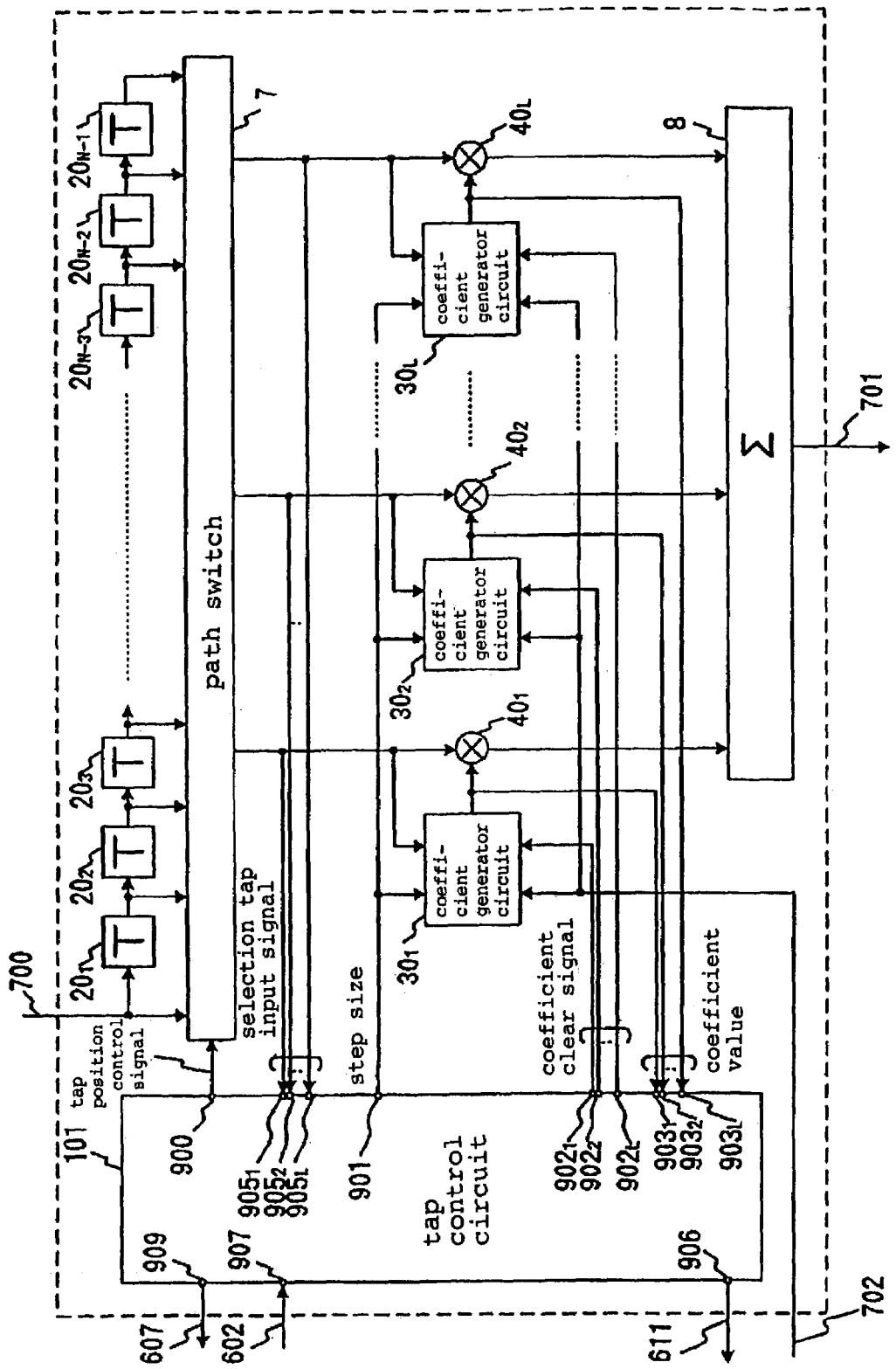
FIG. 27 is a block diagram illustrating the configuration of an adaptive filter according to an eighteenth embodiment of the present invention.

FIG. 27 is a block diagram illustrating the eighteenth embodiment of the present invention. The eighteenth embodiment differs from the ninth embodiment in that tap control circuit 92 in FIG. 18 is replaced with tap control circuit 101 in FIG. 27.

Figure 28:
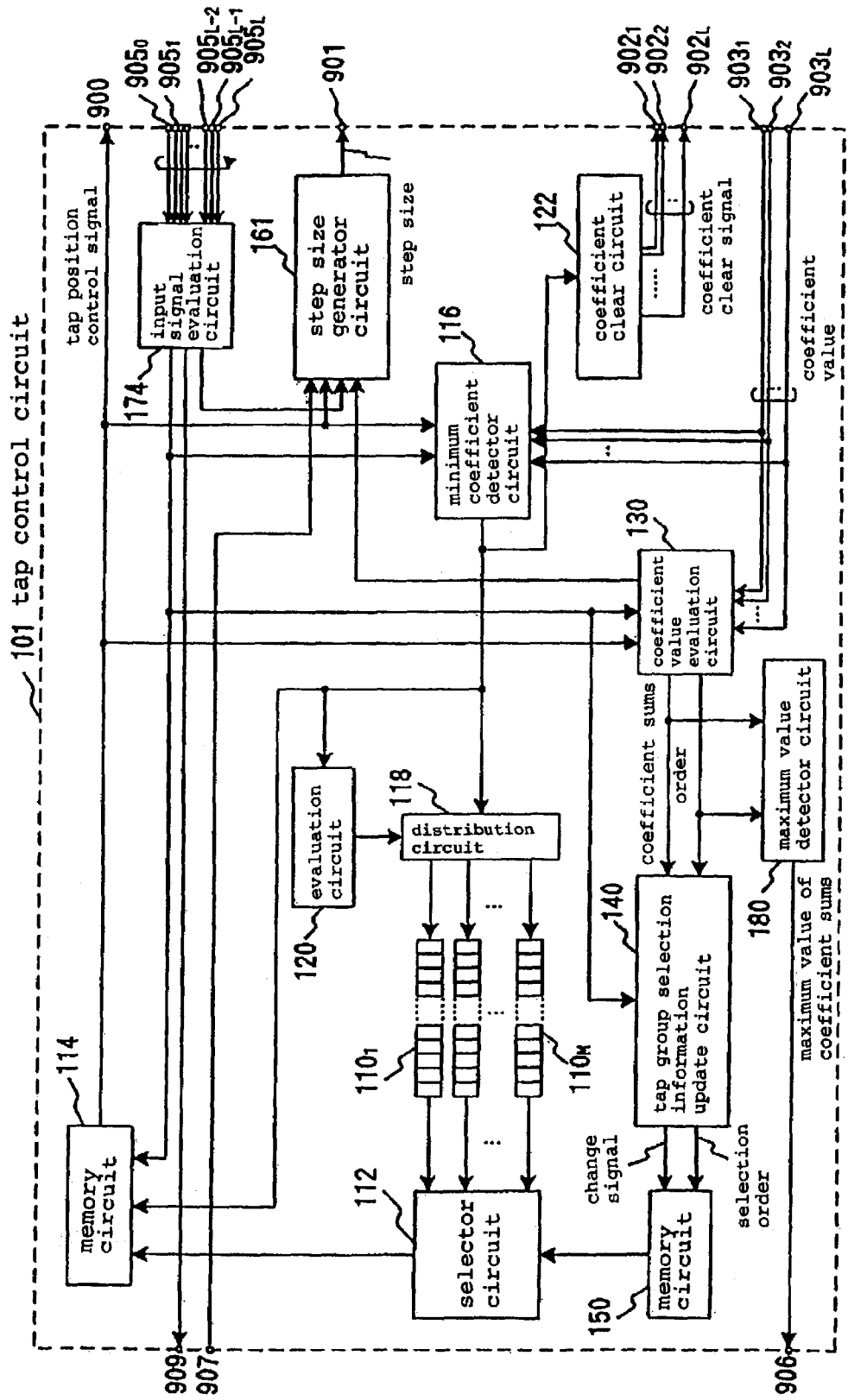
FIG. 28 is a block diagram illustrating the configuration of a tap control circuit included in the adaptive filter according to the eighteenth embodiment of the present invention.

Tap control circuit 92 in FIG. 18 supplies different step sizes to coefficient generator circuits $30_1$-$30_L$ through output terminals $901_1$-$901_L$, whereas tap control circuit 101 in FIG. 28 supplies a common step size to coefficient generator circuits $30_1$-$30_L$ through output terminal 901. For this reason, tap control circuit 101 has only output terminal 901 instead of a plurality of output terminals $901_1$-$901_L$.

FIG. 28 is a block diagram illustrating the configuration of tap control circuit 101. Since FIG. 28 is identical to FIG. 18 except for step size generator circuit 160 and step size generator circuit 161, the operation described below will be centered on the difference.

Unlike step size generator circuit 160, step size generator circuit 161 in FIG. 28 does not receive $R_j$ supplied from coefficient value evaluation circuit 130. Step size generator circuit 161 neither receives information on active taps supplied from memory circuit 114. Step size generator circuit 161 sets a step size supplied to output terminal 901 to zero only when it is supplied with a coefficient update stop signal from input signal evaluation circuit 174. Otherwise, step size generator circuit 161 supplies output terminal 901 with a predefined value as a common step size for coefficient generator circuits $30_1$-$30_L$.

Figure 29:
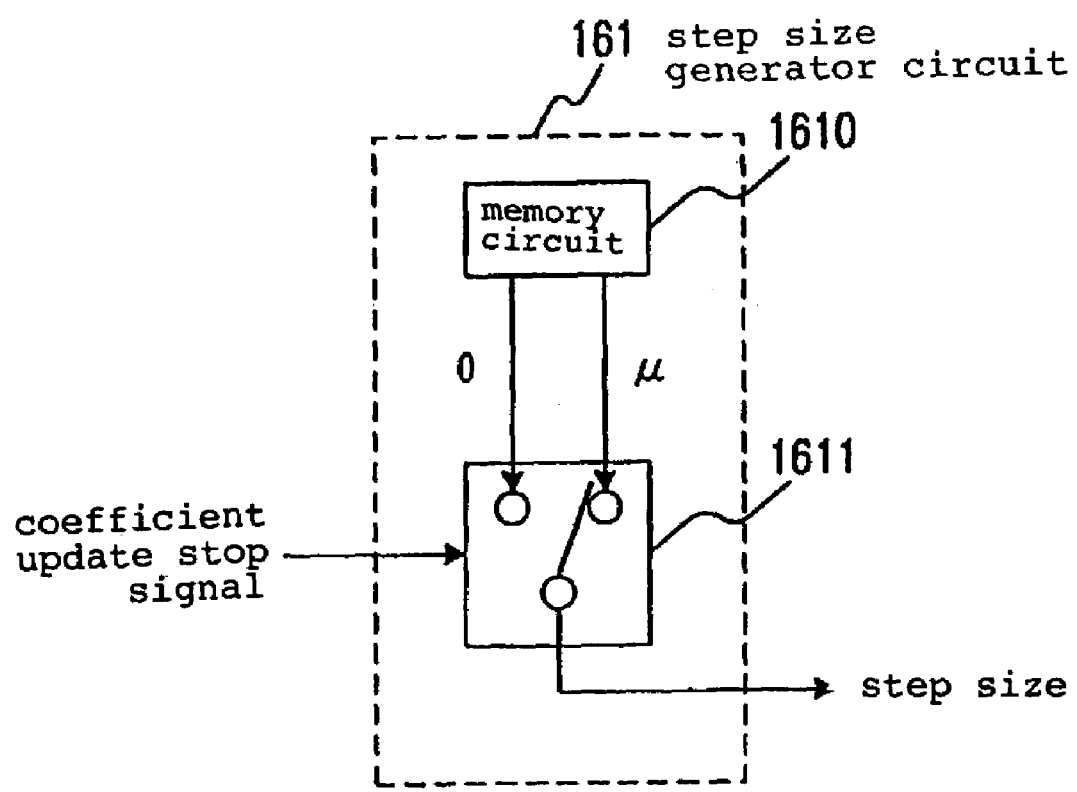
FIG. 29 is a block diagram illustrating the configuration of a step size generator circuit included in the tap control circuit in the eighteenth embodiment of the present invention.

FIG. 29 is a block diagram illustrating the configuration of step size generator circuit 161. Step size generator circuit 161 comprises memory circuit 1610 and switch 1611. Memory circuit 1610 stores zero and μ as the normal step size, and supplies them to two input terminals of switch 1611. Switch 1611 is controlled by the coefficient update stop signal supplied from input signal evaluation circuit 174. Switch 1611 normally selects μ supplied from memory circuit 1610 and delivers the same as the step size, but it operates to select and deliver zero when it is supplied with the coefficient update stop signal from input signal evaluation circuit 174.

As is apparent from the foregoing description, in tap control circuit 101, input signal evaluation circuit 174 for generating the coefficient update stop signal can be replaced with input signal evaluation circuit 170, input signal evaluation circuit 171, input signal evaluation circuit 172, or input signal evaluation circuit 173. Also, step size generator circuit 161 can be used in place of step size generator circuit 160 in any of tap control circuit 91, tap control circuit 92, tap control circuit 93, tap control circuit 94, tap control circuit 95, tap control circuit 96, tap control circuit 97, tap control circuit 98, tap control circuit 99, and tap control circuit 100.

While the foregoing embodiments of the present invention have been described in connection with the update of tap coefficients using the LMS algorithm as an example, a variety of other algorithms can be applied. For example, the normalized LMS (NLMS) algorithm described in Reference 2 may be used instead of the LMS algorithm in the fourth embodiment of the present invention to provide the eighteenth embodiment of the present invention.

A nineteenth embodiment of the present invention is provided by substituting tap control circuit 102 for tap control circuit 92 described in the block diagram illustrating the ninth embodiment of the present invention shown in FIG. 18. Since a difference between the nineteenth embodiment and ninth embodiment of the present invention lies only in tap control circuit 102, tap control circuit 102 will be described below with reference to FIG. 30.

Figure 30:
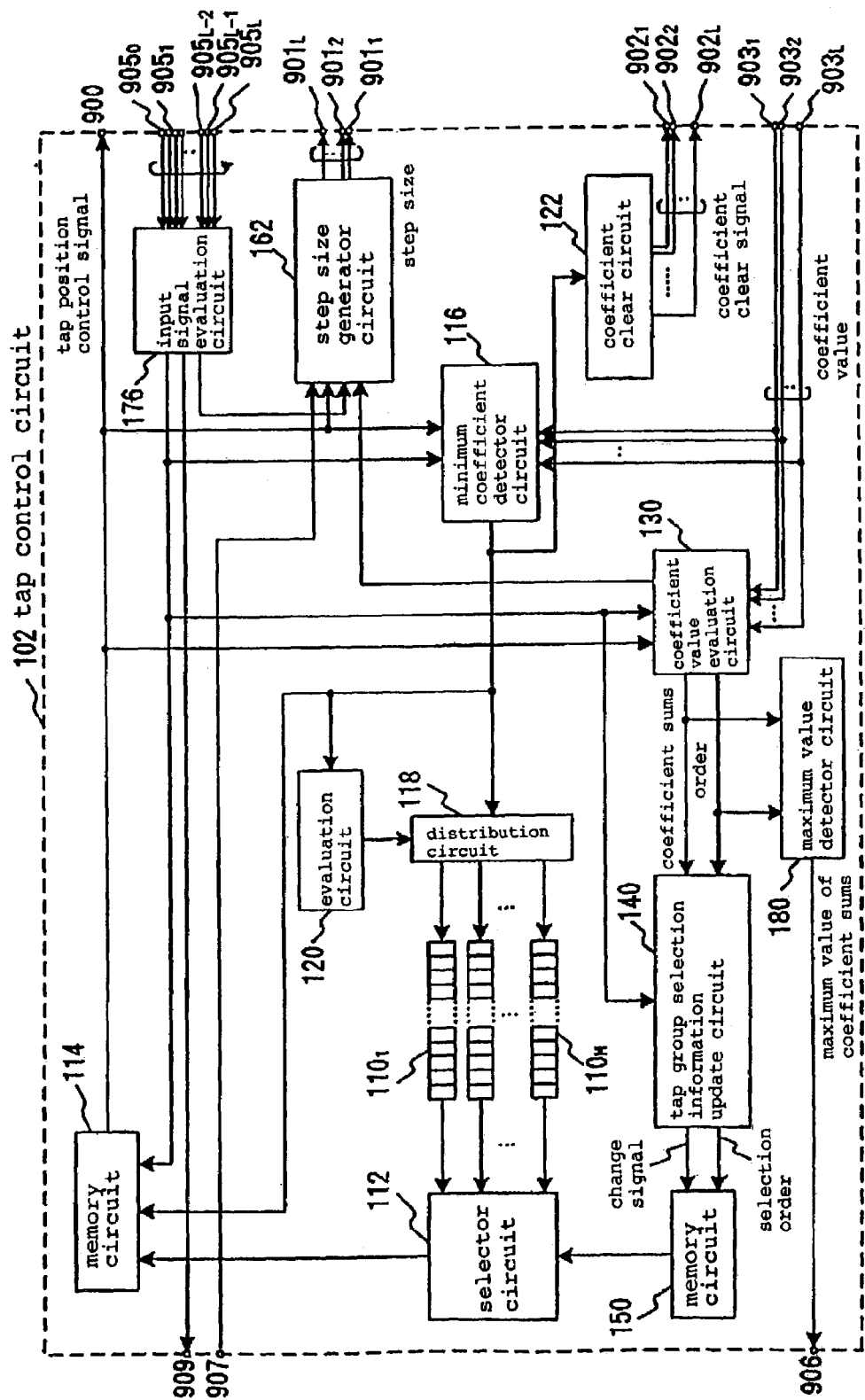
FIG. 30 is a block diagram illustrating the configuration of a tap control circuit included in the adaptive filter according to a nineteenth embodiment of the present invention.

FIG. 30 is a block diagram illustrating the configuration of tap control circuit 102. Since FIG. 30 is identical to FIG. 18 except for step size generator circuit 162 and input signal evaluation circuit 176, detailed operations described below will be centered on the difference.

The largest difference between tap control circuit 92 and tap control circuit 102 lies in that step size generator circuit 162 is supplied with active tap input signal power from input signal evaluation circuit 176. A filter coefficient update, when using the NLMS algorithm, is given by:

$$c_i(k+1) = c_i(k) + \mu_i \frac{e(k)x(k-a(i))}{\sum_{i=1}^{L} x^2(k-a(i))} \quad (19)$$

where a(i) is a set which is composed of active tap indexes, as described in line with Equation (17), and the number of elements is L. From a comparison of Equation (19) with Equation (17) representative of the LMS algorithm, it can be seen that a difference lies in normalization of the second term on the right hand side:

$$\sum_{i=1}^{L} x^2(k-a(i))$$

This active tap input signal power is calculated in input signal evaluation circuit 176 and supplied to step size generator circuit 162. Since components other than step size generator circuit 162 and input signal evaluation circuit 176 in tap control circuit 102 are completely identical to components other than step size generator circuit 160 and input signal evaluation circuit 174 in tap control circuit 92, without any difference in operation, detailed description thereon is omitted.

In the configuration of the ninth embodiment of the present invention, the LMS algorithm can be replaced with the NLMS algorithm without replacing tap control circuit 92. This will be described as a twentieth embodiment of the present invention.

Figure 31:
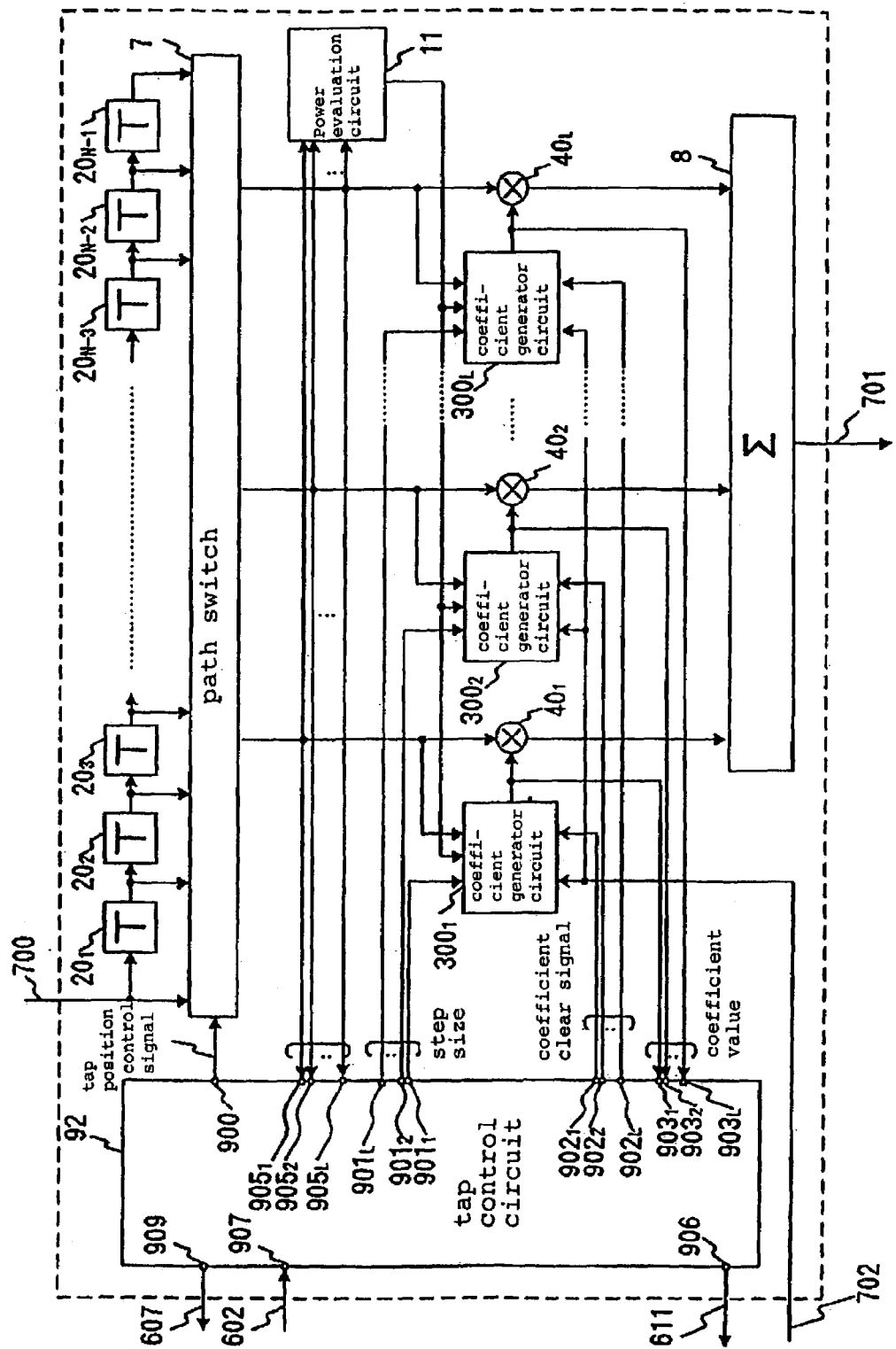
FIG. 31 is a block diagram illustrating the configuration of an adaptive filter according to a twentieth embodiment of the present invention.

FIG. 31 is a block diagram illustrating the twentieth embodiment of the present invention. The twentieth embodiment differs from the ninth embodiment in that coefficient generator circuits $30_1$-$30_L$ are replaced with coefficient generator circuits $300_1$-$300_L$ and power evaluation circuit 11 is additionally provided. Power evaluation circuit 11 is supplied with input signal samples fed to active taps, similar to input terminals $905_1$-$905_L$. Power evaluation circuit 11 calculates:

$$\sum_{i=1}^{L} x^2(k-a(i))$$

and supplies its inverse to coefficient generator circuits $300_1$-$300_L$ as a normalization coefficient.

Figure 10:
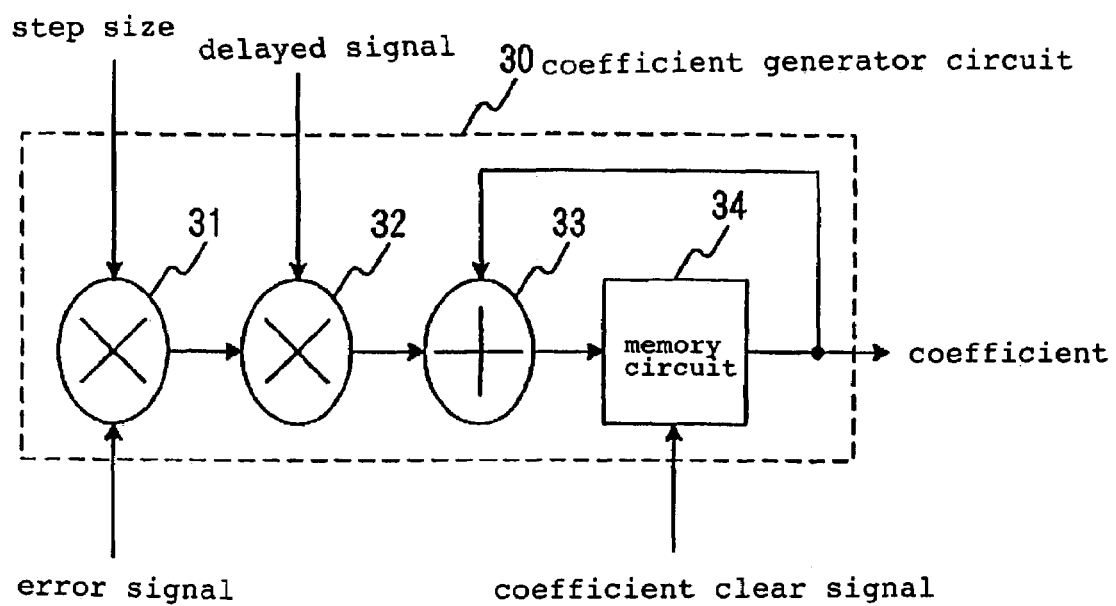
FIG. 10 is a block diagram illustrating the configuration of a coefficient generator circuit included in the adaptive filter according to the fifth embodiment of the present invention.
Figure 32:
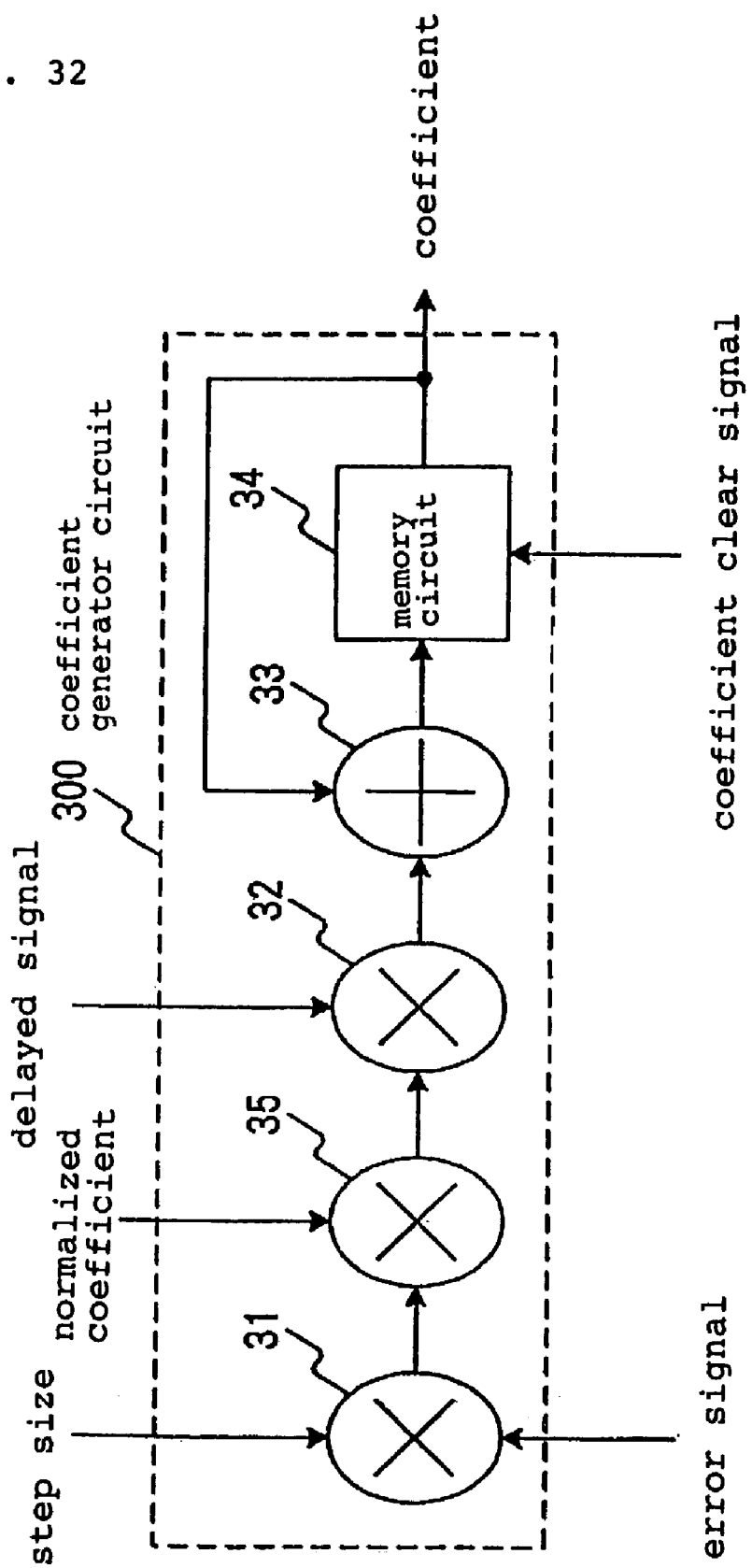
FIG. 32 is a block diagram illustrating the configuration of a coefficient generator circuit included in the adaptive filter according to the twentieth embodiment of the present invention.

FIG. 32 is a block diagram illustrating the configuration of coefficient generator circuit $300_i$ (i=1, 2, . . . , L). A difference between coefficient generator circuit $300_i$ and coefficient generator circuit $30_i$ (i=1, 2, . . . , L) illustrated in FIG. 10 lies in that an output signal of multiplier 31 is multiplied by the normalization coefficient in multiplier 35 before it is supplied to multiplier 32. With this difference, the amount of modification to coefficients, which is the output of multiplier 32, is expressed by:

$$\frac{1}{\sum_{i=1}^{L} x^2(k-a(i))}$$

as compared with the output of multiplier 32 in FIG. 10, thus implementing the coefficient update equation shown in Equation (19). Since the remaining configuration and operation associated with coefficient generator circuit $300_i$ (i=1, 2, . . . , L) are identical to those of coefficient generator circuit $30_i$ (i=1, 2, . . . , L), description thereon is omitted.

In the fifth embodiment illustrated in FIG. 9, the NLMS algorithm may be used as well instead of the LMS algorithm to provide a twenty first embodiment of the present invention.

Figure 33:
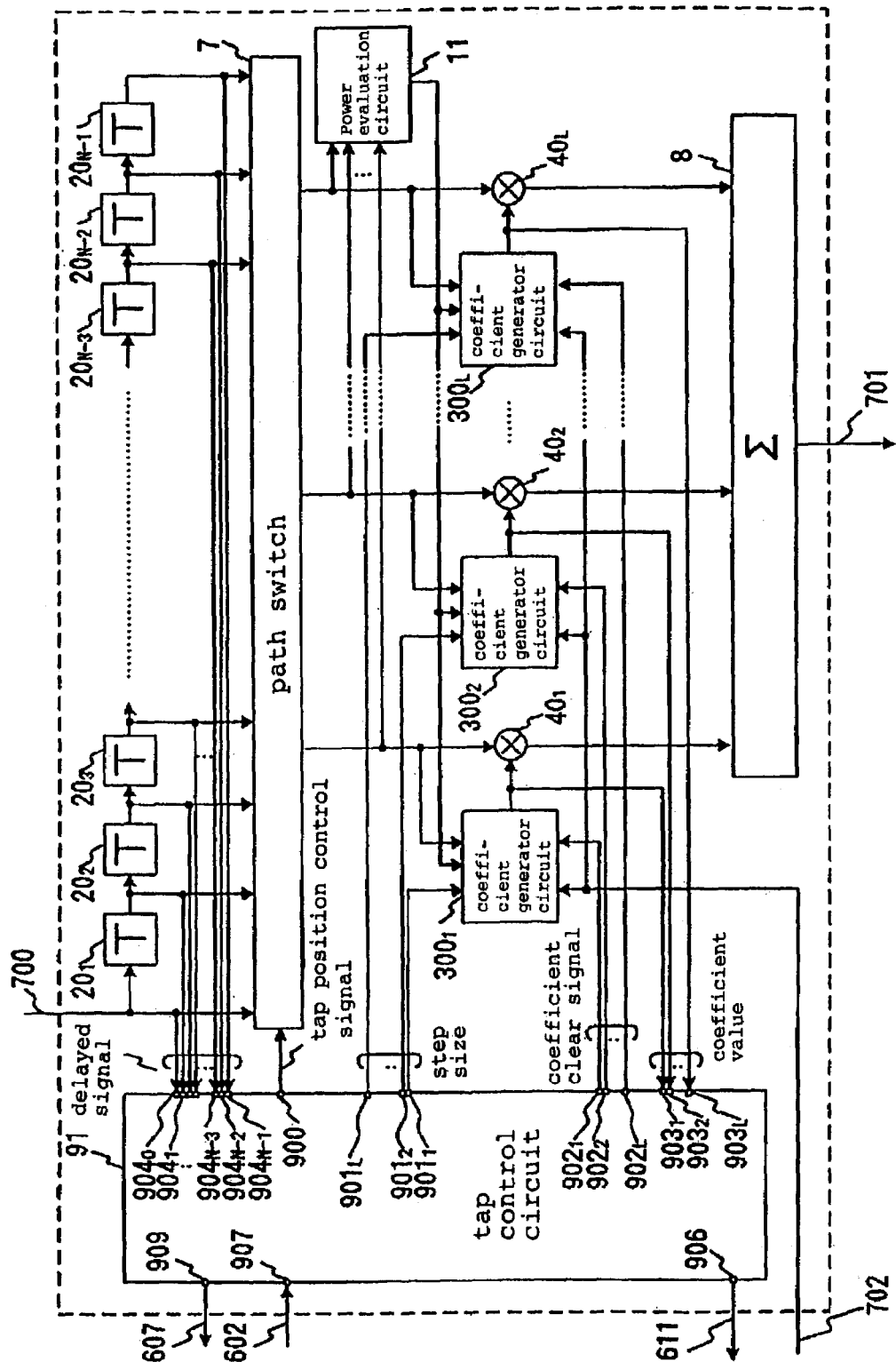
FIG. 33 is a block diagram illustrating the configuration of an adaptive filter according to a twenty first embodiment of the present invention.

FIG. 33 is a block diagram illustrating the twenty first embodiment of the present invention. The twenty first embodiment differs from the fifth embodiment in that coefficient generator circuits $30_1$-$30_L$ are replaced with coefficient generator circuits $300_1$-$300_L$ and power evaluation circuit 11 is additionally provided. Since the difference between the fifth embodiment and twenty first embodiment is equal to the difference between the ninth embodiment and the twentieth embodiment, which has been already described, description thereon is omitted.

While the coefficient update algorithm is changed herein for the fourth and eighth embodiments of the present invention, it should be clear that a similar change can be made to the fifth to seventh and ninth to eighteenth embodiments of the present invention. Also, the eighteenth, nineteenth and twentieth embodiments of the present invention can be configured to generate an equal step size for each tap group, as is the case with the seventeenth embodiment of the present invention.

In satellite links, there is known a phenomenon called phase roll which is instantaneous inversion of the polarity of an echo path identified by an adaptive filter. When the phase roll is encountered, it is necessary to follow fluctuations in impulse response of the echo path through a coefficient update, wherein a larger number of coefficient updates are required even if coefficient adaptation is close to convergence. To address this problem, the phase roll is detected, and tap position information transferred to control circuit 71 is reset to values immediately after the coefficient update was started, thereby making it possible to allocate a larger number of coefficient updates.

Figure 34:
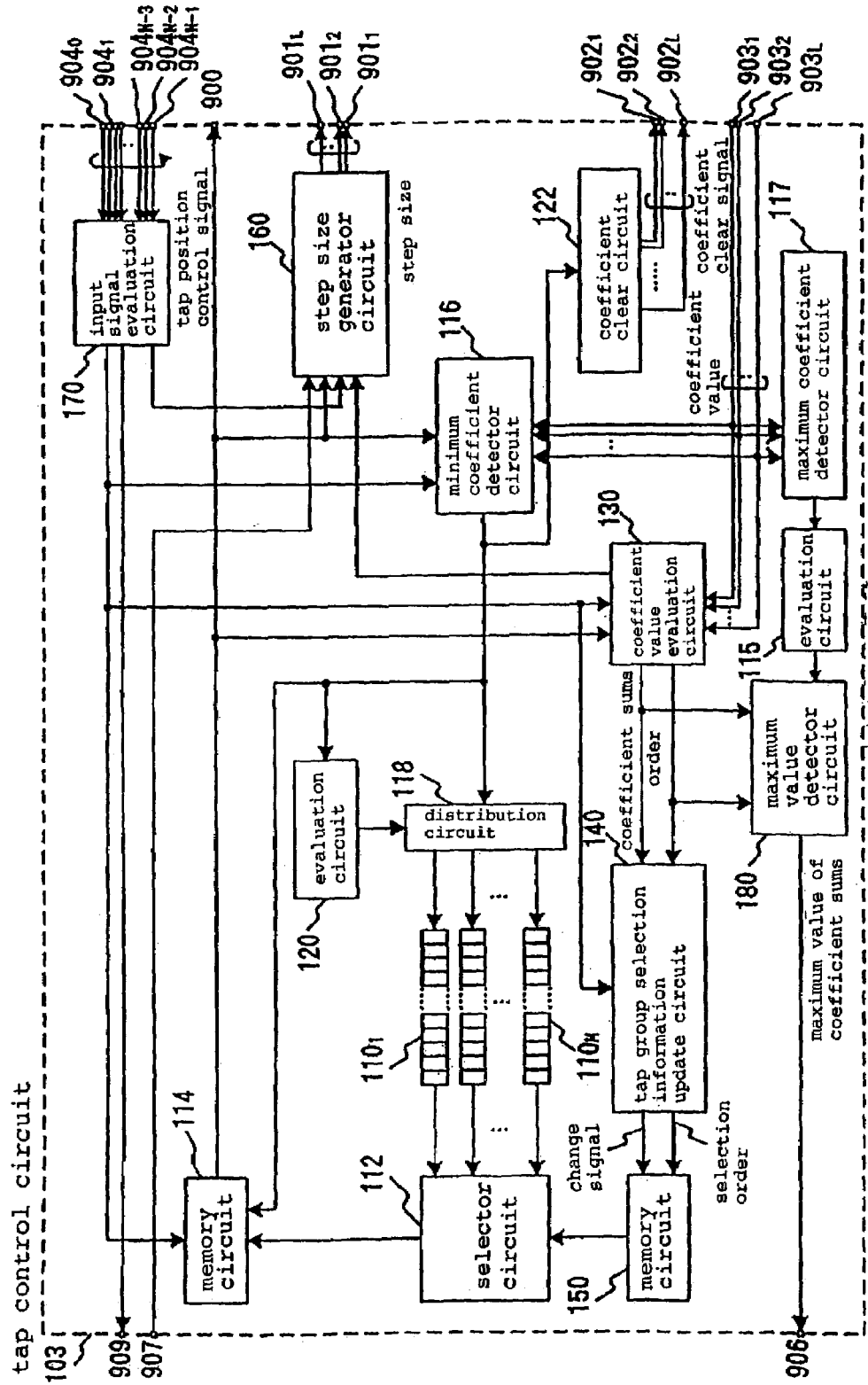
FIG. 34 is a block diagram illustrating the configuration of a tap control circuit included in the adaptive filter according to a twenty second embodiment of the present invention.

FIG. 34 illustrates tap control circuit 103 which can be used in place of tap control circuit 91 in FIG. 10 for such a purpose.

Tap control circuit 103 in FIG. 34 differs from tap control circuit 91 in FIG. 11 in that tap control circuit 103 comprises maximum coefficient detector circuit 117 and evaluation circuit 115. Maximum coefficient detector circuit 117 is supplied with coefficient values through input terminals $903_1$-$903_L$. Maximum coefficient detector circuit 117 detects a maximum of these coefficient values which is transferred to evaluation circuit 115. Evaluation circuit 115 evaluates changes in the maximum coefficient value supplied thereto, and supplies a control signal to maximum value detector circuit 180 when the change is larger than a predefined value. Upon receipt of the control signal from evaluation circuit 115, maximum value detector circuit 180 operates to reset a maximum coefficient sum, which is its output, to a predefined value, to ensure a larger number of updates in the distribution of the number of coefficient updates in the control circuit.

Maximum coefficient detector circuit 117 can employ, for example, a procedure shown below for detecting the maximum coefficient.

1. Define an $N_0$-th coefficient as a maximum value.
2. Compare an $(N_0+1)$th coefficient with the maximum value to define the larger one as a maximum value.
3. Subsequently, perform the comparison and replacement in sequence from the $(N_0+2)$th coefficient.

$N_0$ is generally set to 1. When no restrictions are imposed on the amount of operations, the foregoing manipulations can be performed in a single sampling period to immediately find the maximum coefficient value. Alternatively, the amount of operations can be reduced by performing the foregoing manipulations one by one in each sampling period. While these manipulations are performed, a maximum value at that time is regarded as the maximum coefficient value which is transferred to evaluation circuit 115.

Changes in the maximum coefficient value can be evaluated in evaluation circuit 115, for example, in accordance with Equations (3) and (16). In other words, evaluation circuit 115 evaluates the proportion of a change between the preceding value and the current value to the current value. While the foregoing description has been made on the configuration of tap control circuit 103 which comprises the phase roll detecting mechanism added to tap control circuit 91, it is apparent that a similar modification can be made to tap control circuits 92-102.

A similar system change detecting mechanism can further be added to the first to fourth embodiments. Other than the previously described method of monitoring a maximum coefficient value, any method can be applied for detecting changes in a system, as represented by a method described in JOURNAL OF THE INSTITUTE OF ELECTRONICS, INFORMATION AND COMMUNICATION ENGINEERS, pp. 314-322, March 1995 (Reference 13). While the fifth to twenty first embodiments so far described assume that the number of coefficients subjected to relocation in a single tap control is one, two or more coefficients can be relocated.

In all the embodiments so far described, while the LMS algorithm and NLMS algorithm have been assumed as an algorithm for the adaptive filter, a sequential regression algorithm (SRA) described in Reference 1, the RLS algorithm described in Reference 2, and the like can be used in a similar manner. For examples of specific configurations therefor, description is omitted. Further, while the embodiments of the present invention have been described in detail in connection with an echo canceler taken as an example, the present invention can be applied as well to a noise canceler, a howling canceler, an adaptive equalizer, and the like in similar principles.

The present invention evaluates intensities of signals fed to multiplexed lines and the convergence degree of an adaptive filter on each line to distribute a predefined number of coefficient updates to each line in accordance with the signal intensities and convergence degrees, so that even if the number of multiplexed lines is increased, the amount of required operations will not increase in proportion to the number of lines.

The invention claimed is:

1. An echo canceling method for multiplexed lines, wherein an adaptive filter installed on each line cancel echoes on the multiplexed lines, said method, comprising the steps of:
   evaluating a convergence degree and an input signal intensity of each adaptive filter provided for said each line; and
   distributing a total number of coefficient updates per unit time given by a predefined number for all the lines in accordance with said convergence degree and input signal intensity.

2. The echo canceling method for multiplexed lines according to claim 1, comprising the steps of:
   averaging at least one of said convergence degrees and input signal intensities of said adaptive filters; and
   distributing said total number of coefficient updates using said averaged value.

3. The echo canceling method for multiplexed lines according to claim 2, wherein said distribution of said total number of coefficient updates includes first allocating a predefined number of said coefficient updates to all the lines, and distributing a remainder of said coefficient updates in accordance with said convergence degrees and input signal intensities.

4. The echo canceling method for multiplexed lines according to claim 3, wherein said convergence degree of said adaptive filter is evaluated based on information on at least one of coefficient values supplied from said each adaptive filter.

5. The echo canceling method for multiplexed lines according to claim 4, wherein said adaptive filter adaptively controls positions of taps such that tap coefficients are located around a position of dispersive regions obtained by eliminating fixed delays from an impulse response of an echo path.

6. The echo canceling method for multiplexed lines according to claim 3, wherein said adaptive filter adaptively controls positions of taps such that tap coefficients are located around a position of dispersive regions obtained by eliminating fixed delays from an impulse response of an echo path.

7. The echo canceling method for multiplexed lines according to claim 1, wherein said convergence degree of said adaptive filter is evaluated based on information on at least one of coefficient values supplied from said each adaptive filter.

8. The echo canceling method for multiplexed lines according to claim 7, wherein said adaptive filter adaptively controls positions of taps such that tap coefficients are located around a position of dispersive regions obtained by eliminating fixed delays from an impulse response of an echo path.

9. The echo canceling method for multiplexed lines according to claim 2, wherein said convergence degree of said adaptive filter is evaluated based on information on at least one of coefficient values supplied from said each adaptive filter.

10. The echo canceling method for multiplexed lines according to claim 9, wherein said adaptive filter adaptively controls positions of taps such that tap coefficients are located around a position of dispersive regions obtained by eliminating fixed delays from an impulse response of an echo path.

11. The echo canceling method for multiplexed lines according to claim 2, wherein said adaptive filter adaptively controls positions of taps such that tap coefficients are located around a position of dispersive regions obtained by eliminating fixed delays from an impulse response of an echo path.

12. An echo canceling apparatus for multiplexed lines comprising:
 a plurality of adaptive filters provided for a plurality of lines, respectively; and
 a control circuit which receives information on convergence degrees and input signal intensities from said plurality of adaptive filters and generates a coefficient update control signal for controlling a number of coefficient updates in each said adaptive filter by distributing a total number of coefficient updates per unit time given by a predefined number for all the lines in accordance with said convergence degrees and input signal intensities.

13. The echo canceling apparatus for multiplexed lines according to claim 12, wherein said control circuit comprises an averaging circuit for averaging at least one of the convergence degrees and the input signal intensities of said adaptive filters.

14. The echo canceling apparatus for multiplexed lines according to claim 13, wherein said control circuit distributes the total number of coefficient updates by first distributing a predefined number to all the lines, and distributing a remainder in accordance with said convergence degrees and input signal intensities.

15. The echo canceling apparatus for multiplexed lines according to claim 14, wherein said control circuit receives information on at least one coefficient value as the convergence degree of said adaptive filter, and distributes the total number of coefficient updates in accordance with the information on the coefficient value and the input signal intensities.

16. The echo canceling apparatus for multiplexed lines according to claim 15, wherein said plurality of adaptive filters each comprise a tap control circuit for adaptively controlling positions of taps such that tap coefficients are located around a position of dispersive regions obtained by eliminating fixed delays from an impulse response of an echo path.

17. The echo canceling apparatus for multiplexed lines according to claim 14, wherein said plurality of adaptive filters each comprise a tap control circuit for adaptively controlling positions of taps such that tap coefficients are located around a position of dispersive regions obtained by eliminating fixed delays from an impulse response of an echo path.

18. The echo canceling apparatus for multiplexed lines according to claim 13, wherein said control circuit receives information on at least one coefficient value as the convergence degree of said adaptive filter, and distributes the total number of coefficient updates in accordance with the information on the coefficient value and the input signal intensities.

19. The echo canceling apparatus for multiplexed lines according to claim 18, wherein said plurality of adaptive filters each comprise a tap control circuit for adaptively controlling positions of taps such that tap coefficients are located around a position of dispersive regions obtained by eliminating fixed delays from an impulse response of an echo path.

20. The echo canceling apparatus for multiplexed lines according to claim 13, wherein said plurality of adaptive filters each comprise a tap control circuit for adaptively controlling positions of taps such that tap coefficients are located around a position of dispersive regions obtained by eliminating fixed delays from an impulse response of an echo path.

21. The echo canceling apparatus for multiplexed lines according to claim 12, wherein said control circuit receives information on at least one coefficient value as the convergence degree of said adaptive filter, and distributes the total number of coefficient updates in accordance with the information on the coefficient value and the input signal intensities.

22. The echo canceling apparatus for multiplexed lines according to claim 21, wherein said plurality of adaptive filters each comprise a tap control circuit for adaptively controlling positions of taps such that tap coefficients are located around a position of dispersive regions obtained by eliminating fixed delays from an impulse response of an echo path.

* * * * *

UNITED STATES PATENT AND TRADEMARK OFFICE
CERTIFICATE OF CORRECTION

| | | |
|---|---|---|
| PATENT NO. | : 7,355,989 B2 | Page 1 of 1 |
| APPLICATION NO. | : 10/312036 | |
| DATED | : April 8, 2008 | |
| INVENTOR(S) | : Akihiko Sugiyama | |

It is certified that error appears in the above-identified patent and that said Letters Patent is hereby corrected as shown below:

On the title page item (54) and col. 1, line 1, should read: "ECHO CANCELING METHOD AND <u>APPARATUS</u> FOR MULTIPLEX LINE"

Signed and Sealed this

Fifteenth Day of June, 2010

David J. Kappos
*Director of the United States Patent and Trademark Office*